(12) United States Patent
Hamada et al.

(10) Patent No.: US 8,369,683 B2
(45) Date of Patent: Feb. 5, 2013

(54) REPRODUCING APPARATUS, REPRODUCING METHOD, REPRODUCING PROGRAM, RECORDING MEDIUM, AND DATA STRUCTURE

(75) Inventors: Toshiya Hamada, Saitama (JP); Yasushi Fujinami, Tokyo (JP); Tatsuya Kakumu, Tokyo (JP); Shusuke Utsumi, Tokyo (JP); Koji Ihara, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1227 days.

(21) Appl. No.: 11/720,609

(22) PCT Filed: Nov. 10, 2005

(86) PCT No.: PCT/JP2005/021075
§ 371 (c)(1),
(2), (4) Date: Jun. 1, 2007

(87) PCT Pub. No.: WO2006/059483
PCT Pub. Date: Jun. 8, 2006

(65) Prior Publication Data
US 2009/0279867 A1 Nov. 12, 2009

(30) Foreign Application Priority Data
Dec. 2, 2004 (JP) .................. 2004-350193

(51) Int. Cl.
*H04N 9/80* (2006.01)
(52) U.S. Cl. ...................................... 386/248
(58) Field of Classification Search .......... 386/248
See application file for complete search history.

(56) References Cited

U.S. PATENT DOCUMENTS

2003/0161615 A1* 8/2003 Tsumagari et al. ............. 386/95
2004/0057699 A1* 3/2004 Kim et al. ....................... 386/95
(Continued)

FOREIGN PATENT DOCUMENTS

| JP | 10 271454 | 10/1998 |
| JP | 2004 328450 | 11/2004 |
| JP | 2004328450 A * | 11/2004 |

OTHER PUBLICATIONS

JP Publication 2004-328450 English Translation.*

(Continued)

*Primary Examiner* — Thai Tran
*Assistant Examiner* — William Tran
(74) *Attorney, Agent, or Firm* — Oblon, Spivak, McClelland, Maier & Neustadt, L.L.P.

(57) ABSTRACT

A state transition of a player operation is explicitly defined to facilitate the production of interactive contents. As a player model for reproducing a disk, a model including a player 300 for reproducing a stream, a platform 301 providing an interface between the player 300 and a hardware, and a script player 302 for realizing a scenario intended by a content producer is conceived. The states of the player 300 are defined by four states defined by combinations of two states as to whether the play list reproduction is performed or not and two states as to whether the command 311 is accepted or not. The state transition of the player 300 among the four states is generated by a method 313 from the script layer 302, but not by the player 300 itself or the command 311. The states of the player 300 are small in number, and the conditions for state transition are definite. Therefore, the interactive contents can be easily produced and mounted on devices.

18 Claims, 53 Drawing Sheets

U.S. PATENT DOCUMENTS

2006/0143666 A1* 6/2006 Okada et al. .................. 725/89

OTHER PUBLICATIONS

Office Action issued Dec. 21, 2010, in Japanese Patent Application No. 2004-350193, filed Dec. 2, 2004.

"DVD Demystified", XP002510211, Chapter 6, 4 pages.

U.S. Appl. No. 11/573,717, filed Feb. 15, 2007, Hamada, et al.

Taylor, "DVD kaitai-shinsyo", Nexus Intercom Inc., 1st edition, p. 271, 2003.

* cited by examiner

Fig. 4

| STATE | DESCRIPTION |
|---|---|
| PLAY | INDICATES STATE IN WHICH THE PLAY LIST IS SELECTED AND REPRODUCED. PLAY STATE IS SUBDIVIDED INTO STATUS AND, IN ADDITION TO NORMAL REPRODUCTION, GENERALLY INCLUDES VARIOUS STATUSES, I.E., VARIABLE-SPEED REPRODUCTION SUCH AS FAST FEED AND REVERSE FEED, AND PAUSE. |
| STOP | INDICATES STATE IN WHICH PLAY LIST IS NOT REPRODUCED. NO PLAY LIST IS SELECTED. |

Fig. 7A

READ-ONLY PARAMETER

| NAME | DESCRIPTION |
|---|---|
| scriptVersion | VERSION OF UMD VIDEO SCRIPT |
| audioChannelCapability | NUMBER OF AUDIO CHANNELS THAT CAN BE REPRODUCED BY UMD VIDEO PLAYER |
| languageCode | LANGUAGE CODE OF MENU DISPLAY SET IN UMD VIDEO PLAYER |
| audioLanguageCode | LANGUAGE CODE OF AUDIO SET IN UMD VIDEO PLAYER |
| subtitleLanguageCode | LANGUAGE CODE OF SUBTITLE SET IN UMD VIDEO PLAYER |

Fig. 7B

PLAYER STATUS

| NAME | DESCRIPTION |
|---|---|
| playListNumber | NUMBER OF CURRENTLY REPRODUCED PLAY LIST |
| chapterNumber | NUMBER OF CURRENTLY REPRODUCED CHAPTER |
| videoNumber | NUMBER OF CURRENTLY REPRODUCED VIDEO STREAM |
| audioNumber | NUMBER OF CURRENTLY REPRODUCED AUDIO STREAM |
| subtitleNumber | NUMBER OF CURRENTLY REPRODUCED SUBTITLE STREAM |
| playListTime | TIME ASSUMING THAT THE PLAY LIST HEAD IS 0 |
| audioFlag | DESIGNATION OF ON/OFF OF AUDIO REPRODUCTION AND DUAL MONO LR |
| subtitleFlag | ON/OFF OF SUBTITLE DISPLAY |

Fig. 8

| NAME | DESCRIPTION |
|---|---|
| play() | REPRODUCE |
| playChapter() | REPRODUCE BY DESIGNATING CHAPTER |
| resume() | START REPRODUCTION USING RESUME INFORMATION |
| stop() | STOP REPRODUCTION |
| pause() | TEMPORARILY STOP REPRODUCTION |
| playStep() | FRAME-BY-FRAME ADVANCE |
| changeStream() | CHANGE VIDEO, AUDIO AND SUBTITLE STREAM |
| getPlayerStatus() | ACQUIRE STATE SUCH AS REPRODUCTION, STOP OR PAUSE IN MOVIE PLAYER |
| changeResumeInfo() | CHANGE CONTENTS OF RESUME INFORMATION |
| reset() | STOP REPRODUCTION AND CLEAR RESUME INFORMATION |
| setPos() | SET VIDEO DISPLAY POSITION |
| getPos() | ACQUIRE VIDEO DISPLAY POSITION |
| setSize() | SET VIDEO DISPLAY SIZE |
| getSize() | ACQUIRE VIDEO DISPLAY SIZE |

Fig. 9

| KEY NAME | DESCRIPTION |
| --- | --- |
| VK_PLAY | REPRODUCE |
| VK_STOP | STOP |
| VK_PAUSE | PAUSE |
| VK_FAST_FORWARD | FAST FORWARD FEED |
| VK_FAST_REVERSE | FAST REVERSE FEED |
| VK_SLOW_FORWARD | SLOW (FORWARD) |
| VK_SLOW_REVERSE | SLOW (REVERSE) |
| VK_STEP_FORWARD | FRAME-BY-FRAME FEED (FORWARD) |
| VK_STEP_REVERSE | FRAME-BY-FRAME FEED (REVERSE) |
| VK_NEXT | NEXT |
| VK_PREVIOUS | PREVIOUS |
| VK_ANGLE | SWITCH ANGLE |
| VK_SUBTITLE | SWITCH SUBTITLE |
| VK_AUDIO | SWITCH AUDIO |
| VK_VIDEO_ASPECT | SWITCH VIDEO ASPECT RATIO |

Fig. 10

| KEY NAME | DESCRIPTION |
|---|---|
| VK_UP | UP |
| VK_DOWN | DOWN |
| VK_RIGHT | RIGHT |
| VK_LEFT | LEFT |
| VK_UP_RIGHT | RIGHT UP |
| VK_UP_LEFT | LEFT UP |
| VK_DOWN_RIGHT | RIGHT DOWN |
| VK_DOWN_LEFT | LEFT DOWN |
| VK_MENU | MENU |
| VK_ENTER | ENTER |
| VK_RETURN | RETURN |
| VK_COLORED_KEY_1 | COLORED FUNCTION KEY 1 |
| VK_COLORED_KEY_2 | COLORED FUNCTION KEY 2 |
| VK_COLORED_KEY_3 | COLORED FUNCTION KEY 3 |
| VK_COLORED_KEY_4 | COLORED FUNCTION KEY 4 |
| VK_COLORED_KEY_5 | COLORED FUNCTION KEY 5 |
| VK_COLORED_KEY_6 | COLORED FUNCTION KEY 6 |

| CONTROL INSTRUCTION DUE TO USER OPERATION | DESCRIPTION |
|---|---|
| uo_timeSearch(playListTime) | REPRODUCE OF CURRENTLY REPRODUCED PLAY LIST FROM DESIGNATED TIME. playListTime INDICATES TIME WHEN HEAD OF PLAY LIST IS SET TO 0. NO PLAY LIST NUMBER CAN BE DESIGNATED. THEREFORE, TIME INCLUDED IN THE RANGE OF CURRENTLY REPRODUCED PLAY LIST IS DESIGNATED. |
| uo_play() | START FORWARD REPRODUCTION AT NORMAL SPEED. STARTING POSITION IS DETERMINED BASED ON RESUME INFORMATION. IN THE ABSENCE OF RESUME INFORMATION, THE USER OPERATION IS INVALID. USED UPON EXECUTION OF play() METHOD WITHOUT DESIGNATION OF playListNumber. PLAY LIST NUMBER CANNOT BE DESIGNATED BY USER OPERATION. |
| uo_playChapter(chapterNumber) | START REPRODUCTION FROM CHAPTER DESIGNATED BY CURRENTLY REPRODUCED PLAY LIST. IN THE ABSENCE OF CHAPTER DESIGNATION, START REPRODUCTION FROM HEAD OF CURRENTLY REPRODUCED CHAPTER. USED FOR playChapter() METHOD WITHOUT DESIGNATION OF chapterNumber. |

Fig. 11B

| | |
|---|---|
| uo_playPrevChapter() | START REPRODUCTION FROM HEAD OF PREVIOUS CHAPTER |
| uo_playNextChapter() | START REPRODUCTION FROM HEAD OF NEXT CHAPTER |
| uo_jumpToEnd() | JUMP TO THE END OF PLAY LIST. USER OPERATION FOR INSTRUCTING MOVIE PLAYER TO SUSPEND CURRENT REPRODUCTION AND GENERATE EVENT playListEnd. IN SCRIPT, EVENT HANDLER onPlayListEnd IS EXECUTED. |
| uo_forwardScan(speed) | REPRODUCE FORWARD AT SPEED DESIGNATED BY speed. speed DEPENDS ON MOUNTING OF UMD VIDEO PLAYER. |
| uo_backwardScan(speed) | REPRODUCE REVERSELY AT SPEED DESIGNATED BY speed. speed DEPENDS ON MOUNTING OF UMD VIDEO PLAYER. |

Fig. 11C

| | |
|---|---|
| uo_playStep(forward) | REPRODUCE FORWARD FRAME-BY-FRAME ADVANCE |
| uo_playStep(backward) | REPRODUCE REVERSE FRAME-BY-FRAME ADVANCE |
| uo_pauseOn() | TEMPORARY STOP BY USER |
| uo_pauseOff() | CANCEL TEMPORARY STOP |
| uo_setAudioEnabled(boolean) | DESIGNATE ON/OFF OF AUDIO STREAM CHANGE audioFlag |
| uo_setSubtitleEnabled(boolean) | DESIGNATE ON/OFF OF SUBTITLE STREAM CHANGE subtitleFlag |
| uo_angleChange() | CHANGE DISPLAY ANGLE. UPON TRANSMISSION OF THE USER OPERATION TO MOVIE PLAYER, MOVIE PLAYER NOTIFIES SCRIPT OF EVENT angleChange. |
| uo_audioChange (audioStreamNumber) | CHANGE AUDIO TO BE REPRODUCED |
| uo_changeAudioChannel(value) | SWITCH NUMBER OF AUDIO CHANNELS AND ONE CHANNEL AT THE TIME OF DUAL MONO. CHANGE audioFlag. |
| uo_subtitleChange (subtitleStreamNumber) | CHANGE SUBTITLE TO BE REPRODUCED |

Fig. 12

| EVENT | DESCRIPTION |
|---|---|
| menu | JUMP TO MENU |
| exit | EVENT ISSUED FROM NATIVE IMPLEMENTATION PLATFORM WHEN UMD VIDEO APPLICATION IS ENDED BY NATIVE IMPLEMENTATION PLATFORM. |
| resourceChanged | EVENT NOTIFIED TO SCRIPT LAYER WHEN RESOURCE FILE IS SWITCHED |
| up, down, left, right focusIn, focusOut, push, cancel | EVENT GENERATED WHILE BUTTON WIDGET DISPLAYED ON SCREEN IS FOCUSED |
| autoPlay, continuePlay | EVENTS DESIGNATING START OF SCRIPT EXECUTION |

Fig. 13

| EVENT NAME | CORRESPONDING EVENT HANDLER NAME | DESCRIPTION |
|---|---|---|
| mark | onMark() | EXECUTED UPON DETECTION OF EVENT MARK |
| playListEnd | onPlayListEnd() | EXECUTED AT THE END OF PLAY LIST |
| chapter | onChapter() | EXECUTED UPON DETECTION OF CHAPTER MARK |
| angleChange | onAngleChange() | EXECUTED UPON DESIGNATION OF ANGLE CHANGE OF USER OPERATION |
| audioChange | onAudioChange() | EXECUTED UPON DESIGNATION OF AUDIO CHANGE OF USER OPERATION |
| subtitleChange | onSubtitleChange() | EXECUTED UPON DESIGNATION OF SUBTITLE CHANGE OF USER OPERATION |

Fig. 14

| EVENT NAME | CORRESPONDING EVENT HANDLER NAME | CONTENTS |
|---|---|---|
| menu | onMenu() | JUMPED TO MENU |
| exit | onExit() | EVENT ISSUED FROM NATIVE IMPLEMENTATION PLATFORM AT THE END OF UMD VIDEO APPLICATION BY NATIVE IMPLEMENTATION PLATFORM. |
| resourceChanged | onResourceChanged() | PROCESS AFTER RESOURCE SWITCHING IS DESCRIBED |
| autoPlay, continuePlay | onAutoPlay(), onContinuePlay() | START EXECUTION OF SCRIPT |

Fig. 17

```
Controller.onAutoPlay = function(){
    //Play PlayList # 1 FBI warning.
    movieplayer.play(1);
} movieplayer.onPlayListEnd = function(event_info){
    if(event_info.playListNumber == 1){
        // play feature film after FBI warning ends.
        movieplayer.play(2);
    }else{
        // transit to top menu after feature film ends.
        resource.pagetable["top_menu"].open();
    }
}

Controller.onMenu = function(){
    // transfer to top menu with display menu user operation.
    resource.pagetable["top_menu"].open();
} movieplayer.onMark = function(event_info){
    //display dialog when event mark encountered.
    if(event_info.mark_data == 1){
        resource.pagetable["dialog_window_1"].open();
    }
    ...
}
```

Fig. 19

| SYNTAX | NUMBER OF BITS | MNEMONIC |
|---|---|---|
| "PLAYLIST.DAT" { | | |
|     name_length | 8 | uimsbf |
|     name_string | 8*255 | bslbf |
|     number_of_PlayLists | 16 | uimsbf |
|     for(i=0; i<number_of_PlayLists; i++){ | | |
|         PlayList(){ // A PlayList() | | |
|             PlayList_data_length | 32 | uimsbf |
|             // ATTRIBUTE INFORMATION | | |
|             reserved_for_word_alignment | 15 | bslbf |
|             capture_enable_flag_PlayList | 1 | bslbf |
|             PlayList_name_length | 8 | uimsbf |
|             PlayList_name_string | 8*255 | bslbf |
|             // | | |
|             number_of_PlayItems | 16 | uimsbf |
|             for (i=0; i<number_of_PlayItems; i++) { | | |
|                 PlayItem() | | |
|             } | | |
|             PlayListMark() | | |
|         } | | |
|     } | | |
| } | | |

Fig. 20

| SYNTAX | NUMBER OF BITS | MNEMONIC |
|---|---|---|
| PlayItem() { | | |
|     length | 16 | uimsbf |
|     Clip_Information_file_name_length | 16 | uimsbf |
|     Clip_Information_file_name | 8*Clip_Information_file_name_length | bslbf |
|     reserved_for_word_alignment | 15 | bslbf |
|     IN_time | 33 | uimsbf |
|     reserved_for_word_alignment | 15 | bslbf |
|     OUT_time | 33 | uimsbf |
| } | | |

Fig. 21

| SYNTAX | NUMBER OF BITS | MNEMONIC |
|---|---|---|
| PlayListMark() { | | |
|     length | 32 | uimsbf |
|     number_of_PlayList_marks | 16 | uimsbf |
|     for(i=0; i < number_of_PlayList_marks; i++) { | | |
|         Mark(){ | | |
|             mark_type | 8 | uimsbf |
|             mark_name_length | 8 | uimsbf |
|             ref_to_PlayItem_id | 16 | uimsbf |
|             reserved_for_word_alignment | 15 | bslbf |
|             mark_time_stamp | 33 | uimsbf |
|             entry_ES_stream_id | 8 | uimsbf |
|             entry_ES_private_stream_id | 8 | uimsbf |
|             mark_data | 32 | bslbf |
|             mark_name_string | 8*24 | bslbf |
|         } | | |
|     } | | |
| } | | |

*Fig. 22*

| mark_type | STREAM CODING |
|---|---|
| 0 | RESERVE |
| 1 | CHAPTER MARK |
| 2 | EVENT MARK |
| 3-255 | RESERVE |

Fig. 24

| SYNTAX | NUMBER OF BITS | MNEMONIC |
|---|---|---|
| XXXXX.CLP{ | | |
|     reserved_for_word_alignment | 15 | bslbf |
|     presentation_start_time | 33 | uimsbf |
|     reserved_for_word_alignment | 15 | bslbf |
|     presentation_end_time | 33 | uimsbf |
|     reserved_for_word_alignment | 7 | bslbf |
|     capture_enable_flag_Clip | 1 | bslbf |
|     number_of_streams | 8 | uimsbf |
|     for (i = 0;i < number_of_streams;i++) { | | |
|         StreamInfo(){ | | |
|             length | 16 | uimsbf |
|             stream_id | 8 | uimsbf |
|             private_stream_id | 8 | uimsbf |
|             StaticInfo() | | |
|             reserved_for_word_alignment | 8 | bslbf |
|             number_of_DynamicInfo | 8 | uimsbf |
|             for (j = 0;j < number_of_DynamicInfo;j++) { | | |
|                 reserved_for_word_alignment | 15 | bslbf |
|                 pts_change_point | 33 | uimsbf |
|                 DynamicInfo() | | |
|             } | | |
|         }//end of oneStreamInfo | | |
|     } | | |
|     EP_map() | | |
| } | | |

*Fig. 25*

| KIND OF ELEMENTARY STREAM | stream_id | private_stream_id |
|---|---|---|
| VIDEO | 0xE0-0xEF | (NONE) |
| ATRAC AUDIO | 0xBD | 0x00-0x0F |
| LPCM AUDIO | 0xBD | 0x10-0x1F |
| SUBTITLE | 0xBD | 0x80-0x9F |

Fig. 26

| SYNTAX | NUMBER OF BITS | MNEMONIC |
|---|---|---|
| StaticInfo() { | | |
|     if (stream == VIDEO ) { | | |
|         reserved_for_word_alignment | 16 | bslbf |
|         picture_size | 4 | uimsbf |
|         frame_rate | 4 | uimsbf |
|         reserved_for_word_alignment | 7 | bslbf |
|         cc_flag | 1 | bslbf |
|     } else if (stream == AUDIO ) { | | |
|         audio_language_code | 16 | bslbf |
|         channel_configuration | 8 | uimsbf |
|         reserved_for_word_alignment | 3 | bslbf |
|         lfe_existence | 1 | bslbf |
|         sampling_frequency | 4 | uimsbf |
|     } else if (stream == SUBTITLE) { | | |
|         subtitle_language_code | 16 | bslbf |
|         reserved_for_word_alignment | 15 | bslbf |
|         configurable_flag | 1 | uimsbf |
|     } | | |
| } | | |

*Fig. 27*

| SYNTAX | NUMBER OF BITS | MNEMONIC |
|---|---|---|
| DynamicInfo(i,j) { | | |
|     reserved_for_word_alignment | 8 | bslbf |
|     if (stream == VIDEO){ | | |
|         reserved_for_word_alignment | 4 | bslbf |
|         display_aspect_ratio | 4 | uimsbf |
|     } else if (stream == AUDIO ) { | | |
|         reserved_for_word_alignment | 4 | bslbf |
|         channel_assignment | 4 | uimsbf |
|     } else if ( stream == SUBTITLE) { | | |
|         reserved_for_word_alignment | 8 | bslbf |
|     } | | |
| } | | |

Fig. 28

| SYNTAX | NUMBER OF BITS | MNEMONIC |
|---|---|---|
| EP_map(){ | | |
|     reserved_for_word_alignment | 8 | bslbf |
|     number_of_stream_id_entries | 8 | uimsbf |
|     for (k=0; k<number_of_stream_id_entries; k++) { | | |
|         stream_id | 8 | bslbf |
|         private_stream_id | 8 | bslbf |
|         number_of_EP_entries | 32 | uimsbf |
|         for (i=0; i<number_of_EP_entries; i++) { | | |
|             reserved_for_word_align | 15 | bslbf |
|             PTS_EP_start | 33 | uimsbf |
|             RPN_EP_start | 32 | uimsbf |
|         } | | |
|     } | | |
| } | | |

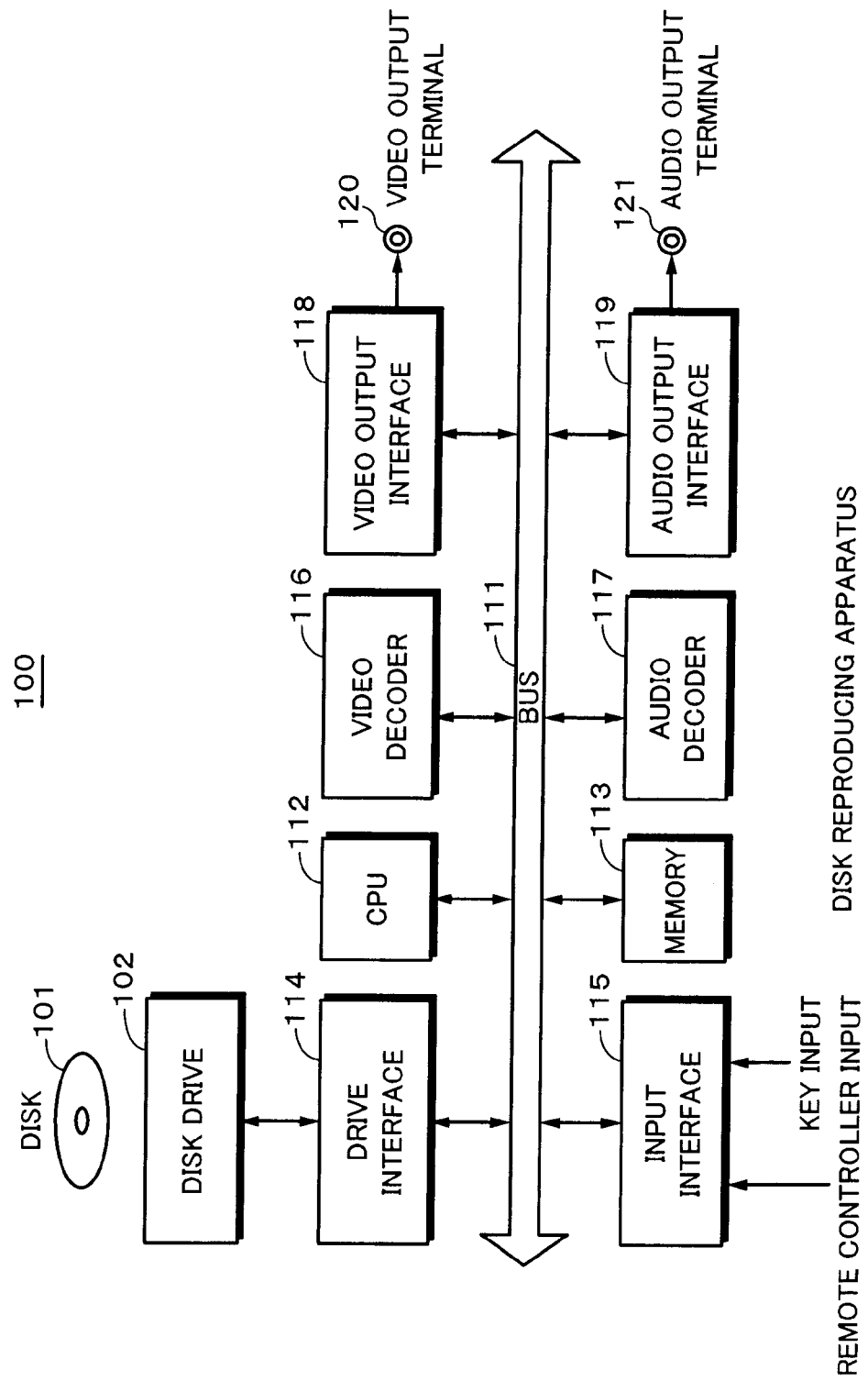

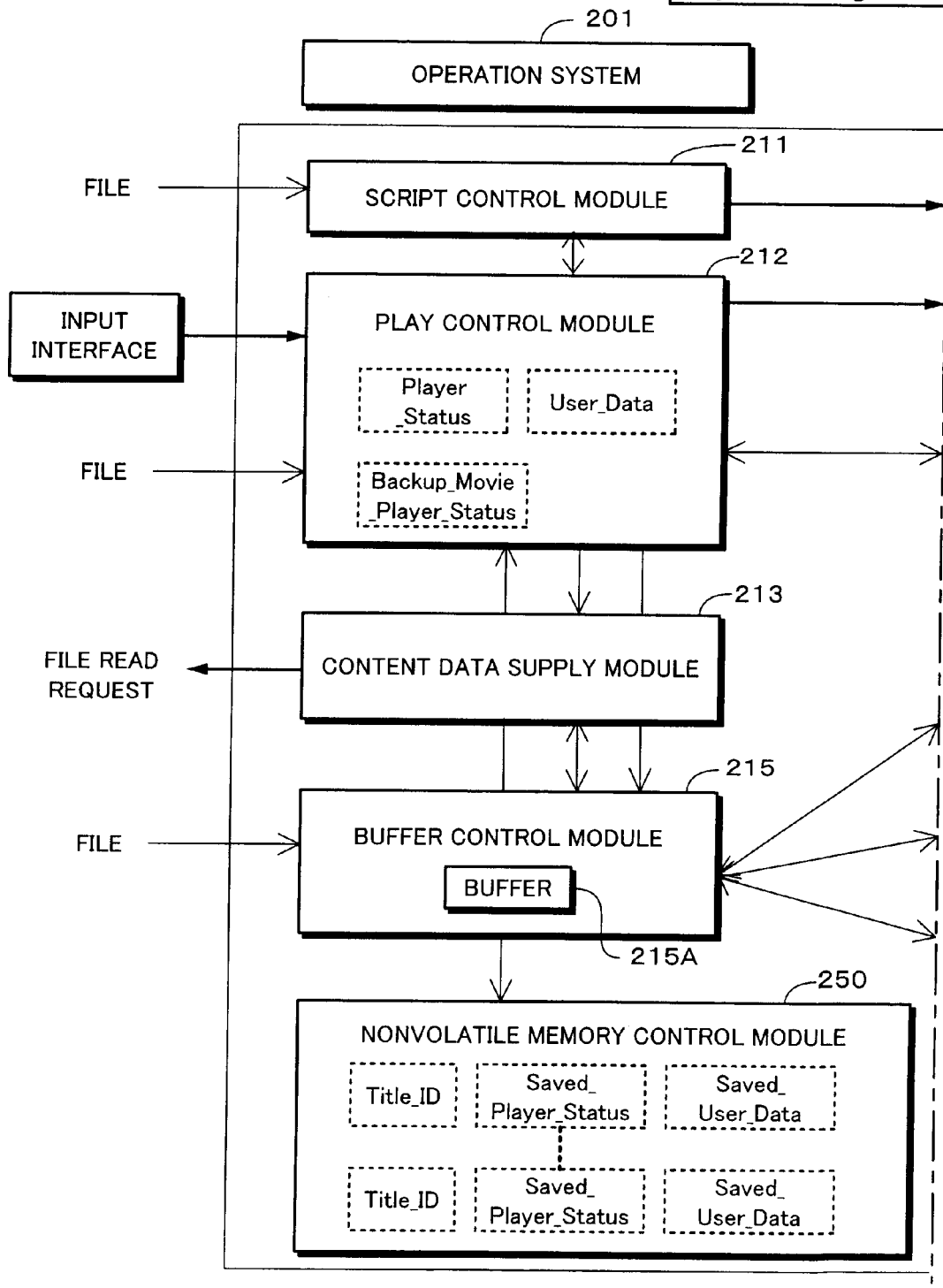

Fig. 32

| CURRENT STATE | | STATE AFTER METHOD EXECUTION | | | |
|---|---|---|---|---|---|
| | | MENU | NORMAL | MENU | NORMAL |
| | | STOP | STOP | PLAY | PLAY |
| MENU | STOP | stop(), resume() | stop() | play() | play(), resume() |
| NORMAL | STOP | stop() | stop(), resume() | play() | play(), resume() |
| MENU | PLAY | stop() | stop() | play(), resume() | play(), resume() |
| NORMAL | PLAY | stop() | stop() | play() | play(), resume() |

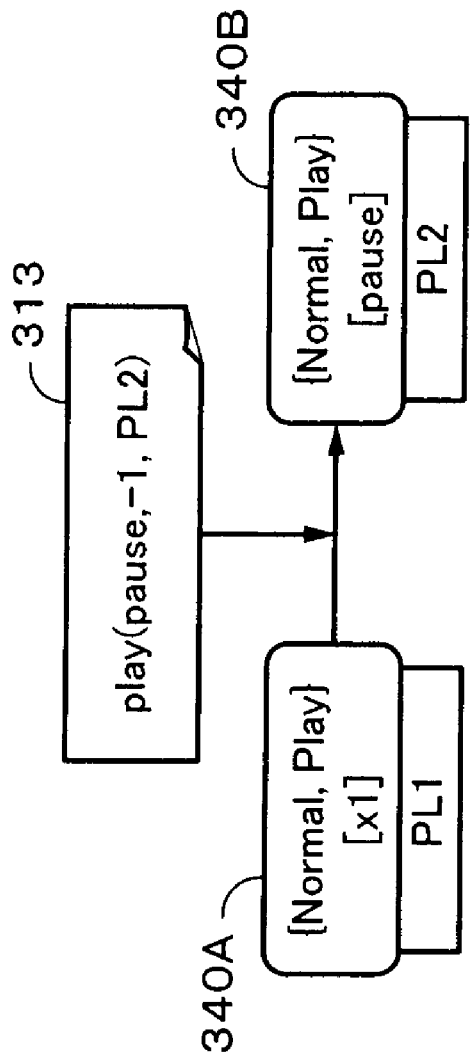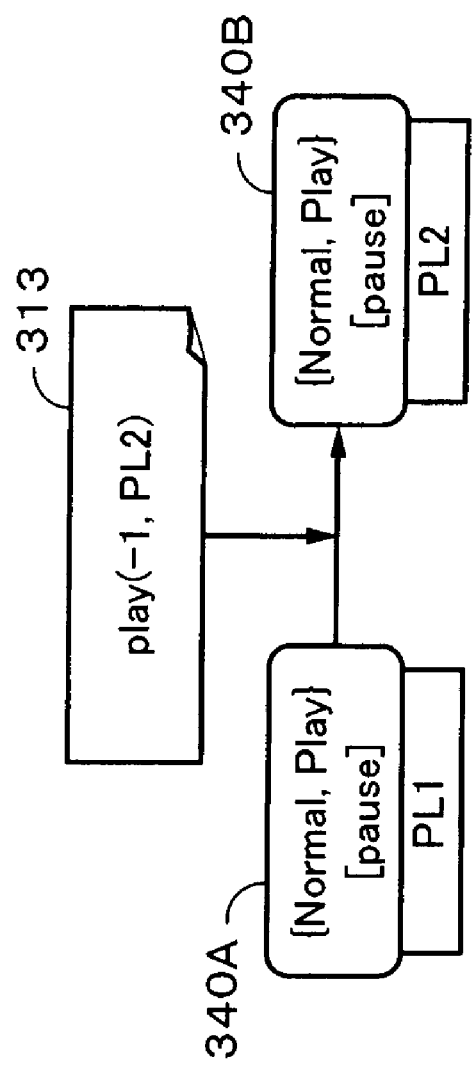
Fig. 33D
Fig. 33E

Fig. 35

| PLAY LIST REPRODUCING METHOD | OPERATION AT START AND END POINTS OF PLAY LIST |
|---|---|
| FORWARD | UPON ARRIVAL AT END OF PLAY LIST, PAUSE AND CONTINUE DISPLAY OF LAST PICTURE OF PLAY LIST. (LAST PICTURE OF PLAY LIST, EVEN IF FAILING TO CORRESPOND TO JUMP POINT, IS DISPLAYED DURING HIGH SPEED REPRODUCTION) |
| REVERSE | UPON ARRIVAL AT HEAD OF PLAY LIST, PAUSE. |

Fig. 40

| CURRENT STATE | | STATE AFTER METHOD EXECUTION | | | | |
|---|---|---|---|---|---|---|
| | | MENU | NORMAL | MENU | NORMAL | |
| | | STOP | STOP | PLAY | PLAY | |
| MENU | STOP | | — | — | — | |
| NORMAL | STOP | — | | — | — | |
| MENU | PLAY | — | — | | — | |
| NORMAL | PLAY | TRANSIT AND BACKUP WITH stop() | TRANSIT AND BACKUP WITH stop() | TRANSIT AND BACKUP WITH play() | | |

Fig. 42

| CURRENT STATE | | STATE AFTER METHOD EXECUTION | | | |
|---|---|---|---|---|---|
| | | MENU | NORMAL | MENU | NORMAL |
| | | STOP | STOP | PLAY | PLAY |
| MENU | STOP | – | – | – | TRANSIT, RESTORE AND DISCARD WITH resume() |
| NORMAL | STOP | – | – | – | TRANSIT, RESTORE AND DISCARD WITH resume() |
| MENU | PLAY | – | – | – | TRANSIT, RESTORE AND DISCARD WITH resume() |
| NORMAL | PLAY | – | – | – | (NOT DEFINED) |

Fig. 43

| CURRENT STATE | | STATE AFTER METHOD EXECUTION | | | |
|---|---|---|---|---|---|
| | | MENU | NORMAL | MENU | NORMAL |
| | | STOP | STOP | PLAY | PLAY |
| MENU | STOP | – | – | – | TRANSIT AND DISCARD WITH Play |
| NORMAL | STOP | – | – | – | TRANSIT AND DISCARD WITH Play |
| MENU | PLAY | – | – | – | TRANSIT AND DISCARD WITH Play |
| NORMAL | PLAY | – | – | – | (NOT DEFINED) |

Fig. 44

| CURRENT STATE | | STATE AFTER METHOD EXECUTION | | | |
|---|---|---|---|---|---|
| | | MENU | NORMAL | MENU | NORMAL |
| | | STOP | STOP | PLAY | PLAY |
| MENU | STOP | DISCARD IF resumeInfoClearFlag=True | DISCARD IF resumeInfoClearFlag=True | — | — |
| NORMAL | STOP | DISCARD IF resumeInfoClearFlag=True | DISCARD IF resumeInfoClearFlag=True | — | — |
| MENU | PLAY | DISCARD IF resumeInfoClearFlag=True | DISCARD IF resumeInfoClearFlag=True | — | — |
| NORMAL | PLAY | DISCARD IF resumeInfoClearFlag=True | DISCARD IF resumeInfoClearFlag=True | — | — |

Fig. 46

| STATE OF PLAYER STATUS | DESCRIPTION |
|---|---|
| GENERATE | AT THE TIME OF GENERATION OF MOVIE PLAYER, PLAYER STATUS IS ALSO GENERATED. AT TIME OF GENERATION, PLAYER STATUS IS INITIALIZED, AND PROPERTY INDICATING STATE OF MOVIE PLAYER INDICATES STOP STATE, AND OTHER PROPERTIES ARE NOT DEFINITE. |
| VALUE CHANGE | (1) CONTENTS OF PLAYER STATUS CHANGE WITH REPRODUCTION STATE<br>(2) WHEN CONTENTS OF RESUME INFORMATION ARE RESTORED |
| READ VALUE BY METHOD | CAN BE READ BY METHOD getPlayerStatus() |
| EXTINGUISHED | WHEN MOVIE PLAYER ENDS OR IS EXTINGUISHED |

| Fig. 47A |
|----------|
| Fig. 47B |

| STATE OF RESUME INFORMATION | DESCRIPTION |
|---|---|
| GENERATE | WHEN MOVIE PLAYER OBJECT IS GENERATED, MEMORY AREA OF RESUME INFORMATION IS SECURED, AND INITIALIZED AT THE SAME TIME AS GENERATION. UPON INITIALIZATION, THE CONTENTS OF THE RESUME INFORMATION ARE DISCARDED. UMD VIDEO PLAYER WITH NONVOLATILE MEMORY MOUNTED THEREON LOADS RESUME INFORMATION FROM NONVOLATILE MEMORY WHEN INITIALIZING MOVIE PLAYER. AT THE SAME TIME, USER DATA IS LOADED. |
| WRITE (PLAYER STATUS BACKUP) | WHEN MOVIE PLAYER TRANSITS FROM [Normal.Play] TO ANOTHER STATE, PLAYER STATUS IS BACKED UP IN RESUME INFORMATION. |
| CHANGE | PARAMETERS RELATED TO STREAM SUCH AS videoNumber, audioNumber, audioFlag, subtitleNumber, AND subtitleFlag CAN BE CHANGED BY changeResumeInfo(). |
| DISCARD (1) | WHEN PLAY LIST REPRODUCTION IS STARTED IN NORMAL MODE, THE CONTENTS OF RESUME INFORMATION ARE DISCARDED. THE RESUME INFORMATION MAY OR MAY NOT BE RESTORED BEFORE DISCARD. |

Fig. 47B

| | |
|---|---|
| DISCARD (2) | UPON EXECUTION OF METHOD stop() OF resumeInfoClearFlag=True, THE CONTENTS OF RESUME INFORMATION ARE DISCARDED. |
| RESTORE PLAYER STATUS | RESTORED UPON EXECUTION OF METHOD resume() IN THE PRESENCE OF RESUME INFORMATION. |
| READ VALUE BY METHOD | VALUE CAN BE READ BY METHOD getResumeInfo() FROM SCRIPT. ONCE DISCARDED RESUME INFORMATION IS READ, playStatus=0 IS RESTORED, AND THEREFORE, PRESENCE OR ABSENCE OF RESUME INFORMATION CAN BE DISCRIMINATED. |
| EXTINGUISHED | AT END (UPON EXTINCTION) OF MOVIE PLAYER, RESUME INFORMATION IS ALSO EXTINGUISHED. THE UMD VIDEO PLAYER WITH NONVOLATILE MEMORY MOUNTED THEREON SAVES RESUME INFORMATION IN NONVOLATILE MEMORY AT END (UPON EXTINCTION) OF MOVIE PLAYER, WHILE AT THE SAME TIME SAVING USER DATA. |

Fig. 48

| STATE OF USER DATA | DESCRIPTION |
|---|---|
| GENERATE | WHEN MOVIE PLAYER OBJECT IS GENERATED, MEMORY AREA OF RESUME INFORMATION IS SECURED, AND INITIALIZED AT THE SAME TIME AS GENERATION. UPON INITIALIZATION, THE CONTENTS OF USER DATA ARE CLEARED. (ARRANGEMENT OF LENGTH 0 IS RESTORED BY getUserData().) UMD VIDEO PLAYER WITH NONVOLATILE MEMORY MOUNTED THEREON LOADS USER DATA FROM NONVOLATILE MEMORY WHEN INITIALIZING MOVIE PLAYER. AT THE SAME TIME, RESUME INFORMATION IS LOADED. |
| WRITE | WRITTEN UPON EXECUTION OF METHOD setUserData(). Int ARRANGEMENT HAVING MAXIMUM LENGTH OF 64 IS HELD IN USER DATA BY METHOD setUserData(). |
| READ | CAN BE READ BY METHOD getUserData(). WHEN USER DATA IS NOT SET, ARRANGEMENT OF LENGTH 0 IS RESTORED. |
| CLEAR CONTENTS | NO METHOD TO CLEAR CONTENTS OF USER DATA FROM SCRIPT. CONTENTS CAN BE REWRITTEN BY OVERWRITE. |
| EXTINGUISHED | AT END (UPON EXTINCTION) OF MOVIE PLAYER, USER DATA IS ALSO EXTINGUISHED. UMD VIDEO PLAYER HAVING NONVOLATILE MEMORY MOUNTED THEREON SAVES USER DATA IN NONVOLATILE MEMORY AT END (UPON EXTINCTION) OF MOVIE PLAYER. AT THE SAME TIME, RESUME INFORMATION IS SAVED. |

REPRODUCING APPARATUS, REPRODUCING METHOD, REPRODUCING PROGRAM, RECORDING MEDIUM, AND DATA STRUCTURE

TECHNICAL FIELD

This invention relates to a reproducing apparatus, a reproducing method, a reproducing program, a recording medium and a data structure in which the reproduction of a program recorded in a large-capacity recording medium can be easily controlled.

BACKGROUND ART

It is a long time since the DVD (digital versatile disc) appeared as a random-access and removable recording medium. In recent years, a disk-shaped recording medium larger in capacity and more convenient to carry than DVD has been under development.

A DVD-Video has been laid down as a standard for recording video contents in DVD. According to DVD-Video, the DVD player in disk reproduction operation can assume various states. In DVD-Video, the state that can be assumed by the DVD player are classified into five types of what is called domains, and a model in which transition is made between the domains according to various conditions is used in the DVD player. Specifically, the DVD domains can be regarded as state variables having five possible values. The DVD player monitors the state variables to grasp the type of the contents being read from the disk.

The following five types of domains are defined in DVD-Video:
(1) First play domain (FP_DOM)
(2) Video manager menu domain (VMGM_DOM)
(3) Video title set menu domain (VTSM_DOM)
(4) Title domain (TT_DOM)
(5) Stop state Incidentally, the stop state in (5) is not the domain in real terms.

The first play domain in (1) is defined as the first section of the disk and the preparatory state for reproduction in the DVD player. No-reproduction command is considered valid. The video manager menu domain in (2) is defined as the main menu on the whole disk or the whole disk surface and indicative of the display of the title menu. The command related to the menu is considered valid. The video title set menu domain in (3) is defined as the menu or the submenu (sub-picture, language, audio or angle) of the title or the title group and indicative of the root menu or submenu. The title domain in (4) is defined as the video contents in the title and the reproduction command is considered valid. The stop state in (5) is defined as the state in which the head has left the position for disk reproduction and returned to the original position, and the reproduction command is considered valid.

The navigation command for controlling the operation of the DVD player is limited by the domain used for the current state. The SELECT BUTTON command for selecting a predetermined item from the menu, for example, is significant as long as the menu is displayed. Specifically, the SELECT BUTTON command is significant in either state of the video manager menu domain of (2) or the video title set menu domain of (3). The FAST FEED command designating the video reproduction higher in speed than the normal unity speed, for example, is not significant as long as the player is stationary or the menu screen configured with a still image is on display. In other words, the FAST FEED command is significant in the title domain.

These domains of DVD-Video are described in, for example, "Jim Taylor: New Book on DVD Anatomy, 1st edition, Nexus Intercom Ltd., Jun. 7, 2003, p. 271" (Non-Patent Document 1).

The conventional DVD-Video described above has many domain types and detailed conditions for state transition between the domains, thereby posing the problem that it cannot be easily mounted on the DVD player.

Another problem is that unless the transition between the domains is fully understood, the disk production is impossible and it is difficult for the content producer to produce the disk. Specifically, due to the many domain types and the detailed conditions for transition between the domains, the transition between domains cannot be fully grasped. This imposes a heavy burden on the producer in producing the disk of a complicated configuration.

Further, the domain name and the actual operating method are not always coincident with each other, and therefore, the necessity of the significance of existence of the domains is small. This poses the problem that the many domain types, coupled with the detailed conditions for transition between the domains, constitute a factor for increasing the burden of disk production on the part of the producer.

In the DVD-Video, for example, as described above, the title domain and two types of menu domains (the video manager menu domain and the video title set menu domain) are defined. Originally, the main content (such as the original story of the movie) recorded in DVD should be reproduced in the title domain. Actually, however, the reproduction of the original story of the movie in the menu domain poses no problem. Although commands are different for transition between domains, however, the player operation is not different between the menu domain and the title domain after state transition to these domains. This is by reason of the fact that both the menu reproduction in the menu domain and the reproduction of the original story of the movie in the title domain are realized by a common logic structure called PGC (program chain) with the content data and the related reproduction control program combined.

This poses the problem that the otherwise free content production is restricted. Specifically, the determination of a given content as a menu or a title somewhat depends on the subjective viewpoint of the disk producer. Assuming that in the case where the original story of the currently reproduced movie has branches, for example, the contents employing the interactiveness is conceived by displaying the select button to select any one of the branches. In this case, the method using the conventional DVD-Video is ambiguous as to which, the menu domain or the title domain, is to be used for reproducing the contents displayed by the select button. In the case where it is desired to prepare, after the particular content, a content having interactiveness, for example, the state transition is hard to predict and the operation is liable to be difficult to verify.

DISCLOSURE OF THE INVENTION

Accordingly, it is an object of this invention to provide a reproducing apparatus, a reproducing method, a reproducing program, a recording medium and a data structure in which the state transition of the player operation is positively defined and the production of the interactive contents facilitated.

To solve the above-described problems, the invention as recited in claim 1 is a reproducing apparatus for reproducing content data recorded in a recording medium, including: read means for reading data from a recording medium having recorded therein content data including at least one of a video stream and an audio stream and a reproduction control program for controlling the reproduction of the content data; player means for reproducing the content data in accordance with the reproduction control program; and control command output means for giving a control command corresponding to a user operation to the player means, characterized in that the player means controls the reproduction of the content data based on four states defined by combinations of two states classified according to whether the content data is reproduced or not and two states classified according to whether the control command from the control command output means is accepted or not.

The invention as recited in claim 12 is a reproducing method for reproducing content data recorded in a recording medium, characterized in that the reproduction of content data by player means in accordance with a reproduction control program read from the recording medium having recorded therein the content data including at least one of a video stream and an audio stream and the reproduction control program for controlling the reproduction of the control data, is controlled based on four states of the player means defined by combinations of two states classified according to whether the content data is reproduced or not and two states classified according to whether the control command corresponding to a user operation is accepted or not.

One embodiment of the invention includes a reproducing program for causing a computer system to execute a reproducing method for reproducing content data recorded in a recording medium, characterized in that the reproducing method is such that the reproduction of content data by player means in accordance with a reproduction control program read from a recording medium having recorded therein the content data including at least one of a video stream and an audio stream and the reproduction control program for controlling the reproduction of the content data, is controlled based on four states of the player means defined by combinations of two states classified according to whether the content data is reproduced or not and two states classified according to whether the control command corresponding to a user operation is accepted or not.

The invention as recited in claim 14 is a computer-readable recording medium having recorded therein a reproducing program for causing a computer system to execute a reproducing method for reproducing content data recorded in a recording medium, characterized in that the reproducing method is such that the reproduction of content data by player means in accordance with a reproduction control program read from a recording medium having recorded therein the content data including at least one of a video stream and an audio stream and the reproduction control program for controlling the reproduction of the content data, is controlled based on four states of the player means defined by combinations of two states classified according to whether the content data is reproduced or not and two states classified according to whether the control command corresponding to a user operation is accepted or not.

One embodiment of the invention includes a computer-readable recording medium having recorded therein content data including at least one of a video stream and an audio stream and a reproduction control program for causing player means to control the reproduction of the content data, characterized in that the reproduction control program is executed in such a manner that the player means for controlling the reproduction of the content data is instructed to control the reproduction of the content based on four state defined by combinations of two states classified according to whether the content data is reproduced or not and two states classified according to whether the control command corresponding to a user operation is accepted or not.

The invention as recited in claim 18 is a data structure comprising content data including at least one of a video stream and an audio stream and a reproduction control program for causing player means to control the reproduction of the content data, characterized in that the reproduction control program is executed in such a manner that the reproduction of the content is controlled by giving a reproduction control instruction to the player means for controlling the reproduction of the content data based on four states defined by combinations of two states classified according to whether the content data is reproduced or not and two states classified according to whether the control command corresponding to a user operation is accepted or not.

One embodiment of the invention includes a reproducing apparatus for reproducing content data recorded in a recording medium, including: a read unit for reading data from a recording medium having recorded therein content data including at least one of a video stream and an audio stream and a reproduction control program for controlling the reproduction of the content data; a player unit for playing the content data in accordance with the reproduction control program; and a control command output unit for giving a control command corresponding to a user operation to the player unit, characterized in that the player unit controls the reproduction of the content data based on four states defined by combinations of two states classified according to whether the content data is reproduced or not and two states classified according to whether the control command from the control command output unit is accepted or not.

As described above, according to one embodiment of the invention, the reproduction of the content data performed by the player means in accordance with the reproduction control program read from the recording medium having recorded therein the content data including at least one of the video stream and the audio stream and the reproduction control program for controlling the reproduction of the content data is controlled based on four states of the player means defined by combinations of two states classified according to whether the content data is reproduced or not and two states classified according whether the control command corresponding to the user operation is accepted or not. Therefore, the number of the states of the player means is reduced and the understanding of the operation of state transition is facilitated, thereby facilitating the mounting of the player while at the same time reducing the burden of content production.

According to the invention as recited in claim 15, there is provided the computer readable recording medium having recorded therein the content data including at least one of the video stream and the audio stream and the reproduction control program for the player means to control the reproduction of the content data, wherein the reproduction control program gives a reproduction control instruction to the player means for controlling the reproduction of the content data based on four states defined by combinations of two states classified according to whether the content data is reproduced or not and two states classified according to whether the control command corresponding to the user operation is accepted or not thereby to control the content reproduction. Therefore, even the content requiring the complicated control operation can be easily produced.

According to the invention as recited in claim 18, there is provided the data structure including the content data including at least one of the video stream and the audio stream and the reproduction control program for the player means to control the content data reproduction, wherein a reproduction control instruction is given to the player means for controlling the content data reproduction based on four states defined by combinations of two states classified according to whether the content data is reproduced or not and two states classified according to whether the control command corresponding to the user operation is accepted or not thereby to control the content reproduction. Therefore, even a content requiring a complicated control operation can be easily produced and provided as a data structure.

According to this invention, the state of the movie player for reproducing the play list are defined including two states, i.e. a stop state and a play state from the viewpoint of play list reproduction and two states, i.e. a normal mode and a menu mode based on whether a control command corresponding to a user operation is accepted or not, and the play list reproduction is controlled by state transition among these four states. As a result, the invention has the advantage that the reproduction of the AV stream can be controlled from a script program.

Another advantage is that the number of states of the movie player is small, and the state definition is clear. Thus, the conditions for generating the state transition and the operation of generating the state transition are easily understood, thereby facilitating the mounting of the player for reproducing the AV stream.

Further, the number of states of the movie player is small, and the state definition is clear. Therefore, the conditions for generating the state transition and the operation for generating the state transition are easily understood, thereby making it easier for the content producer to produce the contents having the interactiveness.

BRIEF DESCRIPTION OF THE DRAWINGS

FIG. 4 is a diagram for explaining a play state and a stop state of the movie player;

FIGS. 7A and 7B are schematic diagrams showing a list of exemplary properties held by a movie player object;

FIG. 8 is a schematic diagram showing a list of exemplary methods for the movie player object;

FIG. 9 is a schematic diagram showing an exemplary key input operation by the user;

FIG. 10 is a schematic diagram showing an exemplary key input operation by the user;

FIGS. 11A, 11B and 11C are schematic diagrams showing an exemplary control command corresponding to the key input;

FIG. 12 is a schematic diagram showing an exemplary event corresponding to the key input;

FIG. 13 is a schematic diagram showing an exemplary event handler;

FIG. 14 is a schematic diagram showing the exemplary event handler;

FIG. 17 is a schematic diagram showing the exemplary script program;

FIG. 19 is a schematic diagram showing an exemplary syntax indicating the entire structure of a file "PLAYLIST.DAT";

FIG. 20 is a schematic diagram showing an exemplary internal structure of a block "PlayItem( )";

FIG. 21 is a schematic diagram showing an exemplary internal structure of a block "PlayListMark( )";

FIG. 22 is a diagram for explaining a field "mark_type" in a block "Mark( )";

FIG. 24 is a schematic diagram showing an exemplary syntax indicating the entire structure of a clip AV stream file "XXXXX.CLP";

FIG. 25 is a diagram for explaining a relation of a block "StreamInfo( )" to an elementary stream;

FIG. 26 is a schematic diagram showing an exemplary internal structure of a block "StaticInfo( )";

FIG. 27 is a schematic diagram showing an exemplary internal structure of a block "DynamicInfo( )";

FIG. 28 is a schematic diagram showing an exemplary internal structure of a block "EP_map( )";

FIG. 29 is a block diagram schematically showing an exemplary configuration of a disk reproducing apparatus to which the invention can be applied;

FIGS. 30A and 30B are function block diagrams for explaining the operation of the disk reproducing apparatus in more detail;

FIG. 32 is a schematic diagram showing a current state and a state after state transition by the methods combined into each of the four states of the movie player;

FIGS. 33A, 33B, 33C, 33D and 33E are schematic diagrams for explaining an example of state transition of the movie player upon execution of a method "play( )";

FIG. 35 is a schematic diagram showing an exemplary operation of the movie player upon arrival at the starting and ending points of a play list during the play list reproduction;

FIG. 40 is a schematic diagram for explaining the backup of the player status;

FIG. 42 is a schematic diagram for explaining the restoration and discard of the resume information;

FIG. 43 is a schematic diagram for explaining the restoration and discard of the resume information;

FIG. 44 is a schematic diagram for explaining the restoration and discard of the resume information;

FIG. 46 is a schematic diagram showing an exemplary life cycle of the player status;

FIGS. 47A and 47B are schematic diagrams showing an exemplary life cycle of the resume information; and FIG. 48 is a schematic diagram showing an exemplary life cycle of user data.

BEST MODE FOR CARRYING OUT THE INVENTION

Figure 1:
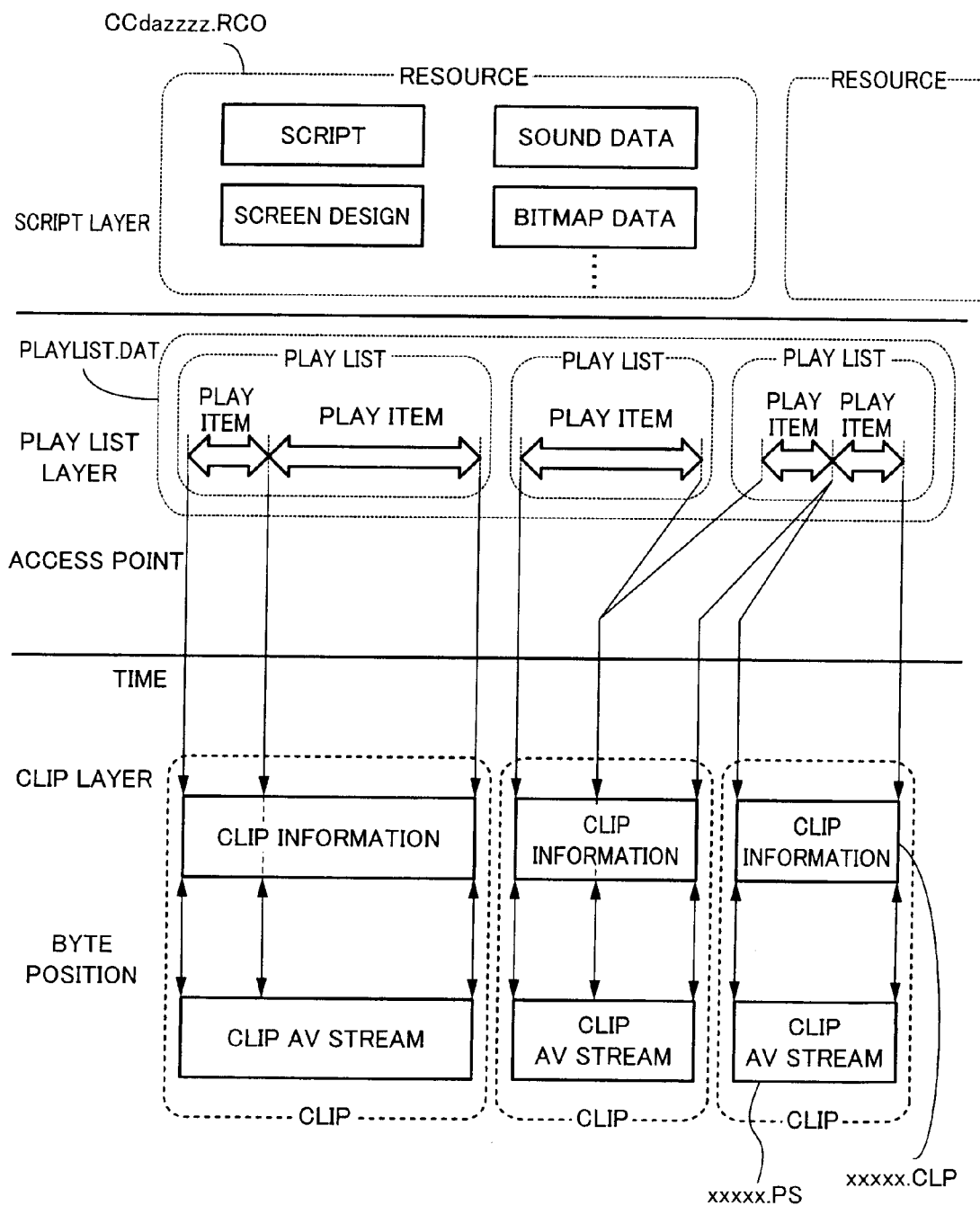
FIG. 1 is a schematic diagram showing a layer structure of a UMD video standard.

An embodiment of the invention will be explained below in the following order:
1. UMD video standard
2. Player model of UMD video standard
3. Event model of the movie player
4. Movie player object
5. Example of script program
6. File management structure
7. Disk reproducing apparatus
8. State transition model of movie player
8-1 Definition of movie player state
8-2 Method of generating the state transition of movie player
8-3 Operation of movie player during play list reproduction
8-4 Reproduction restore function of movie player
8-5 Life cycle of each data 1. UMD Video Standard First, to facilitate the understanding, a system applicable as an embodiment of the invention is briefly explained. According to an embodiment of the invention, a player model is described using a script language called an ECMA script. The ECMA script is a script language for a cross platform based on JavaScript (registered trademark) laid down by ECMA (European Computer Manufacturers Association). The ECMA script is suitably used for the player model according to the invention for its high affinity with an HTML text and the possibility of its own object definition.

Specifically, a conventional DVD-Video uses a non-general-purpose command defined by the DVD-Video standard to describe a control program for realizing an interactive function. The control program is embedded in a plurality of files, at a plurality of points in a data file or distributively in an AV stream file. The conditions for and the order of execution of the control programs thus embedded are defined by the DVD standard.

In such a DVD-Video system, a general-purpose content production system is difficult to construct, and therefore, the story is produced according to a predetermined script, i.e. the contents are produced using a template. In producing a complicated content that cannot be dealt with a template, on the other hand, the first step is to prepare a content production system as a custom made system. According to the embodiment of the invention, this problem is solved by using the ECMA script which is a general-purpose script language high in extensibility to control AV contents.

In the description that follows, a standard based on the embodiment of the invention using the script language based on the ECMA script is called a UMD (Universal Media Disc (registered trademark)) video standard. Also, a portion of the UMD video standard relating to the script is specifically called a UMD video script standard.

The UMD video script will be explained briefly. FIG. 1 shows a layer structure of the UMD video standard. In the UMD video standard, a three-layer structure including a script layer, a play list layer and a clip layer is defined, and the stream management is performed based on this structure.

In the UMD video standard, digitally coded video and audio data and subtitles are handled as a multiplexed MPEG2 stream as a packetized elementary stream of MPEG2 (Moving Pictures Experts Group 2). The elementary stream of the video and audio data and subtitles multiplexed into the MPEG2 stream is called a clip AV stream. The clip AV stream is stored in a clip AV stream file. At the same time as recording a clip AV stream file, the clip information file is prepared in one-to-one correspondence with the clip AV stream file. A set of the clip information file and the corresponding clip AV stream film is called a clip.

The clip is what is called a unit of disk recording, and the order, in which the clip is reproduced, is managed by the play list layer higher than the clip. The play list layer is for designating a clip reproduction path, and includes one or a plurality of play lists. The play list is a mass of play items. The play item includes a set of "In" points and "Out" points indicating a clip reproduction range. By connecting the play items, the clip can be reproduced in an arbitrary order. The play item can be designated by doubling the clips. The "In" and "Out" points of the clip AV stream file are designated by a time stamp (in-clip time), which is converted into a byte position on the clip AV stream by the information in the clip information file.

The play list has only a structure for sequentially reproducing the play items designating the whole or a part of the clips, and the branching of the order of reproduction or the interactiveness with the user using only the play list cannot be realized. According to an embodiment of the invention, a plurality of play lists are collected into a single file "PLAYLIST.DAT".

The script layer is constructed by a UMD video script extended from the ECMA script of the language specification. In the UMD video script, the extension for realizing a function unique to the UMD video is added based on the ECMA script.

The script layer is higher than the play list layer and configured with a play list reproduction instruction and a command string for setting the player. The play list reproduction with the condition branching such as to select any one of the streams prepared for a plurality of languages or to change the reproduction flow to a play list selected according to a certain condition can be realized by a command of the script layer. An example of the application using the play list reproduction with this condition branching is the multistory. This script layer introduces the interactive function with the user.

According to this embodiment of the invention, the script layer is configured with a file called resource file. The resource file includes script data (script program) described based on an actual ECMA script, sound data for outputting an effect sound at the time of button operation, and a screen design having image data used for a background image of a menu screen and image data (bitmap data) for displaying GUI parts such as a button image.

A plurality of the resource files can exist. Also, according to this embodiment of the invention, the resource file is given a file name according to a predetermined naming rule. An extension "RCO" of the file name, for example, indicates that the file is a resource file.

2. Player Model of UMD Video Standard

Next, a model of a reproducing apparatus (player) for reproducing data in accordance with the UMD video standard, i.e. a player model will be explained. The player first reads a resource file, a play list file and a clip information file from a disk, and in accordance with the predetermined order of reproduction, reads a clip AV stream file and reproduces video and audio data and subtitles.

According to the language specification of the script program, a function block for reproducing a play list is mounted as an object in the script program. The object for the play list reproduction is called movie player object according to the UMD video standard. The play list reproduction instruction and the command for setting the player constitutes a method associated with the movie player object. The movie player object is controlled by the method from the script layer. In the process, a function is required to notify a state change and a reproduction position from the movie player object to the script layer. This corresponds to the issue of an event by the movie player object to the script program, and a process corresponding to this event is described as an event handler.

As described above, a model is constructed in which the information is transmitted from the movie player object to the script program by an event and the movie player object is controlled according to the script program by a method, so that the reproduction of the clip AV stream can be controlled by the script program.

Figure 2:
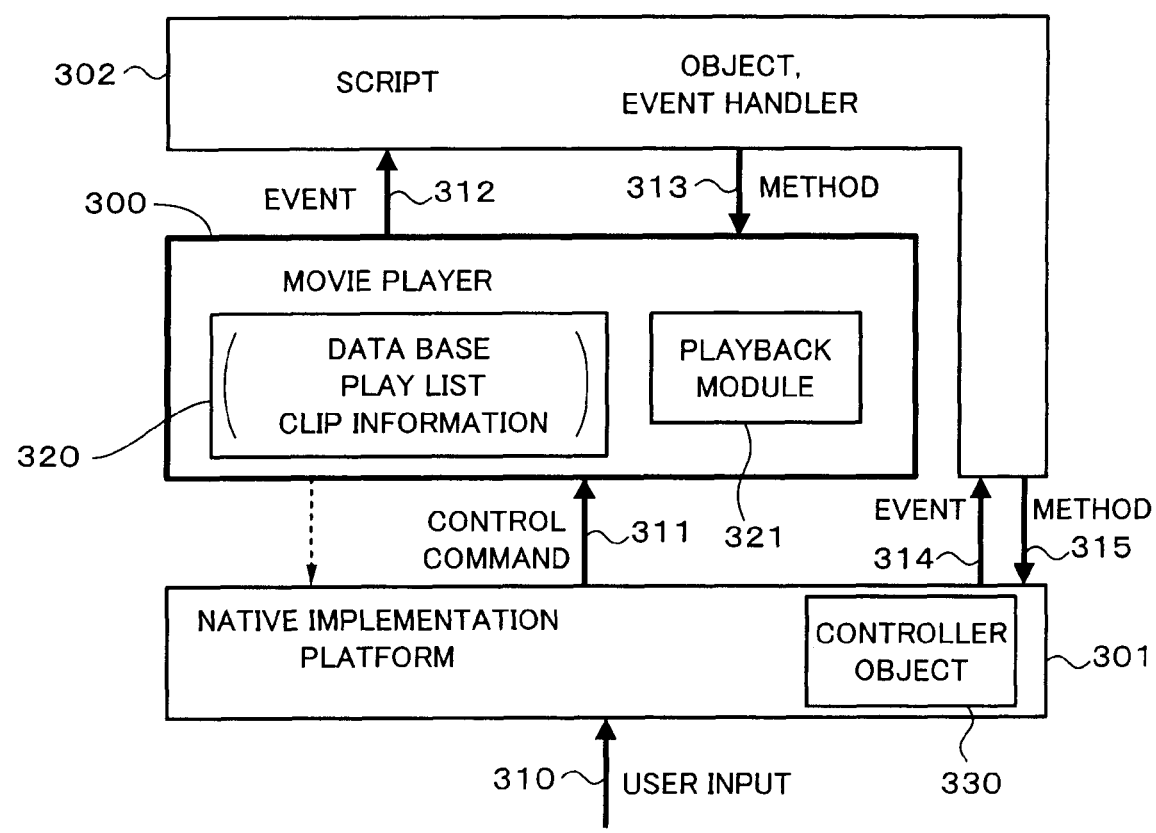
FIG. 2 is a diagram schematically showing an exemplary player model according to an embodiment of the invention.

FIG. 2 schematically shows an exemplary player model according to this embodiment of the invention described above. A movie player 300 is a module taking charge of reproducing the video and audio data and subtitles according to the UMD video standard. The movie player object described above is a movie object formed as an object in the script program to operate the movie object from the script program. In other words, the movie player object is an implementation module for realizing the function of the movie player abstracted into a form that can be handled according to the script program.

Incidentally, the movie player 300 and the movie player object are considered to represent substantially the same object, and therefore, designated by the same reference numeral below.

In FIG. 2, in the movie player 300, a clip AV stream file is read and the clip AV stream thus read is decoded and displayed based on a play list and a database of clip information in accordance with a method from a lower layer (a native implementation platform 301 in the case of FIG. 2) induced by a user input 310 or a script layer 302 constituting a higher layer.

The interior of the movie player object 300 is dependent on the mounting of a UMD video player for playing a UMD video, and API (application programming interface) such as a method and a property is provided as an object in the form of a black box from the script layer 302. The UMD video player indicates an actual device having mounted the movie player thereon. All the UMD video players have a movie player mounted thereon in accordance with the UMD video standard and have the compatibility for reproduction.

As shown in FIG. 2, the movie player object 300 has three input/output paths including a path for receiving a control command 311 from the native implementation platform 301, a path for notifying an event 312 to the script layer 302 and a path for receiving a method 313 from the script layer 302.

The control command 311 controls the operation of the movie player object 300 from the native implementation platform 301. The native implementation platform 301 is, for example, an interface between the parts specific to a device and the movie player 300 in the UMD video player as an actual device. The event 312 is a script event for the script layer 302 from the movie player 300. The method 313 is designated by the movie player 300 from the script program of the script layer 302.

The movie player object 300 includes a database 320 containing a play list of the UMD video standard and clip information therein. The movie player object 300 invalidates (masks) the user input 310 or executes a process for converting a time-designated reproduction position into a byte position in the clip AV stream by using the database 320.

Figure 3:
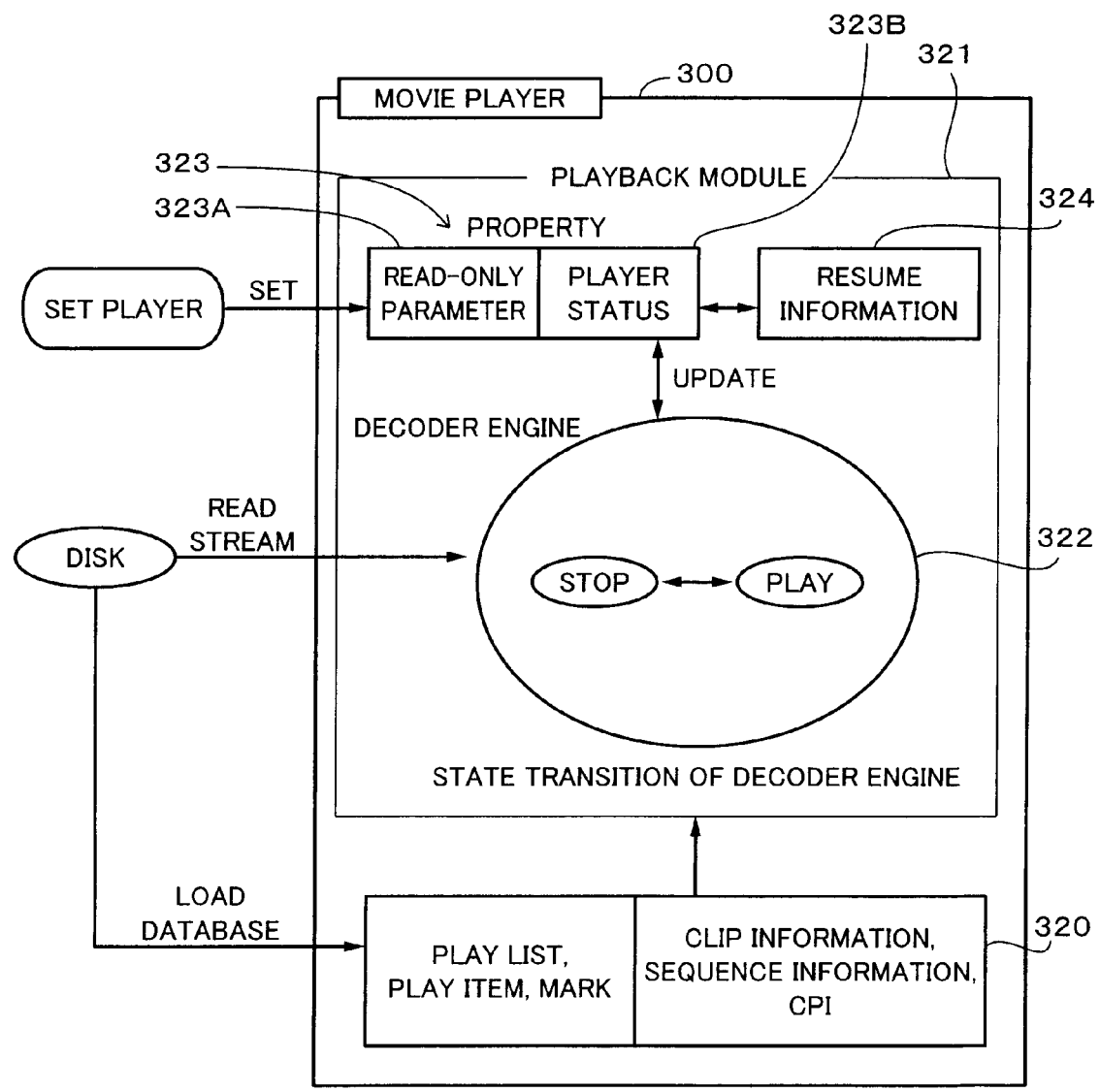
FIG. 3 is a schematic diagram showing the internal configuration of a movie player.

A playback module 321 in the movie player object 300 decodes the clip AV stream constituting the video and audio data and subtitles multiplexed as MPEG2 PS (program stream). The playback module 321 has two states of play and stop and transits between these two states in accordance with the control instruction and the method (FIG. 3). Incidentally, the clip AV stream is not limited to the MPEG2 PS. MPEG2 TS (transport stream), for example, if used as a clip AV stream, can also be handled in similar manner as a model.

The script player 302 executes the script program based on the UMD video script standard to control and display the movie player object 300 on the screen. The script player 302 plays a role of realizing a scenario intended on the part of a content producer. The script layer 302 issues the method 313 to the movie player object 300, and receives the event 312 from the movie player object 300. The script layer 302 exchanges, with the native implementation platform 301, a key event 314 corresponding to the user input 310 or a method 315 instructing the native implementation platform 301 to draw a screen.

The native implementation platform 301 has various functions other than specified in the UMD video standard. According to this embodiment of the invention, the method 315 exists in which the script layer 302 acts on the native implementation platform 301. Therefore, the object with the function thereof abstracted is defined also for the native implementation platform 301, and the method 315 is regarded as associated with the particular object on the script program. This is because the method belongs to the object. Thus, a controller object 330 is defined in the native implementation platform 301, and the method 315 is defined as that for the controller object 330.

The buttons arranged on the menu screen, for example, are drawn by the native implementation platform 301 based on the method 315 delivered from the script program of the script layer 302 to the native implementation platform 301. Whenever the user operates the buttons for selection or determination (entry), the key event 314 corresponding to the user input 310 is notified from the native implementation platform 301 to the script layer 302, and the script program in the script layer 302 executes the process corresponding to the key input 310 based on the key event 314.

As described above, the functions are distributed in such a manner that the operation of decoding and controlling the display of the video, audio and subtitles is taken charge of by the movie player 300, and the process relating to the arrangement or display of the part image (hereinafter, referred to as the GUI parts) constituting the GUI (graphical user interface) such as buttons and the operation of selecting or determining the GUI parts are executed by the script player 302.

The native implementation platform 301 forms a basis for the operation of the movie player object 300 and the script program. In the case where the actual UMD video player is hardware, for example, the native implementation platform 301 is mounted in a way unique to the hardware to act as an intermediary between the hardware and the player model.

The native implementation platform 301, for example, receives a user input 310 from the user and determines whether the user input 310 thus received is an instruction to the movie player 300 or an instruction issued to the button drawn or displayed in the script layer 302. The native implementation platform 301, upon determination that the user input 310 is an instruction to the movie player 300, converts the user input 310 into a control command 311 constituting an internal control instruction to the movie player 300, and issues a control instruction to the movie player 300.

The native implementation platform 301, upon determination that the user input 310 is an instruction to the GUI part drawn and displayed in the script layer, on the other hand, notifies the script layer 302 of the key event 314 corresponding to the user input 310. Then, the button image can be displayed on the screen, for example, based on the method 315 designated from the script layer 302 in accordance with the particular key event 314. Specifically, the native implementation platform 301 and the script layer 302 can receive and deliver the event and the method directly without the intermediary of the movie player 300.

Also, the native implementation platform 301 can access the property of the movie player 300 as described later and view the status of the movie player 300.

Next, the movie player 300 will be explained in more detail. FIG. 3 shows an exemplary internal configuration of the movie player 300. As described above, the movie player 300 is configured with a database 320 and a playback module 321. The database 320 is an area for storing information on a play list read from a disk and information on a clip, i.e. clip information.

The playback module 321 includes a decoder engine 322 and a property 323 representing a value indicating the state of the playback module 321. The property 323, like the language code, for example, is of two types including a property 323A (read-only parameter) with a value thereof determined by the initialization of the movie player 300 and a property 323B (player status) changing in value with the state of the playback module 321.

The value of the property 323A, which is determined by initialization, is set by a native system such as an actual device, and not changed by the play list, the clip information or the script program. The value of the property 323A is considered capable of being read only from the script program. The value of the property 323B indicating the state of the playback module 321, on the other hand, can be read from the script program on the one hand and can be written from some script program on the other hand.

Incidentally, this operation model assumes that the play list and the clip information are preloaded from the disk before reproduction of the clip AV stream. As an alternative, however, the operation determined by the movie player model can be realized for other mounting (package).

The movie player object 300 reproduces the play list in accordance with the designation from the script player 302 or the native implementation platform 301. The movie player 300, for example, refers to the database 320 and acquires a reproduction position of the clip AV stream corresponding to the designated play list as a byte position in the file. In the playback module 321, the decoder engine 322 controls the decoding of the clip AV stream based on the reproduction position information.

The movie player 300, as shown in FIG. 4, has two states of play and stop in accordance with the play list reproduction condition. The play state is a state in which the play list is designated and reproduced. In addition to the normal reproduction, the play state includes various states, i.e. the variable speed reproduction such as double speed, half speed, forward fast feed or reverse fast feed and pause. What is frame-by-frame advance in which the reproduction is advanced or returned by frame is a state in which pause and play states are alternated. The stop state is where the play list is not reproduced. In stop state, the play list is not selected, and the value of the player status indicating "number of currently reproduced play list" is not determined.

The state of the movie player 300, for example, accompanies the state transition of the play and stop states in the decoder engine 322 in the movie player 300, and the value of the property 323B is updated in accordance with the state transition of the decoder engine 322.

A resume information 324 is stores a state immediately before the stop state. In the case where the movie player 300 decodes a given play list in a play state, for example, the transition to the stop state causes the state immediately before the stop state to be stored. A plurality of items of the resume information 324 can be stored in a way recognizable by each disk title in a nonvolatile memory of the player as hardware. The disk, for example, has unique identification information (hereafter referred to as title ID) for each disk title, and stores the resume information 324 in association with the title ID. By doing so, based on the information of the resume information 324, the disk reproduction can be started from a position immediately before the stop state from which the disk having a title corresponding to the title ID may have transferred to the play state.

3. Event Model of Movie Player

The event model of the movie player 300 will be explained. The movie player 300 generates various events in the play state for playing the play list. These events induce the execution of the processing program called the event handler described in script. The event handler is a method accessed by the generation of an event. The program execution model for starting the execution of the processing program upon generation of an event is called event driven model. In the event driven model, an irregular event is generated, and a program prepared with event generation as a motive is executed. According to this embodiment of the invention, the script program controls the operation of the movie player object 300 with an event handler group.

Figure 5:
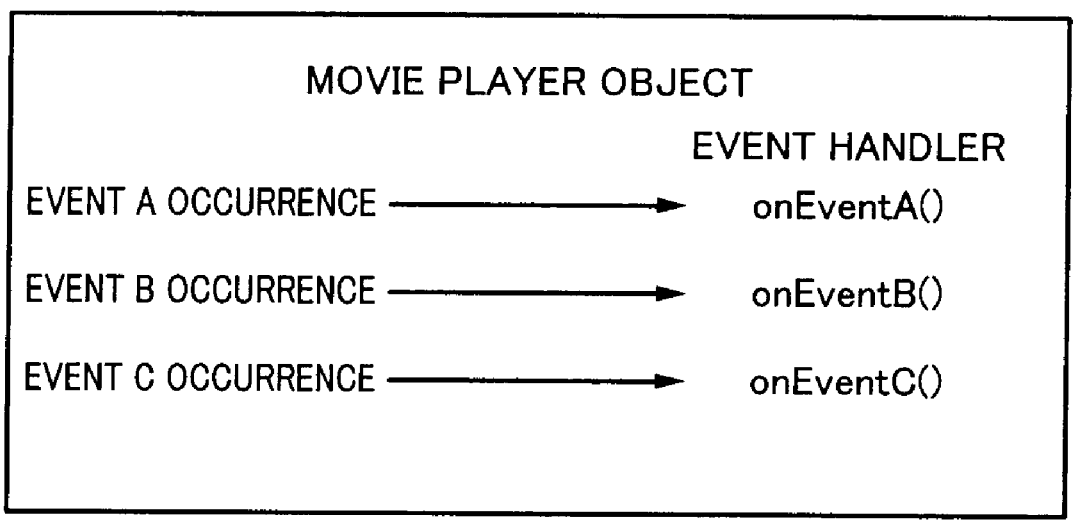
FIG. 5 is a schematic diagram showing an event model of the movie player according to an embodiment of the invention.

FIG. 5 schematically shows the event model of the movie player 300 according to an embodiment of the invention. In FIG. 5, event handlers "onEventA( )", "onEventB( )" and "onEventC( )" are interfaces, and the contents of each event handler are described in script. The contents of the event handler are prepared and mounted, for example, by the content producer. According to the UMD video script standard, the event handler is prepared for each event notified from the movie player object 300 to the script program. In the case of FIG. 5, for example, a processing program executed upon generation of an event A is determined as the event handler "onEventA( )". This is also the case with an event B and an event C. Specifically, upon generation of the event B, the corresponding event handler "onEventB( )" is executed, while upon generation of the event C, the corresponding event handler "onEventC( )" is executed.

The event handler accessed in accordance with the event generation is selected by the system, and therefore, the content producer is not required to describe, in the script program, the process of determining a particular event which may be generated.

Figure 6:
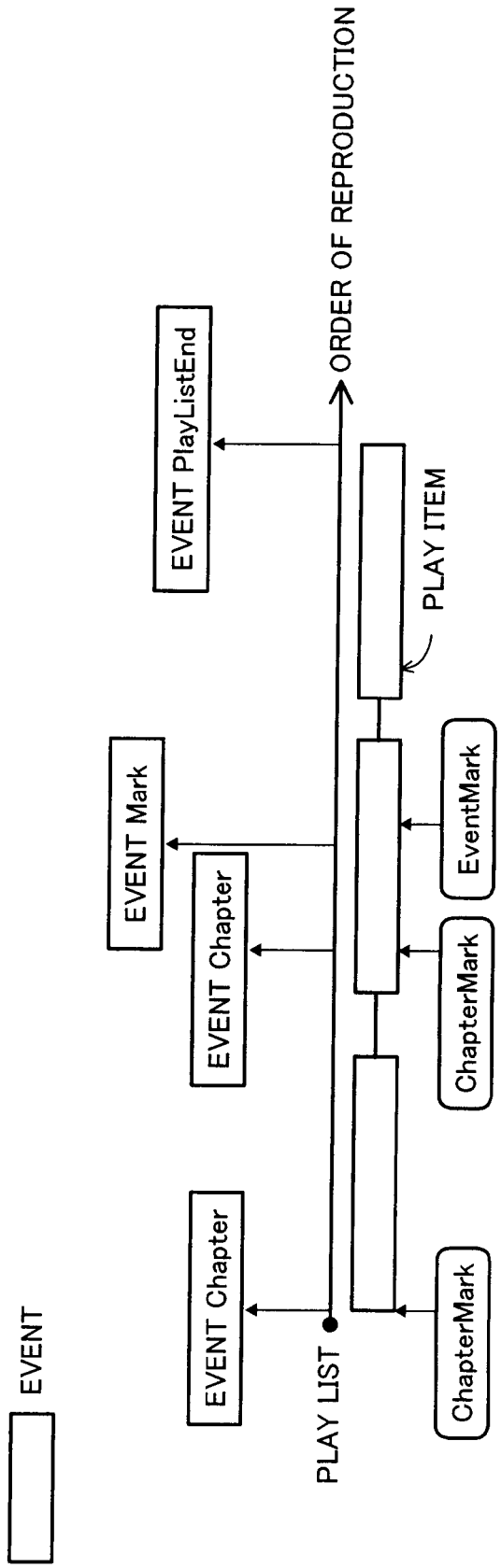
FIG. 6 is a schematic diagram showing an exemplary event generated during the play list reproduction.

FIG. 6 shows an exemplary event generated during the reproduction of the play list. At the head of the play list "PlayList, a chapter mark "ChapterMark" is set. Thus, at the time of starting the reproduction from the head of the play list, therefore, an event "Chapter" corresponding to the chapter mark is generated. Besides, each time the chapter changes, the event "Chapter" is notified to the script layer 302 and a corresponding event handler "onChapter" is executed. Also, with the arrival of the reproduction at the time set by an event mark "EventMark", a corresponding mark event is generated. When the reproduction reaches the end of the play list, the reproduction is temporarily stopped at the end of the play list, and an event "PlayListEnd" is notified from the movie layer 300 to the script layer 302. In the script layer 302, the start of reproducing another play list is designated within a corresponding event handler "onPlayListEnd( )". In this way, the reproduction of a series of play lists is continued in the order intended by the content producer.

As described above, various events are assumed to occur during the operation of the player, and by notifying the event generation to an upper program, the upper program can grasp the player state. In the upper program, the program (event handler) executed at the time of notifying of each event generation is prepared to provide for the generation of various events. The event and the event handler will be explained in more detail later.

In the case where the event handler is not described by the content producer, the operation built in the player (default event handler) specified in the standard is executed or the event is ignored and nothing executed. In the case where nothing is required to be executed, the event handler corresponding to the event is not described thereby to ignore the event positively.

Other possible event models include an event listener model in which a listener corresponding to a given event is registered by an object in a player object, and in the case where the event generated in the player object is a registered event, the event is transmitted from the player object to the object having registered therein the particular event and the corresponding method is executed by the object, and a single-method model in which a single method is accessed regardless of an event which may be generated.

The event model according to this embodiment is simpler than the event listener model requiring the process of event registration and cancellation of the event registration. The single-method model, on the other hand, requires the description in the method the pre-process of knowing a particular event generated and switching the prepared processing routine for each event. The method is mounted by the content producer, and therefore, though simple as a model, imposes a heavy burden on the content producer. Further, one large processing program (method) is accessed each time an event is generated, and therefore, a large memory area is occupied while the execution speed is decreased. The model, in which the processing program (event handler) is prepared for each event according to this embodiment of the invention, is considered advantageous from this point of view.

4. Movie Player Object

Next, the external specification of the movie player object 300 will be explained. Generally, an object defined by a language according to the ECMA script language specification has a property and a method. The movie player object 300 according to this embodiment of the invention, as explained already with reference to FIGS. 2 and 3, similarly have a property and a method. The property can be read and written directly from an external object by designating an object name and a property name involved. Further, by defining a method "setXXX( )" ("XXX" is the property name involved) for setting a property value and a method "getXXX( )" for reading a property value, the property of other objects can be read and written by the method.

FIGS. 7A and 7B show a list of exemplary properties held by the movie player object 300. This corresponds to the property 323 in FIG. 3. FIG. 7A shows an exemplary property associated with the read-only parameter 323A shown in FIG. 3. A property "scriptVersion" indicates the version of the UMD video script. A property "audioChannelCapability" indicates the number of audio channels that can be reproduced by the UMD video player. A property "languageCode" indicates a language code of a menu display language set in the UMD video player. A property "audioLanguageCode" indicates a language code of an audio language set in the UMD video player. A property "subtitleLanguageCode", on the other hand, indicates a language code of a subtitle language set in the UMD video player.

Once a disk is loaded, a script file to be read from the disk is determined based on the language code indicated in the property "languageCode" set in the read-only parameter 323A. In the case where the loaded disk lacks the script file corresponding to the language, a default script file is read. For example, of all the plurality of script files, a file arranged at the head on the disk is read as a default script file.

FIG. 7B shows an exemplary property associated with the player status 323B in FIG. 3. A property "playListNumber" indicates a number of a currently reproduced play list. A property "chapterNumber" indicates a number of a currently reproduced chapter. A property "videoNumber" indicates a number of a currently reproduced video stream. A property "audioNumber" indicates a number of a currently reproduced audio stream. A property "subtitleNumber" indicates a number of a currently reproduced subtitle stream. A property "playListTime" indicates a time assuming that the play list head is 0. A property "AudioFlag" indicates the designation of the on/off of audio reproduction and the dual mono LR. A property "subtitleFlag" indicates the on/off of a subtitle display.

The "dual mono" is a mode in which the left and right (L, R) stereo audio channels are each used as an each independent monaural audio channel.

Information on each property associated with this player status 323B exists in the case where the movie player 300 is in reproduction operation or in pause. Once the operation transfers to the stop state, each property associated with the player status 323B at the particular time point is backed up as the resume information (resume information) 324. At the same time, the contents of the player status 323B may be cleared.

FIG. 8 shows a list of exemplary methods held in the movie player object 300. This corresponds to the method 313 shown in FIG. 2. A method "play( )" reproduces a video. A method "playChapter( )" reproduces a video by designating a chapter. A method "resume( )" starts the reproduction using the resume information 324. A method "stop( )" stops the video reproduction. A method "pause( )" temporarily stops the video reproduction. A method "playStep( )" reproduces the video frame by frame advance. A method "changeStream( )" changes a video stream, audio stream and/or the subtitle stream. A method "getPlayerStatus( )" acquires a state such as reproduction, stop or pause in the movie player 300. A method "changeResumeInfo( )" changes the contents of the resume information 324. A method "reset( )" stops the video reproduction and clears the contents of the resume information 324.

According to the UMD video standard, the video can be displayed in a part of the display screen. The following four methods relate to this video display. A method "setPos( )" sets a video display position. A method "getPos( )" acquires a video display position. A method "setSize( )" sets a video display size. A method "getSize( )" acquires a video display size.

Actually, the movie player 300 and the native implementation platform 301 are configured integrally with each other. Specifically, in accordance with the relation between the UMD player as hardware actually loaded with a disk for reproduction and the software for controlling the UMD player, a particular part processed by hardware and a particular part processed by software are dependent on the configuration at the time of mounting. In the case where the UMD player is configured with a personal computer, for example, the parts other than the disk drive can be configured as software. In the case where the UMD player is configured as a simple unit, on the other hand, a video decoder and an audio decoder other than the disk drive can be configured as hardware. The methods, commands and events processed between the movie player 300 and the native implementation platform 301, therefore, are not limited to the explicit exchange as an example thereof is shown in FIG. 2.

With regard to the key input from the user, on the other hand, as already explained with reference to FIG. 2, the user input 310 is first received by the native implementation platform 301. Specifically, the native implementation platform 301 receives the key input from the user as the user input 310, and determines whether the user input 310 is a command to the movie player 300 or an event for the script program of the script layer 302. In accordance with the result of determination, the native implementation platform 301 generates a control command 311 or a key event 314 and notifies the corresponding upper layer (movie player 300 or the script layer 302) of them.

FIGS. 9 and 10 show an exemplary key input by the user input 310. Incidentally, each key starting with "VK" in FIGS. 9 and 10 indicates a virtual key.

FIG. 9 shows an exemplary key input for the operation of the movie player 300. A key "VK_PLAY" provides a function corresponding to a reproduction key designating the reproduction. A key "VK_STOP" provides a function corresponding to a stop key designating the stop of the reproduction. A key "VK_PAUSE" provides a function corresponding to a pause key designating the temporary stop of the reproduction. A key "VK_FAST_FORWARD" provides a function corresponding to a fast forward key designating the fast forward reproduction. A key "VK_FAST_REVERSE" provides a function corresponding to a quick return key designating the quick return reproduction. A key "VK_SLOW_FORWARD" provides a function corresponding to a slow (forward) key designating the slow forward reproduction. A key "VK_SLOW_REVERSE" provides a function corresponding to a slow (reverse) key designating the slow reverse reproduction. A key "VK_STEP_FORWARD" provides a function corresponding to a frame-by-frame (forward) key designating the frame-by-frame forward feed reproduction. A key "VK_STEP_REVERSE" provides a function corresponding to a frame-by-frame (reverse) key designating the frame-by-frame reverse feed.

A key "VK_NEXT" provides a function corresponding to a next designation key for inputting a value indicating "next". A key "VK_PREVIOUS" provides a function corresponding to a previous designation key for inputting a value indicating "previous". By use of the key "VK_NEXT" and the key "VK_PREVIOUS", for example, the transfer to the preceding or following chapter can be designated.

A key "VK_ANGLE" provides a function corresponding to a video angle switching key designating the angle switching of a multi angle video. A key "VK_SUBTITLE" provides a function corresponding to the subtitle switching key for switching the English subtitle, Japanese subtitle or subtitle display/non-display. A key "VK_AUDIO" provides a function corresponding to an audio switch for switching the audio setting such as surround or bilingual. A key "VK_VIDEO_ASPECT" provides a function corresponding to an aspect switching key designating the video aspect ratio switching.

FIG. 10 shows an exemplary key input for menu operation. A key "VK_UP" provides a function corresponding to an up designation key for inputting a value indicating "up". A key "VK_DOWN" provides a function corresponding to an down designation key for inputting a value indicating "down". A key "VK_RIGHT" provides a function corresponding to a right direction designation key for inputting a value indicating "right". A key "VK_LEFT" provides a function corresponding to a left direction designation key for inputting a value indicating "left". A key "VK_UP_RIGHT" provides a function corresponding to a diagonally upward right designation key for inputting a value indicating "right up". A key "VK_UP_LEFT" provides a function corresponding to a diagonally upward left designation key for inputting a value indicating "left up". A key "VK_DOWN_RIGHT" provides a function corresponding to a diagnorally downward right designation key for inputting a value indicating "right down". A key "VK_DOWN_LEFT" provides a function corresponding to a diagnorally downward left designation key for inputting a value indicating "left down". The use of these keys makes it possible to designate the movement of the cursor indication on the screen.

A key "VK_MENU" provides a function corresponding to a menu key for displaying the menu. A key "VK_ENTER" provides a function corresponding to an ENTER key for designating "determination". A key "VK_RETURN" provides a function corresponding to a key designating the return of the process by one step.

Keys "VK_COLORED_KEY_1", "VK_COLORED_KEY_2", "VK_COLORED_KEY_3", "VK_COLORED_KEY_4", "VK_COLORED_KEY_5" and "VK_COLORED_KEY_6" provide functions corresponding to a colored function key 1, a colored function key 2, a colored function key 3, a colored function key 4, a colored function key 5 and a colored function key 6, respectively.

The key input shown in FIG. 9 and the key input shown in FIG. 10 are different in function, and therefore, the destination of notification is required to be specified by the native implementation platform 301. As described above, the designation relating to the reproduction of the video, audio and subtitles is issued by the key input shown in FIG. 9. The native implementation platform 301, upon receipt of the key input shown in FIG. 9 as a user input 310, converts the received key input to commands shown in FIGS. 11A, 11B and 11C and notifies the movie player 300 of them.

The key input shown in FIG. 10, on the other hand, is the user input 310 for the GUI, and therefore, this user input is required to be notified to and processed by the script layer 302 constructing the screen and arranging the buttons. The native implementation platform 301, upon receipt of the key input shown in FIG. 10 as the user input 310, converts it into the event 314 shown in FIG. 2 and notifies the script layer 302 of it. FIG. 12 shows an example of the event 314 corresponding to this key input.

FIGS. 9 and 10 also show the key input for stream switching such as a key VK_ANGLE, a key VK_SUBTITLE and a key VK_AUDIO. These keys are notified first to the movie player 300 by the user input 310, from which an event indicating the presence of a stream switching request from the movie player 300 is notified to the script. Then, the audio and subtitles are switched by the stream switching method from the script program to the movie player 300. This key input, therefore, is required to be transmitted from the native implementation platform 301 to the movie player 300.

The commands shown in FIGS. 11A, 11B and 11C are described in more detail. A command uo_timeSearch(playListTime)" designates the reproduction of a currently reproduced play list from a designated time. An argument "playListTime" indicates a time when the head of the play list is set to 0. This command cannot designate the play list number, and therefore, the time indicated by the argument "playListTime" is the designated time included in the range of the currently reproduced play list. A command "uo_play( )" designates the reproduction start at unity (normal) speed. A starting position is determined based on the resume information 324. In the absence of the information corresponding to the resume information 324, the user operation is regarded as invalid. This command corresponds to the execution of the method "play( )" without designation of the play list number. Also, the play list number cannot be designated with this command by the user operation.

A command "uo_playChapter(chapterNumber)" designates the reproduction start from a chapter designated by the argument "chapterNumber" of the currently reproduced play list. In the absence of chapter designation, the reproduction start from the head of the currently reproduced chapter is designated. This corresponds to the method "playChapter( )" without designation of the chapter number. A command "uo_playPrevChapter( )" designates the reproduction start from the chapter immediately preceding to a current chapter. A command "uo_playNextChapter( )", on the other hand, designates the reproduction start from a next chapter.

A command "uo_jumpToEnd( )" designates a jump to the end of the play list. This command corresponds to the user operation to instruct the movie player 300 to suspend the reproduction and generate the event "playListEnd". In accordance with this command, the script layer 302 executes the event handler "onPlayListEnd". A command "uo_forwardScan(speed)" designates the forward reproduction at a reproduction speed designated by an argument "speed". A command "uo_backwardScan(speed)", on the other hand, designates the reverse reproduction at the reproduction speed designated by the argument "speed". The argument "speed" in the commands "uo_forwardScan(speed)" and the command "uo_backwardScan(speed)" depends on the mounting of the UMD video player.

A command "uo_playStep(forward)" designates the forward frame-by-frame advance. A command "uo_playStep(backward)" designates the reverse frame-by-frame advance". A command "uo_pauseOn( )" designates the temporary stop of the reproduction based on the user operation. A command "uo_pauseOff( )" cancels the temporary stop of the reproduction based on the user operation.

A command "uo_setAudioEnabled(boolean)" designates the on/off operation of an audio stream. At the time of execution of this command, the value of the flag "audioFlag" is also changed to the corresponding contents. A command "uo_setSubtitleEnabled(boolean)" designates the on/off state of a subtitle stream. At the time of execution of this command, the value of the flag "subtitleFlag" is also changed to the corresponding contents. A command "uo_angleChange( )" designates the change in display angle. Upon transmission of the user operation based on this command to the movie player 300, the movie player 300 notifies the script layer 302 of the event "angleChange". A command "uo_audioChange(andioStreamNumber)" designates the change in an audio stream to be reproduced. A command "uo_changeAudioChannel(value)" designates the audio channel switching or the one-channel switching at the time of dual mono reproduction. At the time of execution of this command, a value of a flag "audioFlag" is also changed to the corresponding contents. A command "uo_subtitleChange(subtitleStreamNumber)" designates the change in a subtitle stream to be reproduced.

The relation between the events shown in FIG. 12 and the method of the movie player 300 for the events will be explained in more detail. An event "menu" is to jump to the menu. This event is notified not to the movie player 300 but to the script layer 302 from the native implementation platform 301. The script layer 302, upon receipt of this event "menu", executes an event handler "onMenu". An event "exit" is issued from the native implementation platform 301 when the UMD video application is ended by the native implementation platform 301. Once this event "exit" is received by the script layer 302, the script player 302 executes an event handler "onExit".

An event "resourceChanged" is issued from the native implementation platform 301 upon generation of the resource file switching. Upon receipt of this event "resourceChanged" by the script layer 302, the script layer 302 executes an event handler "onResourceChanged".

An event "up", an event "down", an event "left", an event "right", an event "focusIn", an event "focusOut", an event "push" and an event "cancel" are generated in the case where a button image constituting a GUI part displayed on the screen is focused. These events are notified not to the movie player 300 but to the script layer 302 from the native implementation platform 301. Incidentally, the wording "the case where a button image is focused" is indicative of the state in which a cursor for designating a position on the screen indicates the display coordinate of the button image and the particular button image is in a selectable state. The event "up", the event "down", the event "left" and the event "right" are generated when the focus of the bottom image moves up, down, leftward and rightward, respectively. The event "focusIn" is generated in the case where a given button image is focused, and the event "focusOut" generated in the case where the button image in focus is displaced out of focus. Also, the event "push" is generated in the case where the button image in focus is depressed. The event "cancel" is generated in the case where the button image depression is canceled.

An event "autoPlay" and an event "continuePlay" designate the start of the script execution in the script layer 302. The event "autoPlay" designates automatic start of the script at the time of loading the disk. The event "continuePlay" designates the resumption of script execution from the time point of the previous suspension based on the resume information 324, for example, at the time of loading the disk.

For the event shown in FIG. 12, the program executed upon generation of the event exists. The program corresponding to this event is called event handler. The correspondence between the event and the event handler can be established by attaching a name, for example. As an example, the event handler name is obtained by attaching "on" to the head of the event name. FIGS. 13 and 14 show exemplary event handlers. The content of the event handler is described by the content producer, so that the various operations intended by the content producer can be executed by the UMD video player.

FIG. 13 shows a part of an example of the event held by the movie player object 300 and a corresponding event handler. The event shown in FIG. 13 corresponds to the aforementioned event 312 shown in FIG. 2, and notified from the movie player 300 to the script layer 302. The event handler is a kind of interface, and the content thereof is mounted by the content producer, for example, using the script language. By configuring the event handler in this way, the operation intended by the content producer can be realized at the time of event occurrence.

An event "mark" and an event handler "onMark( )" are executed upon detection of the event mark (Event-mark). The event mark is embedded, for example, in the play list, and detected by the movie player 300 during the reproduction of the play list. Upon detection of the event mark by the movie player 300, the event "mark" is notified from the movie player 300 to the script layer 302. The script layer 302 executes the event handler "onMark( )" corresponding to this event "mark". In a similar fashion, an event "playListEnd" and an event "onPlayListEnd( )" are executed at the end of the play list. An event "chapter" and an event handler "onChapter( )" are executed upon detection of a chapter mark (Chapter-mark). The chapter mark is embedded, for example, in the play list, and detected by the movie player 300 during the reproduction of the play list.

An event "angleChange" and an event handler "onAngleChange( )" are executed upon designation of the angle change by the user operation. In the case where the key input "VK_ANGLE" is input to the native implementation platform 301 as a user input 310 in accordance with the user operation, for example, the native implementation platform 301 converts the particular user input 310 into the command "uo_angleChange( )" and delivers it to the movie player 300. The movie player 300 generates the event "angleChange" in accordance with the command "uo_angleChange( )", and delivers it to the script layer 302. The script layer 302 executes the event handler "onAngleChange( )" corresponding to the event "angleChange". In a similar manner, the event "audioChange" and the event handler "onAudioChange( )" are executed upon designation of the audio change by the user operation. An event "subtitleChange" and an event handler "onSubtitleChange( )" are executed upon designation of the subtitle change by the user operation.

FIG. 14 shows a part of the exemplary event handler held by the controller object 330. The event handler shown in FIG. 14 is associated with the controller object 330 of the native implementation platform 301, and executed by the notification from the native implementation platform 301 to the script layer 302.

The event "menu" and the event handler "onMenu( )" are jumped to the menu. The event "menu" is notified from the native implementation platform 301 to the script layer 302, for example, upon depression of the menu key by the user operation. The script layer 302, upon receipt of this event, executes the corresponding event handler "onMenu( )", and arranges and displays the GUI part constituting the menu screen in the event handler "onMenu( )". The event "exit" and the event handler "onExit( )" are an event issued from the native implementation platform 301 at the end of the UMD video application by the native implementation platform 301 and the corresponding event handler, respectively.

The event "exit" is notified from the native implementation platform 301 to the script layer 302 upon designation of the end of the UMD video player operation by the user operation, etc. The script of the script layer 302, upon receipt of the event "exit" thus notified, can execute the ending process in the event handler "onExit( )".

The event "resourceChanged" and the event handler "onResourceChanged" are an event issued from the native implementation platform 301 after the native implementation platform 301 switches the resource file and a corresponding event handler, respectively.

The event "autoPlay" and the event handler "on AutoPlay ( )", and the event "continuePlay" and the event handler "onContinuePlay( )", respectively start the execution of the script.

Incidentally, there exists an event handler for the button other than the event handler of the controller object 330. The event handler for the button is not deeply associated with this invention and therefore not described.

Figure 15:
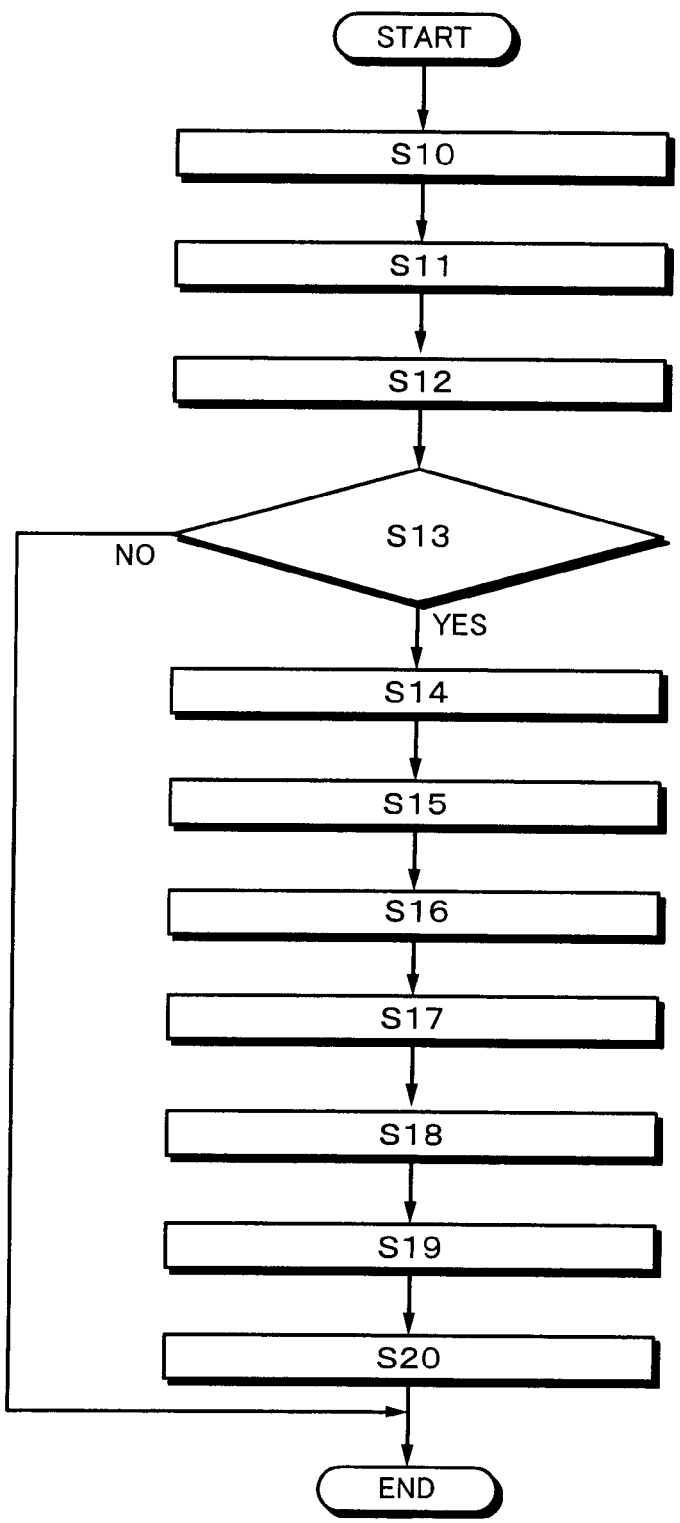
FIG. 15 is a flowchart showing an exemplary process executed by a program prepared with the user input event as a motive.

With reference to the flowchart of FIG. 15, an exemplary process for executing a prepared program with the user input event as a motive is briefly explained. FIG. 15 shows an example in which in the case where the key designating the reproduction of the next chapter (for example, "next" key) is depressed by the user during normal reproduction of the disk in the UMD video player, the reproduction is started by jumping to the next chapter in accordance with this key input while at the same time displaying the prepared message on the screen.

In the case where the key "next" is depressed using the remote control commander of the UMD video player by the user during the normal reproduction of the disk by the UMD video player (step S10), for example, the key VK_NEXT is delivered as the user input 310 to the native implementation platform 301. The native implementation platform 301 generates a user command "uo_playNextChapter( )" corresponding to this user input 310 (step S11). This user command "uo_playNextChapter( )" is notified to the movie player 300.

The movie player 300 that has received this command "uo_playNextChapter( )" searches the database 320 and acquires the position of the next chapter mark based on the position of the current reproduction from the play list information (step S12). Step S13 determines whether the next chapter mark exists or not, and upon determination that no such a chapter mark exists, the current reproduction is continued without chapter jump.

Upon determination in step S13 that the next chapter mark exists, on the other hand, the process proceeds to step S14. In step S14, the movie player 300 suspends the current reproduction, and acquires the byte position in the clip AV stream file, indicating the next chapter mark, from the feature point information of the clip information file of the database 320. In step S15, the acquired byte position in the file is accessed, and the reproduction is started by starting the reading of the stream from the particular position.

Step S16 and subsequent steps are a series of process for displaying the message notifying the chapter switching on the screen. Once the chapter is switched and the reproduction is started from the head of the chapter, the chapter event is generated (step S16). For example, the chapter mark arranged at the head of the chapter is detected by the movie player 300, and the event "chapter" is generated. This chapter event is notified from the movie player 300 to the script layer 302. At the time of notification of this event, the movie player 300 notifies the script layer 302 also of the chapter number of the chapter to which to be jumped. The script layer 302 starts the execution of the event handler corresponding to the notified event such as the event handler "onChapter( )" (step S17).

In the case under consideration, assume that the operation indicating the message notifying the chapter switching, if any, on the screen is described in the event handler. The script of the script player 302 executes this event handler, acquires the chapter number of the jump destination notified from the movie player 300 at the time of event generation (step S18), and issues an instruction to the native implementation platform 301 to display on the screen a predetermined message indicating, for example, the head of the chapter of the chapter number acquired. The native implementation platform 301, in response to this instruction, displays the message on the screen (step S19), and the process by the event handler is ended (step S20).

By the user operation, through the aforementioned process, of the key "next" designating the start of reproduction of the next chapter, the chapter is jumped, and at the time of starting the reproduction of the next chapter to which the jump is made, the message indicating the head of the chapter is displayed on the screen.

As described above, the user input event constitutes a motive for changing the state of the movie player 300 and generating a new event, and various processes can be executed using the newly generated event.

The player model described above makes possible the reproduction of video, audio and subtitles. By generating a certain event at a given time point during reproduction and executing an event handler prepared in advance as preset by the content producer, the operation intended by the content producer can be realized. Also, in the case of user operation of the player during the play list reproduction, a control command is issued from the native implementation platform 301 to the movie player 300 in accordance with the user input 310 by user operation, and the player status can be changed as intended by the user. Further, the native implementation platform 301 that has received the user input 310 by the user operation of the player notifies the event to the script of the script layer 302, so that the operation prepared by the content producer can be executed in accordance with the user operation.

By constructing the player model in this way, the reproduction of video, audio and subtitles and the interactive operation can be provided to the user.

5. Example of Script Program

Figure 16:
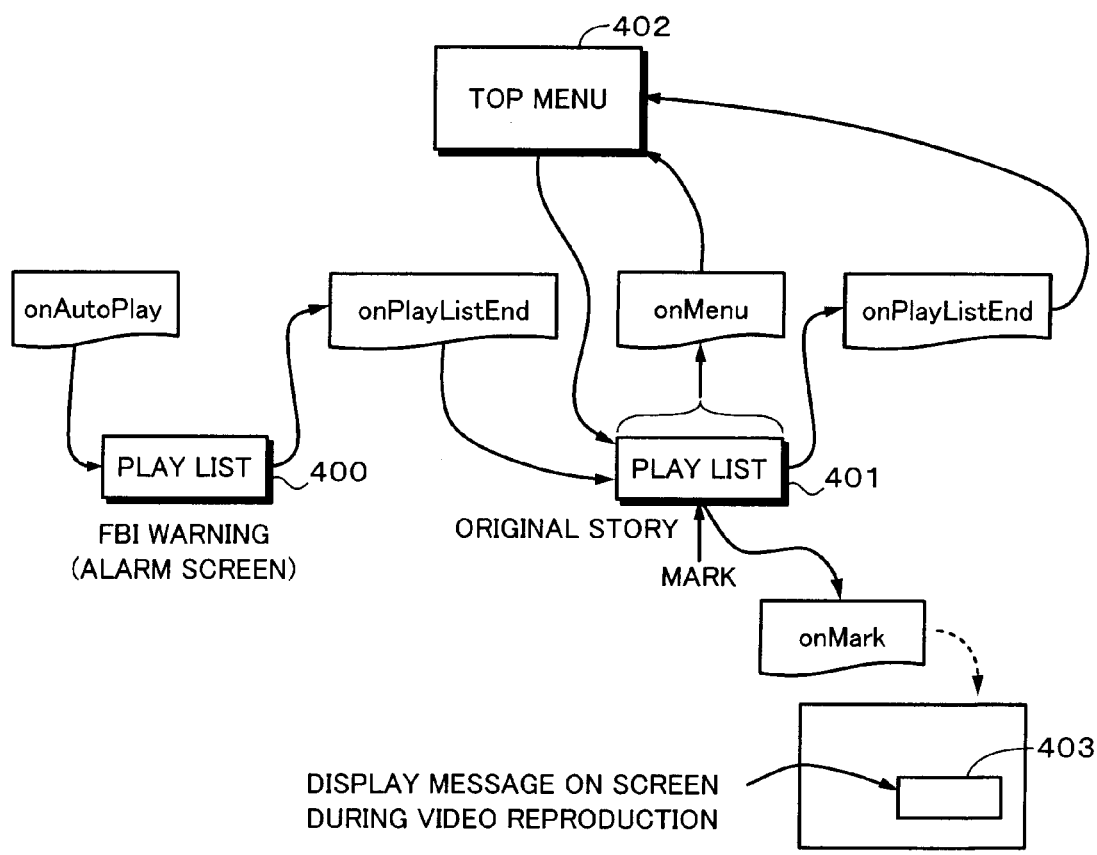
FIG. 16 is a diagram for explaining an exemplary script program.

Next, an exemplary script program of the script layer 302 will be explained. First, assume that the flow of the content reproduction as shown in FIG. 16 is prepared by the content producer. The content shown in FIG. 16 is configured with display elements including play lists 400, 401, a top menu 402 and a message 403. The play list 400 is to display an alarm text screen automatically when the disk is loaded. The Play list 401 is the original story of the movie constituting the feature of this content. The top menu screen 402 has the GUI part such as the button arranged thereon to designate the reproduction of the play list 401. Also, the message 403 is displayed at an arbitrary time during the reproduction of the play list 401.

Further, the configuration shown in FIG. 16 has several event handlers. As soon as the disk is loaded in the UMD player, the event handler "onAutoPlay( )" automatically reproduces the play list 400 and displays an alarm message. The event handler "onPlayListEnd( )" is accessed at the end of the reproduction of the play list, and in the example shown in FIG. 16, accessed at the end of the play list 400 or 401. Specifically, the event handler "onPlayListEnd( )" determines which play list is finished, and upon complete reproduction of the play list 400, designates the start of the reproduction of the play list 401. Also, at the end of the reproduction of the play list 401, the event handler "onPlayListEnd( )" accesses the top menu screen 402.

The event handler "onMenu( )" is accessed upon operation of the menu key by the user, and accesses and displays the top menu 402 on the screen. The event handler "onMark( )" is executed with the arrival of the time designated by the mark "Mark" during the reproduction. In the case shown in FIG. 16, the mark "Mark" is set for the play list 401, and with the arrival of the reproduction of the play list 401 at the time point designated by the mark "Mark", the message 403 is displayed on the screen.

Specifically, in the case of FIG. 16, once the disk is loaded in the UMD video player, the event handler "onAutoPlay" is accessed, and the play list 400 is reproduced while at the same time displaying the alarm screen. With the arrival at the end of the play list 400 upon lapse of the reproduction time thereof, the event handler "onPlayListEnd" is accessed, and the reproduction to the end of the play list 400 is determined. Thus, the next Play list 401 is reproduced. Upon user operation of the menu key during the reproduction of the play list 401, the event handler "onMenu" is accessed and the top menu screen 402 displayed. Also, in accordance with the predetermined operation on the top menu screen 402, the event handler "onMenu" starts the reproduction from the head of the play list 401. Further, with the arrival of the reproduction time of the play list 401 at the time point designated by the mark "Mark", the event handler "onMark" is accessed, and the message 403 displayed on the screen. Upon reproduction to the end of the play list 401, the event handler "onPlayListEnd" is accessed, and the reproduction to the end of the play list 401 is determined, thereby displaying the top menu screen 402.

FIG. 17 shows an example of the script program for realizing the operation shown in FIG. 16. As described above, the script program has event handlers arranged and any one of them is executed in accordance with the event occurrence. The script program is stored in the resource file with the extension "RCO".

The method designating the play list reproduction to the movie player 300 is "movieplayer.play( )". In the parenthesis, a number of the play list to be reproduced is described as an argument. Upon complete reproduction of the play list, the event "playListEnd" is generated. Upon generation of the event "playListEnd", the event handler "movieplayer.onPlayListEnd( )" is retrieved from the script. In the process, the object "event_info" is delivered to the script together with the event "playListEnd". The object "event_info" has stored therein the play list number or the like indicating a particular play list finished. Depending on the content of the object "event_info", the next operation can be changed in this script.

6. File Management Structure

Figure 18:
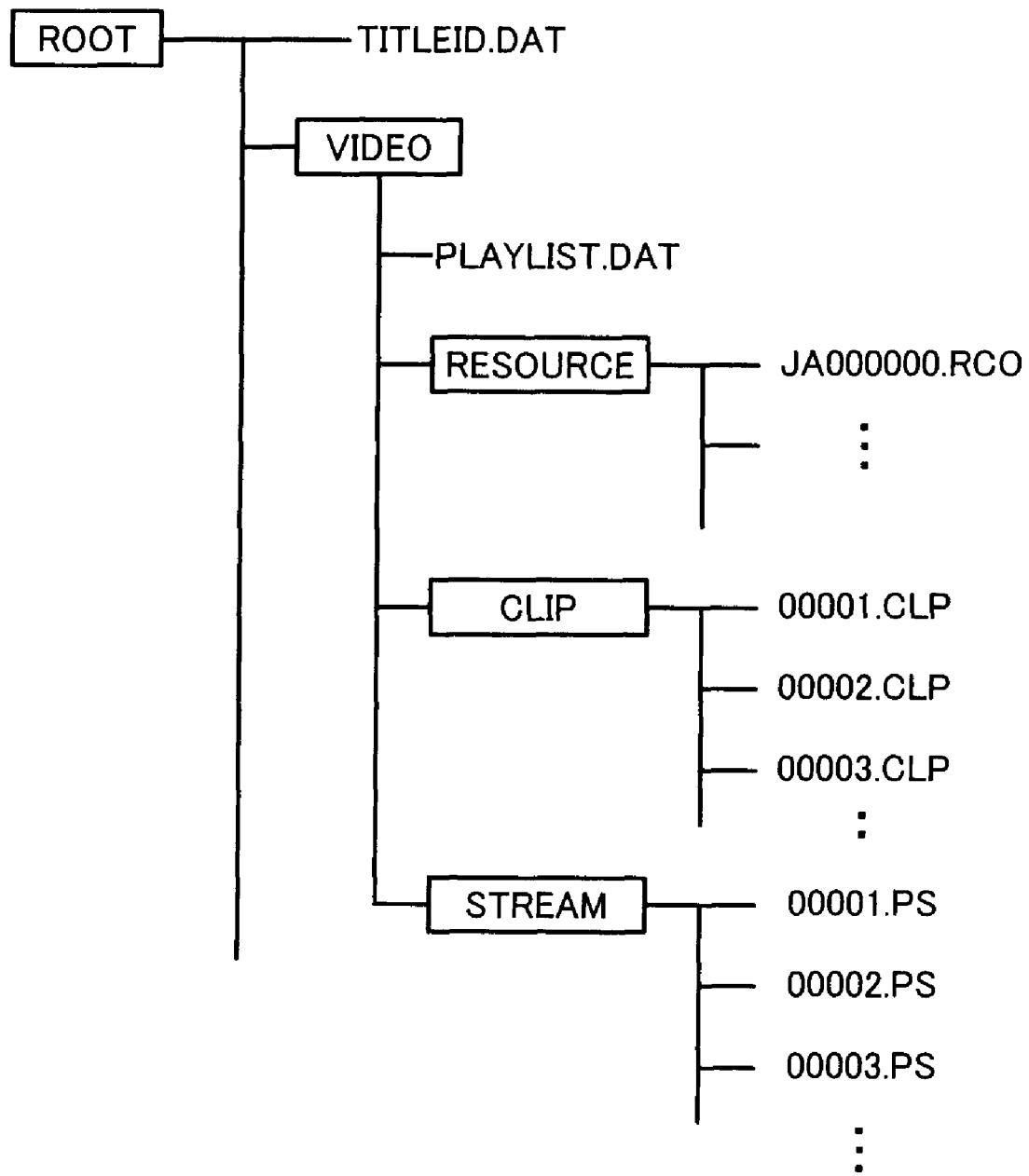
FIG. 18 is a schematic diagram showing an exemplary management structure of a file applied to the UMD video standard.

Next, the file management structure used according to the UMD video standard will be explained with reference to FIG. 18. The file is managed hierarchically in the directory structure and recorded on the disk. The disk file system is applicable to the file system defined by ISO (International Organization for Standardization)-9660 or the UDF (Universal Disk Format).

Under the root directory, a file "TITLEID.DAT" and a directory "VIDEO" are placed. Under the directory "VIDEO", a directory "RESOURCE", a directory "CLIP", a directory "STREAM" and a file "PLAYLIST.DAT" are placed.

The file "TITLEID.DAT" is for storing a title identifier different for each title (type of content). One file "TITLEID.DAT" is held for each disk.

Under the directory "RESOURCE", the resource file ("JA000000.RCO") is placed. The resource file has stored therein, as described above, the script program constituting the script layer 302 and the data used for constituting the menu screen such as the part data including the image data and the sound data. Under the directory "RESOURCE", one resource file is normally placed. Nevertheless, a plurality of resource files may be placed under the directory "RESOURCE". A plurality of the resource files are prepared for each language at the time of preparing a plurality of menus different in display language. Also in this case, only one resource file is used at a time.

In the file name of the resource file, the extension following the period constituting a delimiter is fixed to "RCO", thereby indicating that the particular file is the resource file. Also, the character string before the period briefly indicates the content of the particular resource file. For example, the whole file name of the resource file employs a format "CCdannnn.RCO", the two leading characters "CC" indicates the language code corresponding to the resource file, the next one character "d" indicates a flag indicating whether the language code is the default language or not, the next "a" indicates an aspect ratio of the display screen, and the next four characters "nnnn" indicate the identification number. The identification number is determined in such a manner that the same file name is not included in a plurality of resource files.

By laying down the rule of naming the resource file in this way, the language attribute of the source data and the aspect ratio of the display screen can be determined by the file name of the resource file. At the time of selecting the resource file, an appropriate resource file is determined based on the file name.

Under the directory "CLIP", one or more clip information files is/are placed. In the clip information file, the file name is determined by a character string including five to several characters such as "00001" (numerical characters in this case) before the period constituting the delimiter and the extension "CLP" following the period. The extension "CLP" makes it possible to identify that the particular file is the clip information file.

Under the directory "STREAM", one or more clip AV stream files is/are placed. The clip AV stream file has a file name configured with a character string (numerical characters in this case) of five to several characters such as "00001" before the period constituting the delimiter and the extension "PS" following the period. The extension "PS" makes it possible to determine that the particular file is the clip AV stream file. According to this embodiment, the clip AV stream file is stored as a multiplex file including the video stream, the audio stream and the subtitle stream, and identified by the extension "PS" as a program stream of MPEG2 (Moving Pictures Experts Group 2).

As explained above, the clip AV stream file is obtained by compression coding and time division multiplexing of the video data and audio data, so that by reading this file and executing the decoding process, the video data and the audio data can be obtained. Also, the clip information file is for describing the properties of the clip AV stream file and corresponds to the clip AV stream file. According to this embodiment, the character string including five to several characters before the extension in the file name are made to coincident in the clip information file and the corresponding clip AV stream file, thereby making it possible to easily grasp the correspondence between the two.

The resource file contains the script file containing the description of the script program as explained above, and has stored therein the program used to make the disk reproduction according to this embodiment interactive. The resource file is read before the other files stored in the disk.

The file "PLAYLIST.DAT" is the play list file containing the description of the play list designating the order of reproduction of the clip AV stream. With reference to FIGS. 19 to 21, the internal structure of the file "PLAYLIST.DAT" will be explained. FIG. 19 shows an exemplary syntax showing the entire structure of the file "PLAYLIST.DAT". In this case, the syntax is shown based on the C language description method used as the program description language for the computer system, etc. This is also the case with other syntaxes shown in the drawings.

A field "name_length" has a data length of 8 bits and indicates the length of a name attached to the play list file. A field "name_string" has a data length of 255 bytes and indicates a name attached to the play list file. In the field "name_string", the part with the byte length indicated by the field "name_length" from the head thereof is used as a valid name. In the case where the field "name_length" has the value "10", for example, the part of the field "name_string" with 10 bytes from the head thereof is interpreted as a valid name.

A field "number_of_PlayLists" has a data length of 16 bits and indicates the number of successively described blocks "PlayList( )". The number of the blocks "PlayList( )" equivalent to the number of times indicated in the field "number_of_PlayLists" by the "for" loop on the next line, are described. The block "PlayList( )" is the play list itself.

An exemplary internal structure of the block "PlayList( )" will be explained. At the head of the block "PlayList( )", a field "PlayList_data_length" is arranged. The field "PlayList_data_length" has a data length of 32 bits and indicates the data length of the block "PlayList( )" including the field "PlayList_data_length". Then, a field "reserved_for_word_alignment" having a data length of 15 bits and a field "capture_enable_flag_PlayList" having a data length of 1 bit are arranged. The field "reserved_for_word_alignment", combined with the flag "capture_enable_flag_PlayList" having a data length of 1 bit, is used to secure alignment at the position of 16 bits in the block "PlayList( )".

The flag "capture_enable_flag_PlayList" indicates whether the secondary use of the dynamic image associated with the block "PlayList( )" including "capture_enable_flag_PlayList" is permitted or not. In the case where the value of the flag "capture_enable_flag_PlayList" is "1", for example, it indicates that the secondary use of the dynamic image associated with the play list( ) in the reproducing apparatus is permitted.

The flag "capture_enable_flag_PlayList", though regarded as a 1-bit flag in the aforementioned case, is not limited so. For example, the flag "capture_enable_flag_PlayList" may be configured with a plurality of bits to describe the stepwise permission of the secondary use. As an example, the flag "capture_enable_flag_PlayList" is configured with two bits, and in the case where the value is "0", the secondary use is totally prohibited, while in the case where the value is "1", the secondary use is permitted on condition that the data is compression coded to a predetermined resolution or lower such as 64 pixels by 64 lines. Also, in the case where the value "2", the secondary use may be permitted without any restriction. As other alternatives, in the case where the bit 0 of two bits is "1", the secondary use is permitted in the application of the content reproduction, while in the case where the value of bit 1 is "1", on the other hand, the secondary use in other applications (such as the wall paper image or the screen saver) in the same housing is permitted. In such a case, the values of bit 0 and bit 1 can be used in combination.

A field "PlayList_name_length" has a data length of 8 bits and indicates the length of a name attached to this block "PlayList( )". A field "PlayList_name_string" has a data length of 255 bits and indicates a name attached to the block "PlayList( )". The part of the field "PlayList_name_string" with the byte length indicated by the field "PlayList_name_string" from the head thereof is used as a valid name.

A field "number_of_PlayItems" has a data length of 16 bits and indicates the number of successively described blocks "PlayItem( )". The number of blocks "PlayItem( )" equivalent to the number of times indicated in the field "number_of_PlayItem2" by the "for" loop on the next line, are described. The block "PlayItem( )" is the play item itself.

The identification information (ID) is attached to each block "PlayItem( )" in the block "PlayList( )". For example, number 0 is attached to the first block "PlayItem( )" described in the block "PlayList( )", followed by the serial numbers 1, 2, . . . in the order of appearance of the blocks "PlayItem( )". These serial numbers are used as the identification information of each block "PlayItem( )". The argument "i" of the "for" loop repeated as many times as the number of the blocks "PlayItem( )" can be used as the identification information of the corresponding block "PlayItem( )". The block "PlayItem( )" is followed by the block "PlayListMark( )".

With reference to FIG. 20, an exemplary internal structure of the block "PlayItem( )" will be explained. At the head of the block "PlayItem( )", a field "length" is arranged. The field "length" has a data length of 16 bits and indicates the length of the particular block "PlayItem( )". Then, a field "Clip_Information_file_name_length" is arranged. The field "Clip_Information_file_name_length" has a data length of 16 bits and indicates the length of a name of a clip information file corresponding to the block "PlayItem( )". A field "Clip_Information_file_name" has a data length variable by byte and indicates a name of a clip information file corresponding to the block "PlayItem( )". The field "Clip_Information_file_name" with the byte length indicated by the field "Clip_Information_file_name_length" including the head thereof is used as a valid name. Upon designation of the clip information file by the field "Clip_Information_file_name", the clip AV stream file corresponding to the particular clip information file can be specified based on the correspondence of the file name described above.

A field "IN_time" and a field "OUT_time" each have a data length of 33 bits and represent time information designating the reproduction start and end positions of the clip AV stream file corresponding to the clip information file designated by the field "Clip_Information_file_name" in the block "PlayItem( )". By use of the information of the field "IN_time" and the field "OUT_time", the reproduction start can be designated from the part other than the head of the clip AV stream file. In a similar manner, the reproduction end at other than the rear end of the clip AV stream file can be designated. The field "reserved_for_word_alignment" is for adjusting the data length of the data structure to an integer multiple of 16 bits and has a data length of 15 bits.

With reference to FIG. 21, an exemplary internal structure of the block "PlayListMark( )" will be explained. At the head of the block "PlayListMark( )", a field "length" is arranged. The field "length" has a data length of 32 bits and indicates the length of the block "PlayListMark( )". Then, a field "number_of_PlayList_marks" is arranged. The field "number_of_PlayList_marks" has a data length of 16 bits and indicates the number of succeeding blocks "Mark( )". The blocks "Mark( )" equal to the number of times indicated in the field "number_of_PlayList_marks" by the "for" loop on the next line, are described.

An exemplary the internal structure of the block "Mark( )" will be explained. At the head of the block "Mark( )", a field "mark_type" is arranged. The field "mark_type" has a data length of 8 bits and indicates the type of the block "Mark( )" including the particular field "mark_type". According to this embodiment, as an example thereof is shown in FIG. 22, two types of marks including the chapter mark and the event mark are defined. The chapter is a search unit for dividing the play list (block "PlayList( )"), and the chapter mark indicates the chapter position in terms of time information. The event mark, on the other hand, generates the mark event.

A field "mark_name_length" has a data length of 8 bits and indicates the length of a name attached to the block "Mark( )". A field "mark_name_string" arranged on the bottom line of the block "Mark( )" indicates a name attached to the block "Mark( )". The part of the field "mark_name_string" with the byte length indicated by the field "mark_name_length" including the head thereof is used as a valid name.

The four elements including a field "ref_to PlayItem_id", a field "mark_time_stamp", a field "entry_ES_stream" and a field "entry_ES_private_stream_id" establish correspondence between the block "Mark( )" defined on the block "PlayList( )" and the clip AV stream file. Specifically, the field "ref_to_PlayItem_id" has a data length of 16 bits and indicates identification information of the block "PlayItem( )". As a result, the clip information file and the clip AV stream file are specified.

Figure 23:
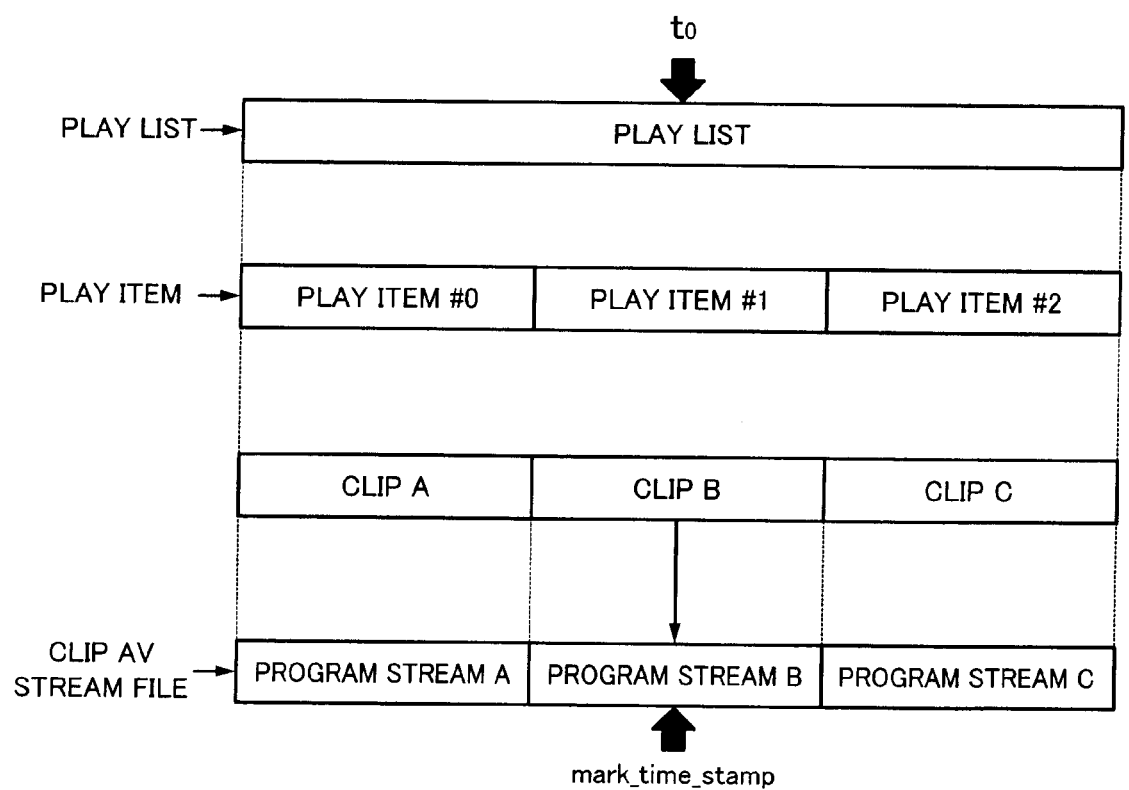
FIG. 23 is a diagram for explaining the designation of a mark time in a clip AV stream file.

The field "mark_time_stamp", having a data length of 33 bits, is used to designate the time of the mark in the clip AV stream file. With reference to FIG. 23, this field will be explained briefly. In FIG. 23, assume that the play list is configured with three play items (PlayItem(#0), PlayItem(#1) and PlayItem(#2)) designated as numbers 0, 1 and 2, respectively, and the time $t_0$ on the play list is included in the play item (PlayItem(#1)) of number 1. Also, assume that the play items of number 0, 1 and 2 correspond to the program streams A, B and C of the clip AV stream file through the corresponding clip information files, respectively.

In such a case, in the case where the mark is designated at time point $t_0$ on the play list, the value of the field "ref_to_PlayItem_id" is set as "1" indicating the play item including the time $t_0$, and further, the time corresponding to the time $t_0$ on the corresponding clip AV stream file B is described in the field "mark_time_stamp".

Returning to FIG. 21, the field "mark_time_stamp" is followed by the arrangement of the field "entry_ES_stream" and the field "entry_ES_private_stream_id". The field "entry_ES_stream_id" and the field "entry_ES_private_stream_id" have the data length of 8 bits, respectively, and in the case where the block "Mark( )" is associated with a specified elementary stream, are used to specify the particular elementary stream. The field "entry_ES_stream_id" and the field "entry_ES_private_stream_id" indicate a stream ID "stream_id" of a packet "packet( )" multiplexed with the corresponding elementary stream and a private stream ID "stream_id" of a private packet header "private_packet_header( )", respectively.

Incidentally, the stream ID "stream_id" of the packet "packet( )" and the private stream ID "private_stream_id" of the private packet header "private_packet_header ( )" are based on the rule of the program stream of, for example, the MPEG2 system.

The field "entry_ES_stream_id" and the field "entry_ES_private_stream_id" are used, for example, in the case where the clip AV stream #0 and the clip AV stream #1 have different chapter configurations. In the case where the corresponding block "Mark( )" is not associated with a specified elementary stream, the values of these two fields are regarded as "0".

Next, the internal structure of the clip information file will be explained with reference to FIGS. 24 to 28. The clip information file "XXXXX.CLP" describes the properties of the corresponding clip AV stream file "XXXXX.PS" placed under the directory "STREAM", as explained above.

FIG. 24 shows an example of the syntax indicating the entire structure of the clip AV stream file "XXXXX.CLP". The clip AV stream file "XXXXX.CLP" includes a field "presentation_start_time" and a field "presentation_end_time" arranged at the head thereof. The field "presentation_start_time" and the field "presentation_end_time" each have a data length of 33 bits and indicate the time at the head and tail of the corresponding clip AV stream file. The time information can use the PTS (Presentation Time Stamp) in the MPEG2 system. PTS has the accuracy of 90 kHz.

Next, the field "reserved_for_word_alignment" having a data length of 7 bits and the flag "capture_enable_flag_Clip" having a data length of 1 bit are arranged. The field "reserved_for_word_alignment", combined with the flag "capture_enable_flag_Clip" having a data length of 1 bit, is used to align the arrangement in the file "XXXXX.CLP" to the position of 16 bits. The flag "capture_enable_flag_Clip" indicates whether the secondary use of the dynamic image included in the clip AV stream file corresponding to the file "XXXXX.CLP" is permitted or not. In the case where the value of the flag "capture_enable_flag_Clip" is "1", for example, it indicates that the secondary use of the dynamic image of the clip AV stream file corresponding to the file "XXXXX.CLP" in the reproducing apparatus is permitted.

A field "number_of_streams" has a data length of 8 bits and indicates the number of succeeding blocks "StreamInfo( )" structures. Following the field "number_of_streams", the number of blocks "StreamInfo( )" equivalent to the number of times indicated in the field "number_of_streams" by the "for" loop, are described. After the "for" loop, the block "EP_map( )" is arranged.

An exemplary internal structure of the block "StreamInfo( )" will be explained. At the head of the block "StreamInfo( )", a field "length" is arranged. The field "length" has a data length of 16 bits and indicates the length of the block "StreamInfo( )". Then, a field "stream_id" and a field "private_stream_id" each having a data length of 8 bits are arranged. As an example is shown in FIG. 25, the block "StreamInfo( )" is associated with the elementary stream. In the case shown in FIG. 25, the block "StreamInfo( )" is associated with the video stream by the value "0xE0" to "0XEF" of the field "stream_id", and with the ATRAC (Adaptive Transform Acoustic Coding) audio stream, LPCM (Linear Pulse Code Modulation) audio stream or the subtitle stream by the value "0xBD". Also, the block "StreamInfo( )" is associated with the ATRAC audio stream, the LPCM audio stream and the subtitle stream by the values "0x00" to "0x0F", "0x10" to "0x1F" and "0x80" to "0x9F", respectively, of the field "private_stream_id".

In the expression of values in FIG. 25, "0x" indicates that the succeeding numerical values are expressed in hexadecimal notation. This is also the case with similar expression below.

The block "StreamInfo( )" is described roughly in two types including the information not changed in the stream and the information changed in the stream. The information not changed in the stream is described in the block "StaticInfo( )". The information changed in the stream, on the other hand, is described in the block "DynamicInfo( )" with the change point designated by time information.

In the block StreamInfo( )", the field "reserved_for_word_alignment" having a data length of 8 bits is arranged to align the byte position to the back of the block "StaticInfo( )", followed by the field "number_of_DynamicInfo". The field "number_of_DynamicInfo" has a data length of 8 bits, and indicates the number of the blocks "DynamicInfo( )" described thereafter in the block "StreamInfo( )". The field "pts_change_point" and the block "DynamicInfo( )" are described by the number of times indicated in the field "number_of_DynamicInfo( )" by the "for" loop.

The field "pts_change_point" has a data length of 33 bits and indicates the time, by PTS, when the information of the corresponding block "DynamicInfo( )" is validated. The time representing the head is also indicated for each stream by the field "pts_change_point", which is equal to the aforementioned field "presentation_start_time" defined in the file "XXXXX.CLP".

With reference to FIG. 26, an exemplary internal structure of the block "StaticInfo( )" will be explained. The content of the block "StaticInfo( )" varies with the type of the corresponding elementary stream. The type of the corresponding elementary stream can be determined based on the values of the field "stream_id" and the field "private_stream_id" explained with reference to FIG. 25. In FIG. 26, the block "StaticInfo( )" describes, using the "if" syntax, as to whether the type of the corresponding elementary stream is the video stream, audio stream or the subtitle stream. Now, the block "StaticInfo( )" will be explained for each elementary stream.

In the case where the elementary stream is the video stream, the block "StaticInfo( )" is configured with a field "picture_size" and a field "frame_rate" each having a data length of 4 bits and a flag "cc_flag" having a data length of 1 bit. The field "picture_size" and the field "frame_rate" indicate the image size and the frame frequency, respectively, of the video stream. The flag "cc_flag" indicates whether the video stream includes the closed caption or not. In the case where the flag "cc_flag" is "1" in value, for example, the particular video stream includes the closed caption. The field "reserved_for_word_alignment" is used to align the data arrangement to 16 bits.

In the case where the elementary stream is an audio stream, the block "StaticInfo( )" includes a field "audio_language_code" having a data length of 16 bits, a field "channel_configuration" having a data length of 8 bits, a flag "1fe_existence" having a data length of 1 bit and a field "sampling_frequency" having a data length of 4 bits. The field "audio_language_code" indicates the code of the language included in the particular audio stream. The field "channel_configuration" indicates the channel attribute of the audio data such as monaural, stereo or multichannel. The field "1fe_existence" indicates whether the low-frequency emphasis channel is included or not, it being included in the case where the value is, say, "1". The field "sampling_frequency" indicates the sampling frequency of the audio data. The field "reserved_for_word_alignment" is used to align the data arrangement to 16 bits.

In the case where the elementary stream is a subtitle stream, on the other hand, the block "StaticInfo( )" includes a field "subtitle_language_code" having a data length of 16 bits and a flag "configurable_flag" having a data length of 1 bit. The field "subtitle_language_code" indicates the code of the language included in the subtitle stream. The flag "configurable_flag" indicates whether the change in character size or position is permitted for displaying the subtitle stream, or for example, that it is permitted with the value of "1". The field "reserved_for_word_alignment" is used to align the data arrangement to 16 bits.

With reference to FIG. 27, an exemplary internal structure of the block "DynamicInfo( )" will be explained. The block "DynamicInfo( )" includes a field "reserved_for_word_alignment" having a data length of 8 bits arranged at the head thereof. The succeeding contents are varied with the type of the corresponding elementary stream. The type of the corresponding elementary stream can be determined based on the value of the field "stream_id" and the field "private_stream_id" explained with reference to FIG. 25. In FIG. 27, the block "DynamicInfo( )" contains the description to determine, using the "if" syntax, as to whether the type of the corresponding elementary stream is the video stream, audio stream or subtitle stream. Now, the block "DynamicInfo( )" will be explained for each elementary stream.

In the case where the elementary stream is the video stream, the block "DynamicInfo( )" includes a field "display_aspect_ratio" having a data length of 4 bits. The field "display_aspect_ratio" indicates whether the aspect ratio of the video display output is 16:9 or 4:3. The field "reserved_for_word_alignment" is used to align the data arrangement to 16 bits.

In the case where the elementary stream is the audio stream, the block "DynamicInfo( )" includes a field "channel_assignment" having a data length of 4 bits. In the case where the audio stream is configured with two channels, the field "channel_assignment" indicates whether the output is stereo or monaural. The dual monaural state is used to make possible the audio reproduction of two languages, for example. The field "reserved_for_word_alignment" is used to align the data arrangement to 16 bits.

In the case where the elementary stream is the subtitle stream, the block "DynamicInfo( )" is configured with the field "reserved_for_word_alignment" used to align the data arrangement to 16 bits. In other words, the dynamically changing attribute is not defined for the subtitle stream.

With reference to FIG. 28, an exemplary internal structure of the block "EP_map( )" will be explained. The block "EP_map( )" indicates, for each elementary stream, the decode startable position (also called the entry point or the random access point (RAMP)) in the bit stream using the time information and the position information. The position information may use the minimum access unit in the recording medium for recording, for example, the elementary stream. Each elementary stream is assumed to be capable of being decoded from the position indicated by the block "EP_map( )".

In the stream of a fixed rate, the decode startable position can be determined by calculations, and therefore, the information like the block "EP_map( )" is not required. With regard to the stream of a variable rate or such a stream as the video compression coding scheme of MPEG system in which the data size is varied from one access unit to another, however, the information such as the block "EP_map( )" is important for random access.

The block "EP_map( )" includes, at the head thereof, a field "reserved_for_word_alignment" having a data length of 8 bits to align the arrangement to 16 bits. Then, a field "number_of_stream_id_entries" is arranged. The field "number_of_stream_id_entities" has a data length of 8 bits and indicates the number of the elementary streams described in the block "EP_map( )". The numbers of the field "stream_id", the field "private_stream_id" and the field "number_of_EP_entries" equivalent to the number of times indicated in the field "number_of_stream_id_entries" by the first "for" loop, are described. Further, for each one description of the first "for" loop, a field "PTS_EP_start" and a field "RPN_EP_start" are arranged the number of times indicated in the field "number_of_EP_entries" by the second "for" loop.

In the first "for" loop, the first step is to arrange the field "stream_id" and the field "private_stream_id" each having a data length of 8 bits in the first "for" loop, and as an example is shown in FIG. 25, the elementary stream is specified. The field "number_of_EP_entries" arranged next has a data length of 32 bits and indicates the number of entry points described for the elementary stream. After that, the field "PTS_EP_start" and the field "RPN_EP_start" are arranged in the same number as indicated in the field "number_of_EP_entries" by the second "for" loop.

The field "PTS_EP_start" and the field "RPN_EP_start" each have a data length of 33 bits and indicate the entry point itself. The field "PTS_EP_start" indicates the time of the entry point in the clip AV stream file in terms of PTS. The field "RPN_EP_start", on the other hand, indicates the position of the entry point in the clip AV stream file, for example, in units of 2048 bytes.

According to this embodiment, one sector constituting a disk-like access unit has 2048 bytes. The position of the entry point in the clip AV stream file, therefore, is indicated by sector in the field "RPN_EP_start".

A packet "private_stream_2" is always arranged immediately before the reproduction startable position of the video stream. This packet "private_stream_2" has stored therein the information available to decode the video stream. The entry point of the video stream, therefore, is regarded as the position of the packet "park( )" for storing the packet "private_stream_2".

The block "EP_map( )", as described above, establishes correspondence between the time on the clip AV stream and the position in the clip AV stream file. In the case where the time information (time stamp) for the access point to the clip AV stream is given, therefore, the data address for starting to read the data in the clip AV stream file can be easily retrieved, thereby making possible smooth random access to the disk.

According to this embodiment, both the set of the time information and the position information (the set of the field "PTS_EP_start" and the field "RPN_EP_start" in the second "for" loop) for each elementary stream and the set of the field "PTS_EP_start" and the field "RPN_EP_start" in the block "EP_map( )" are arranged and registered in ascending (or descending) order in advance. In other words, the time information and the position information are rearranged in a predetermined direction in advance. As a result, the binary tree search can be executed for the data as they are.

According to this embodiment, the video elementary stream, though described above based on the MPEG2-Video standard, is not limited to it. The video elementary stream, for example, may be based on MPEG4-Visual or MPEG4-AVC standard. Also, the audio elementary stream, though explained above as the ATRAC audio elementary stream above, is not limited to it, but the MPEG 1/2/4 audio, for example, is also applicable.

7. Disk Reproducing Apparatus

Next, the disk reproducing apparatus according to an embodiment of this invention will be explained. FIG. 29 briefly shows an example of the configuration of a disk reproducing apparatus 100 according to this invention. A bus 111 is connected with a CPU (central processing unit) 112, a memory 113, a drive interface 114, an input interface 115, a video decoder 116, an audio decoder 117, a video output interface 118 and an audio output interface 119. The parts of the disk reproducing apparatus 100 can exchange the video stream, the audio stream and various commands and data with each other through the bus 111.

The drive interface 114 is further connected with a disk drive 102. The disk drive 102 exchanges the data and commands with the bus 111 through the drive interface 114.

The CPU 112 includes a ROM (read-only memory) and a RAM (random access memory) (not shown). In accordance with the program and data stored in the ROM in advance, the CPU 112 exchanges the data and commands with each part of the disk reproducing apparatus 100 through the bus 111 thereby to control the overall operation of the disk reproducing apparatus 100. The RAM is used as a work memory of the CPU 112.

Though not shown in FIG. 29, the disk reproducing apparatus 100 can include a nonvolatile memory such as a flash memory in which the data is rewritable and the stored data can be held even after the power supply of the disk reproducing apparatus 100 is turned off. The nonvolatile memory is connected, for example, to the bus 111 so that the CPU 112 can write the data in and read the data from the nonvolatile memory.

The input interface 115 is supplied with an input signal from the input unit through which the user actually performs the input operation. The input unit includes, for example, a remote control commander for operating the disk reproducing apparatus 100 remotely with an infrared light signal or a key directly mounted on the disk reproducing apparatus 100. The input signals supplied from these input units are converted into a control signal for and output to the CPU 112 by the input interface 115.

The disk 101 has recorded therein the play list, script program, clip information file, clip AV stream file, etc. in the format described with reference to FIG. 18 and subsequent drawings. Once the disk 101 is loaded in the disk drive 102, the disk 101 is reproduced automatically or by the input operation of the user. The script file, the play list file and the clip information file read from the disk 101 are supplied to the CPU 112 and stored, for example, in the RAM of the CPU 112. The CPU 112 reads the clip AV stream file from the disk 101 based on the script program and the data stored in the RAM.

The clip AV stream file read from the disk 101 is temporarily stored in the memory 113. The video decoder 116, based on the instruction of the CPU 112, decodes the video stream and the subtitle stream of the clip AV stream file stored in the memory 113. The video data and the subtitle data thus decoded are enlarged, reduced or otherwise subjected to the image processing, for example, by the CPU 112, while at the same time synthesized or added to be a single video data. These image processing steps can also be executed by the video decoder 116 or the video output interface 118. This video data is buffered in the memory 113 and supplied to the video output interface 118. The video output interface 118 converts the supplied video data into, for example, an analog video signal, which is led to the video output terminal 120.

In similar fashion, the audio decoder 117, in response to the instruction from the CPU 112, decodes the audio stream of the clip AV stream file stored in the memory 113. The audio data thus decoded is buffered in the memory 113 and supplied to the audio output interface 119. The audio output interface 119 converts the supplied audio data into, for example, an analog audio signal, which is led to the audio output terminal 121.

The parts shown in FIG. 29, though explained above as independent in hardware fashion, are not necessarily so. The video decoder 116 and/or the audio decoder 117, for example, can alternatively be configured in software fashion to operate on the CPU 112.

Also, the disk reproducing apparatus 100 described above, which includes the CPU 112 and the memory and operates in accordance with a program, can be regarded as a kind of computer system.

Figure 30B:
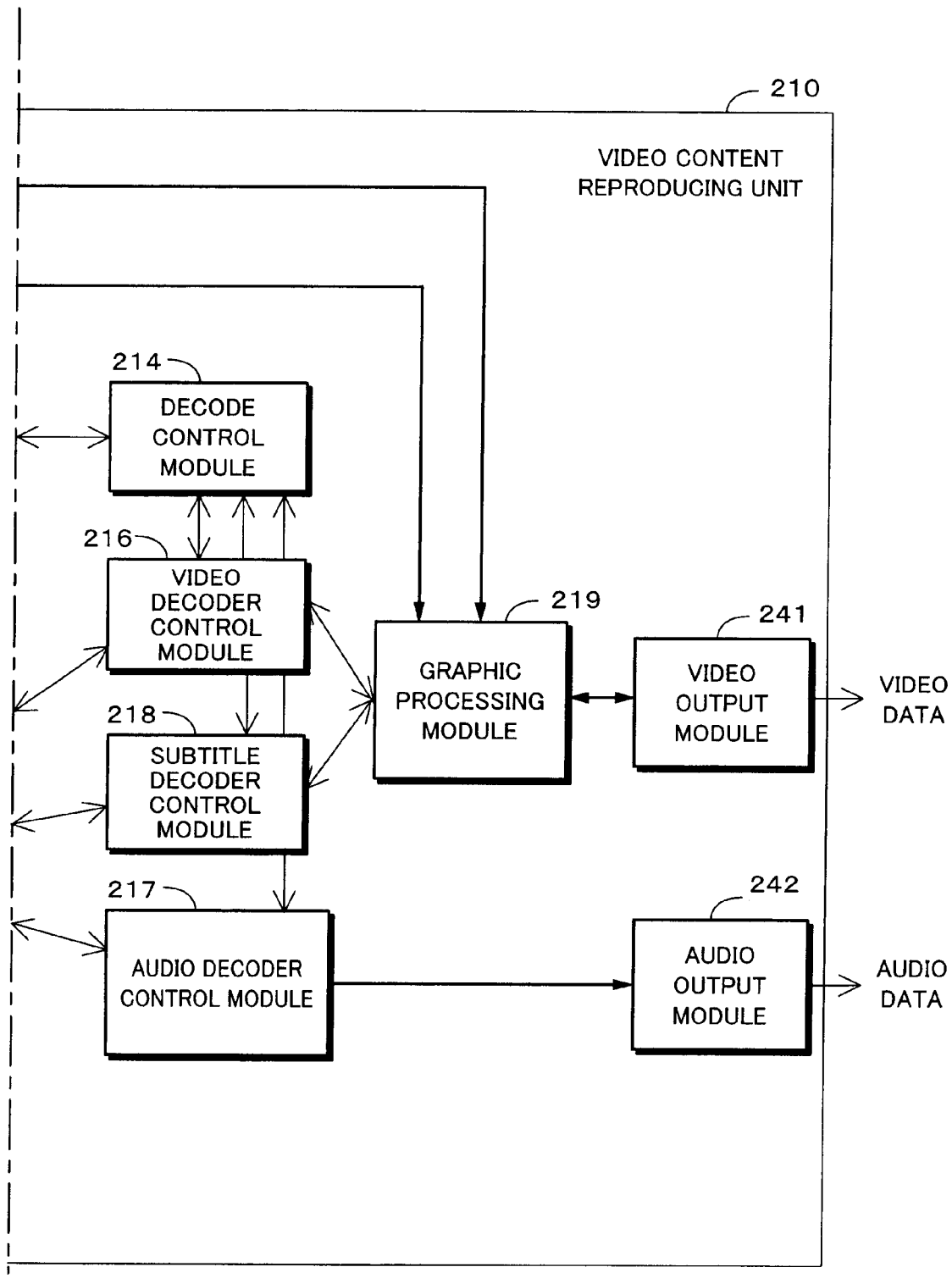

FIGS. 30A and 30B are function block diagrams for explaining the more detailed operation of the disk reproducing apparatus 100 shown in FIG. 29. The disk reproducing apparatus 100 roughly includes an operation system 201 and a video content reproducing unit 210. The video content reproducing unit 210 is substantially a software program operated on the operation system 201. Nevertheless, the video content reproducing unit 210 may operate in combined software and hardware fashions. The description that follows assumes that the video content reproducing unit 210 is software. In FIGS. 30A and 30B, the disk drive 102 is not shown.

The operation system 201 is first started in the CPU 112 with the power supply of the disk reproducing apparatus 100, and by executing the required processes such as initialization of each part, the application program (the video content reproducing unit 210 in this case) is retrieved from the ROM. During the operation of the video content reproducing unit 210, the operation system 201 provides the video content reproducing unit 210 with the basic services such as the process of reading the file from the disk 101 or interpreting the file system. In response to the file read request received from the video content reproducing unit 210, for example, the operating system 201 controls the disk drive 102 through the drive interface 114 and reads the data recorded in the disk 101. The data thus read is delivered to the video content reproducing unit 210 under the control of the operation system 201.

Also, the operation system 201 has the multitask processing function, and can control a plurality of software modules apparently in parallel with each other by time division. Specifically, as an example is shown in FIGS. 30A, 30B, the modules constituting the video content reproducing unit 210 can be all operated in parallel by the multitask processing function of the operation system 201.

The operation of the video content reproducing unit 210 will be explained more specifically below. The video content reproducing unit 210 has several other modules therein and carries out the following functions:

(1) To determine whether the loaded disk 101 (hereinafter, referred to as the UMD video disk) conforms with the UMD video standard or not.

(2) Upon determination that the loaded disk 101 is the UMD video disk, to read the resource file from the disk 101 and deliver it to the script control module 211.

(3) Upon determination that the loaded disk 101 is the UMD video disk, further to read the files constituting the database (play list file, clip information file, etc.) and deliver them to the player control module 212.

The operation of each module of the video content reproducing unit 210 will be explained below.

The script control module 211 stores the received resource file in a predetermined area of the RAM, not shown, of the CPU 112. The CPU 112 (script control module 211) reads, interprets and executes the script program stored in the RAM. As an alternative, the resource file may be stored in a predetermined area of the memory 113, and read by the RAM, not shown, of the CPU 112 as required.

As already described in connection with the player model, the GUI operations such as the production and output of the menu screen, the cursor movement and the change of the menu screen in accordance with the user input can be realized by controlling the graphics processing module 219 on the script program. In the process, the image data and the sound data stored in the resource file on the memory 113 are used to produce the menu screen, etc. Also, the script control module 211 can control the player control module 212 by executing the script program.

The player control module 212, by referring to the database information stored in the files such as the play list file "PLAYLIST.DAT" and the clip information file "XXXXX.CLP" read from the disk 101, performs the control operation for reproduction of the video contents recorded in the disk 101.
(1) To analyze the database information including the play list and the clip information.
(2) To control the content data supply module 213, the decode control module 214 and the buffer control module 215.
(3) To control the transition of the player statuses such as reproduction (play), reproduction stop (stop), temporary stop of reproduction (pause) and control the reproduction process such as stream switching in accordance with the instruction from the script control module 211 or the input interface 115.
(4) To acquire the time information about the currently reproduced video stream from the decode control module 214 and displays the time or generates the mark event.

The content data supply module 213, in response to the instruction of the player control module 212, reads the content data including the clip AV stream file from the disk 101 and delivers it to the buffer control module 215. The buffer control module 215 accumulates the content data thus delivered thereto in the memory 113 as a buffer entity 215A. The content data supply module 213 controls the buffer control module 215 in such a manner that in response to the requests from the video decoder control module 216, the audio decoder control module 217 and the subtitle decoder control module 218, the content data accumulated in the memory 113 are supplied to the modules 216, 217 and 218 in a predetermined way. Also, the content data supply module 213 reads the control data from the disk 101 in such a manner as to control the amount of the content data accumulated, in a predetermined way by the buffer control module 215.

The decode control module 214, in response to the instruction from the player control module 212, controls the operation of the video decoder control module 216, the audio decoder control module 217 and the subtitle decoder control module 218. Also, the decode control module 214, having the clock function therein, controls the operation of the decoder control modules 216, 217 and 218 in such a manner as to output the video data and the audio data synchronously.

The buffer control module 215 constituting the buffer entity 215A uses a part of the memory 113 exclusively. Also, the buffer control module 215 stores the data head pointer and the data write pointer. The buffer control module 215 further has the internal modules such as the video read function, the audio read function and the subtitle read function. The video read function has the video read pointer therein. Also, the video read function has therein a register for accumulating the information "au_information( )" constituting the access unit information. The audio read function has therein the audio read pointer. The subtitle read function has therein the subtitle read pointer and the subtitle read function flag. The subtitle read function flag controls the validity/invalidity of the subtitle read function in accordance with the value written. In the case where "1" is written in the subtitle read function flag, for example, the subtitle read function is regarded as valid, while when "0" is written, the subtitle read function is regarded as invalid.

The video read function, the audio read function and the subtitle read function providing the internal modules of the buffer control module 215 further have the demultiplex function to separate the video stream, the audio stream and the subtitle stream from the clip AV stream in which the respective streams are multiplexed. According to an embodiment of the invention, a clip AV stream is formed by time division multiplexing of a plurality of elementary streams in the form of the program stream of the MPEG2 system. The video read function, the audio read function and the subtitle read function, therefore, have the function of demultiplexing the program stream of the MPEG2 system.

The video read function reads and holds the value of the field "stream_id" (FIG. 25) arranged in a predetermined way in the stream. In similar fashion, the audio read function and the subtitle read function read and hold the values of the field "stream_id" and the field "private_stream_id" (FIG. 25), respectively. The values of the fields "stream_id" and "private_stream_id" are used for analyzing the bit stream supplied.

The video decoder control module 216 instructs the video read function in the buffer control module 215 to read a single video access unit of the video stream from the memory 113 and supply the video decoder 116. The video decoder control module 216, controlling the video decoder 116, decodes, by access unit, the video stream supplied to the video decoder 116. The video data prepared by decoding the video stream is supplied to the graphics processing module 219.

In similar fashion, the audio decoder control module 217 instructs the audio read function in the buffer control module 215 to read a single audio access unit of the audio stream from the memory 113 and supply the audio decoder 117. According to this embodiment, the access unit constituting the audio stream (audio frame) is assumed to have a known fixed length. The audio decoder control module 217, controlling the audio decoder 117, decodes the audio stream supplied to the audio decoder 117, by access unit. The audio data generated by decoding the audio stream is supplied to the audio output module 242.

Further, the subtitle decoder control module 218 instructs the subtitle read function in the buffer control module 215 to read a single subtitle access unit of the subtitle stream from the memory 113 and supply the subtitle decoder control module 218. According to this embodiment, the subtitle access unit constituting the subtitle stream has the unit length information stored at the head of the unit. The subtitle decoder control module 218 has the subtitle decode function and can decode the supplied subtitle stream. The subtitle image data decoded from the subtitle stream by the subtitle decode function of the subtitle decoder control module 218 is supplied to the graphics processing module 219.

The graphics processing module 219, as described above is supplied with the video data decoded in the video decoder 116 under the control of the video decoder control module 216 and the subtitle image data decoded by the subtitle decoder control module 218. The graphics processing module 219 generates a video signal for outputting by adding the subtitle image data to the supplied video data as predetermined. Further, in the graphics processing module 219, the menu image and the message image are generated and synthesized (overlaid) on the output video signal in accordance with the instructions of the script control module 211 and the player control module 212.

In the graphics processing module 219, for example, the subtitle image data supplied are enlarged or reduced in response to the instruction from the script control module 211 and added to the video data as predetermined.

Also, the graphics processing module 219 changes the aspect ratio of the output signal based on the aspect ratio of a pre-designated output video device and the output aspect ratio designated in the content reproduced from the disk 101. In the case where the aspect ratio of the output video device is 16:9 and the output aspect ratio is 16:9, for example, the video data is output as it is. In the case where the output aspect ratio is 4:3, on the other hand, the output video data is squeezed so that the image height is flush with the screen height of the output video device, and the black image is inserted and output on the left and right sides of the image. In the case where the output video device has the aspect ratio of 4:3 and the output aspect ratio is 4:3, the video data is output as it is, while in the case where the output aspect ratio 16:9, on the other hand, the output video data is squeezed so that the image width coincides with the screen width of the output video device while the black image inserted and output above and under the image.

The graphics processing module 219, in response to the request from the player control module 212, further captures the video signal in process, and returns it to the player control module 212.

The video output module 241 occupies a part of the memory 113 exclusively and uses it as a FIFO (first-in first-out) buffer. The video data processed by the graphics processing module 219 is provisionally accumulated in this buffer thereby to control the read operation at a predetermined timing. The video data read from the buffer is output from the video output interface 118.

The audio output module 242 occupies a part of the memory 113 exclusively and uses it as a FIFO buffer. The audio data output from the audio decoder 117 are accumulated in this buffer, and read at a predetermined timing. The audio data read from the buffer is output from the audio output interface 119.

In the case where the audio mode of the content is dual monaural (bilingual, for example), the audio output module 242 outputs the audio data in accordance with a pre-designated audio output mode. In the case where the audio output mode is designated as "main audio", the audio data of the left channel is copied to the right channel in the memory 113, for example, so that both the two-channel outputs are output as audio data of the left channel. In the case where the audio output mode is "second audio", on the other hand, the audio data of the right channel is copied to the left channel in the memory 113, for example, so that both the two-channel outputs are output as the audio data of the right channel. In the case where the audio output mode is "main/second sound channel" or the contents are stereo, the audio data is output as it is.

In this way, the audio output mode can be set by the user interactively through the menu screen generated by the video content reproducing unit 210.

The nonvolatile memory control module 250, in response to the instruction from the player control module 212, writes the data in the area not erased at the end of the operation of the video content reproducing unit 210 and reads the data from the particular area. The nonvolatile memory control module 250 has the function of storing a plurality of sets of the data "Saved_Player_Status" and the data "Saved_User_Data" in the same area with the title ID (Title_ID) as a key. As the data "Saved_Player_Status", the data "Backup_Player_Status" held by the player control module 212 is stored. This data "Backup_Player_Status" corresponds, for example, to the data immediately before the end of the play control module 212 of the player status 323B described above, and the data "Saved_Player_Status" corresponds to the resume information 324. Also, the data "User_Data" held in the player control module 212 is stored as the data "Saved_User_Data". The data "User_Data" is a predetermined data set for the player control module 212 by the user.

The nonvolatile memory control module 250 stores the set of the data "Saved_Player_Status" and the data "Saved_User_Data" in association with the title ID of the disk 101 in a predetermined area of the nonvolatile memory held in the disk reproducing apparatus 100. The storage medium of the nonvolatile memory control module 250 for storing the data is not limited to the nonvolatile memory but may alternatively be a hard disk.

8. State Transition Model of Movie Player 8-1 Definition of Movie Player State

Next, the state change model of the movie player 300 according to an embodiment of the invention will be explained in more detail. According to this invention, the state of the movie player 300 is defined only as an internal state of the movie player 300. Specifically, according to this invention, the state of the movie player 300 is defined based on the operation and the function of the movie player 300 itself.

More specifically, the operation of the movie player 300 is defined into two states including the play state and the stop state from the viewpoint of play list reproduction. Also, the function is defined into two states according to whether the movie player 300 accepts the control command from the native implementation platform 301 or not.

Figure 31:
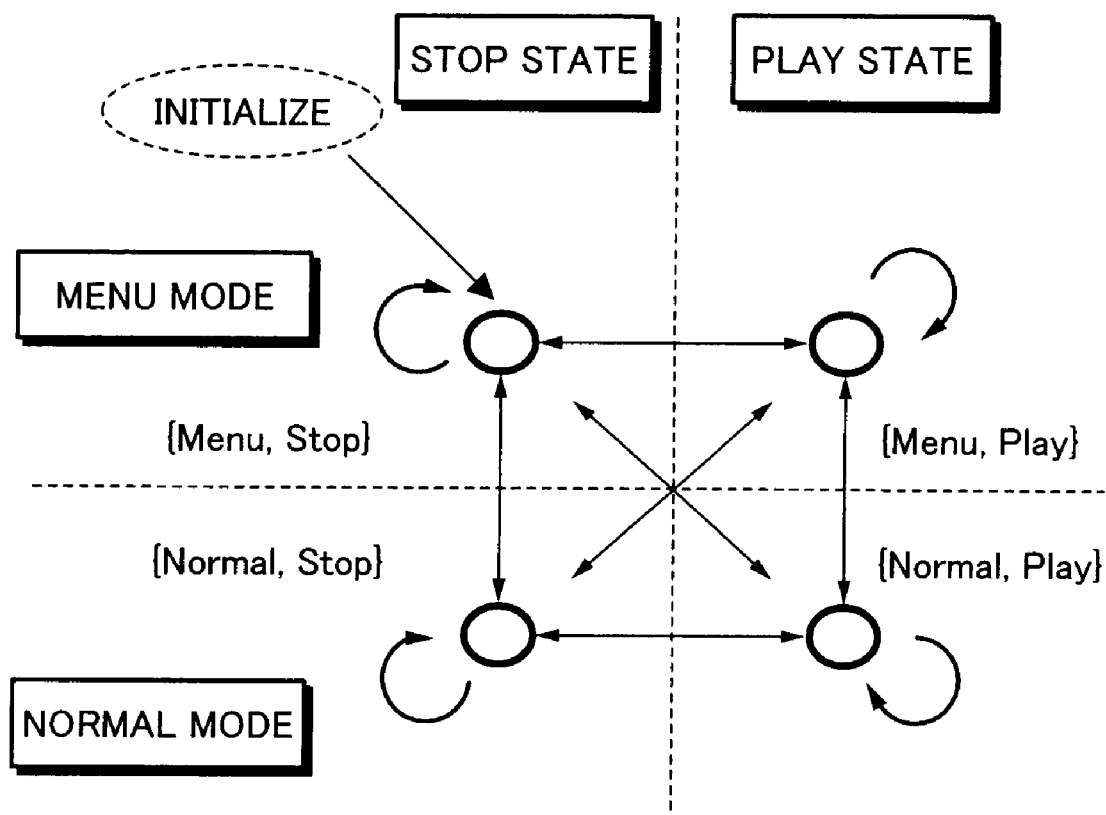
FIG. 31 is a schematic diagram showing the definition of states of the movie player according to the invention.

FIG. 31 schematically shows the definition of the state of the movie player 300 according to the invention. The state of the movie player 300 from the viewpoint of operation will be explained. In FIG. 3, the movie player 300 is in either play state or stop state from the viewpoint of play list reproduction. In play state, the movie player 300 selects the play list and reproduces the selected play list. In stop state, on the other hand, the play list is not reproduced by the movie player 300. In stop state, the play list is not selected. In other words, in play state, the clip AV stream is decoded by the playback module 321 of the movie player 300, while in stop state, it is not decoded.

The play state is subdivided into several states and includes various reproduction states such as the normal reproduction in forward direction at unity speed, the variable speed reproduction in forward and reverse directions at other than normal speed, and pause. The frame-by-frame forward and frame-by-frame reverse reproduction can be realized by alternating between normal reproduction and pause. During the reproduction of the play list, therefore, the movie player 300 is substantially in play state.

The state of the movie player 300 from the viewpoint of the functions thereof will be explained. The movie player 300, for the viewpoint of the functions thereof, has two operation modes, i.e. the mode (called the normal mode) for accepting the control command 311 from the native implementation platform 301 and the mode (called the menu mode) for ignoring the control command 311. These two operation modes of the movie player 300 are each defined as a state of the movie player 300.

In normal mode, the operation of the movie player 300 can be controlled by the user input 310 without the script program of the script layer 302.

In menu mode, on the other hand, the control command 311 is not accepted by the movie player 300. The movie player 300 accepts only the method 313 from the script layer 302. As a result, the operation of the movie player 300 can be controlled in its entirety by the script program of the script layer 302. The user input 310, for example, is delivered to the script layer 302 as an event 314 from the native implementation platform 301. The script program of the script layer 302 controls the operation of the movie player 300 using the method 313 corresponding to this event 314.

Specifically, the operation of the movie player 300 can be controlled on the part of the content producer by use of the menu mode. Also, the use of the menu mode makes possible a great variety of control operations with a few types of keys.

As described above, the movie player 300 has two states including the play state and the stop state in terms of operation on the one hand, and two operation modes of normal mode and menu mode in terms of functions at the same time. For the movie player 300, therefore, four states can be defined including combinations of the two operation state and two function modes. Specifically, the movie player 300 is associated with any one of the four states during the period from its generation to extinction. The generation and extinction of the movie player 300 are explained later.

Incidentally, in the case where the method 313 is issued instructing the movie player 300 to transfer to a state different from the current state, the movie player 300 transfers the state immediately in accordance with the issued method 313 as a model. In an actual device, however, the time length from the time when a given method 313 is issued to the movie player 300 to the time when the movie player 300 completes the state transition in accordance with the method 313 is dependent on the mounting of the particular device.

Also, even in the case where the method 313 designating the state transition to the same state as a given state of the movie player 300 is issued to the movie player 300, the state of the movie player 300 remains unchanged. Even in the case where the method 313 to transfer the state of the movie player 300 to normal mode and stop state is issued to the movie player 300 already in normal mode and stop state, for example, the state of the movie player 300 is not changed.

Further, the temporary stop (pause) state is included as a kind of play state. For transition from stop state to pause, the method "play( )" with the value "pauseMode" designating the temporary stop as an argument is used.

Next, each of the four states including combinations of the two states and the two operation modes of the movie player 300 and the state change among the four states are explained. In the description that follows, assume that the normal mode included in the state of the movie player 300 classified according to the function is called "normal", and the menu mode "menu". Of the state of the movie player 300 classified by operation, on the other hand, the play state is called "play" and the stop state "stop". Also, a combination of the modes and the state of the movie player 300 is expressed as "mode, state" for convenience sake. Further, in the description that follows, the state change and the mode switching in the movie player 300 are both called the state or state change or transition.

As understood from FIG. 31, 16 (=4×4) state changes exist for the movie player 300 including the change to its own state. These state changes are caused by the method 313 delivered from the script layer 302 to the movie player 300. Specifically, the state change in the movie player 300 is caused by a factor external to the movie player 300, and no automatic state change occurs in the movie player 300 without instruction by the method from the script layer 302. Also, the state change never occurs in the movie player 300 even with the control command from the native implementation platform 301.

According to this embodiment, the combination of arguments of the method 313 is limited, and therefore, all the 16 possible state changes in the movie player 300 cannot be generated.

The four states or states ("Menu,Stop", "Normal,Stop", "Menu,Play" and "Normal,Play") that the movie player 300 can assume are explained below one by one.

(1) State "Menu,Stop"

This is the stop state in which the play list is not reproduced by the movie player 300, and in which the control command 311 from the native implementation platform 301 is not accepted. This state is used, for example, on the menu screen with no dynamic image reproduced in the background.

In order to positively secure the control operation from the script program immediately after generation of the movie player 300, it is effective not to accept the control command 311 from the native implementation platform 301 at the particular time point. For this reason, the state "Menu,Stop" is set immediately after generation of the movie player 300.

(2) State "Normal,Stop"

This is the stop state in which the play list is not reproduced by the movie player 300, and in which the control command 311 from the native implementation platform 301 is accepted. This state is used in the state, for example, in which the dynamic image is not reproduced. This state, in which the control command 311 is accepted, is not preferably used immediately after generation of the movie player 300

(3) State "Menu,Play"

This is the play state in which the play list is reproduced by the movie player 300, and in which the control command 311 from the native implementation platform 301 is not accepted. This state is used, for example, on the menu screen with the dynamic image reproduced in the background.

(4) State "Normal,Play"

This is the play state in which the play list is reproduced by the movie player 300, and in which the control command 311 from the native implementation platform 301 is accepted. This state is used, for example, during the reproduction of the original story of the movie.

The models for generating the movie player 300 are briefly explained. In the generation of the movie player 300, as explained above, for example, the power is switched on for the disk reproducing apparatus 100 and the operation system 201 is activated in the CPU 112. Then, the required process such as initialization is executed for each part, while accessing the video content reproducing unit 210 from the ROM. This video content reproducing unit 210 is executed by the CPU 112. Once the power is turned off for the disk reproducing apparatus 100, the movie player 300 is extinguished.

In this case, the movie player 300 is regarded to generate an implicit object, and the movie player 300 is not required to be explicitly generated in the script program.

As explained above, the state immediately after generation of the movie player 300 is regarded as the stop state (state "Menu,Stop") of menu mode. Immediately after generation of the movie player 300, the following properties, for example, held in the movie player 300 assume indefinite values:

Property "audioFlag"
Property "audioNumber"
Property "chapterNumber"
Property "playListNumber"
Property "playSpeed"
Property "subtitleFlag"
Property "subtitleNumber"
Property "videoNumber"

In the UMD video player having the "continued reproduction function" to start the reproduction from the position at which the previous reproduction is suspended, the movie player 300 can be initialized by setting the value of each property as held in the nonvolatile memory instead of a default value. For example, the resume information 324 can be used.

8-2 Method for Generating State Change in Movie Player

Next, the method 313 for generating the state change or transition in the movie player 300 will be explained. FIG. 32 shows combinations of the current state "Mode,Status" and the state "Mode,Status" after state change by the method 313 for each of the four states of the movie player 300. As understood from FIG. 32, the method "stop( )", the method "play( )" and the method "resume( )" are prepared as the methods 313 to generate the state change of the movie player 300. Incidentally, the operation of the method "resume( )" changes depending on whether the resume information 324 exists or not.

The method "stop( )" will be explained. The method "stop( )" changes the movie player 300 to the stop state regardless of the state thereof. The method "stop( )" can designate the mode for the argument, and simultaneously with the transition to stop state, the mode of the movie player 300 can be changed. As described later, upon execution of the method "stop( )" meeting a certain condition, the player status 323B is backed up and held as the resume information 324.

The method "play( )" will be explained. The method "play( )" changes the movie player 300 to play state. The method "play( )" can designate the mode for the argument, and simultaneously with the change to play state, can change the mode of the movie player 300. As described later, upon execution of the method "play( )" meeting a certain condition, the player status 323B is backed up while at the same time holding the resume information 324.

The method "resume( )" will be explained. The method "resume( )" is to restore the reproduction by restoring the resume information 324 to the player status 323B. Specifically, the method "resume( )" causes the movie player 300 to start the reproduction from the position indicated by the resume information 324. Even in the case where the method "resume( )" is executed in the absence of the resume information 324, the state of the movie player 300 is not changed.

The conditions on which the resume information 324 is restored by the method "resume( )" are as follows. Specifically, in the case where the resume information 324 exists at the time of execution of the method "resume( )" and the current state is not "Normal,Play", then the movie player 300 restores the resume information 324. In other words, as long as the resume information 324 exists at the time of execution of the method "resume( )" and the current state is one of "Menu,Stop", "Normal,Stop" and "Menu,Play", then the movie player 300 restores the resume information 324 simultaneously with the transition to the state "Normal,Play".

The method "play( )" has a plurality of arguments. In the case under consideration, by way of explanation, the method "play( )" is assumed to have three arguments including "pauseMode", "menuMode" and "playListNumber". Actually, however, more arguments are defined.

The argument "pauseMode" designates the condition of reproduction in play state, and may assume the value "x1", "pause" or "−1". The value "x1" designates the forward reproduction at normal speed. The value "pause" designates the temporary stop. The value "−1" designates the maintenance of the current reproduction speed. In this way, the argument "pauseMode" sets the detail of the play state of the movie player 300 after execution of the method "play( )". Incidentally, in the case where the pause is designated in the absence of the picture at the position designated by the argument or the designation by the argument, then the picture at the position designated by the select rule laid down separately is displayed, and the pause state is entered.

The argument "menuMode" may designate the mode (normal mode or menu mode) of the movie player 300, and may assume any of the value "Normal", "Menu" and "−1". The value "Normal" designates the switch to the normal mode. The value "Menu" designates the switch to the menu mode. The value "−1" designates the maintenance of the current mode.

The argument "playListNumber" designates the number of the play list to be reproduced. The argument "playListNumber" can be omitted, which indicates that the currently selected play list remains unchanged.

With reference to FIGS. 33A, 33B, 33C, 33D, 33E, an example of state change of the movie player 300 at the time of execution of the method "play( )" will be explained. In each of FIGS. 33A, 33B, 33C, 33D, 33E, the left side indicates the current state 340A of the movie player 300, and the right side the state 340B changed by issuance of the method 313 from the script program to the movie player 300 in the current state 340A. Also, under the state 340A and 340B, the play list numbers (PL1, PL2) designated for the particular state are shown.

Figure 33A:
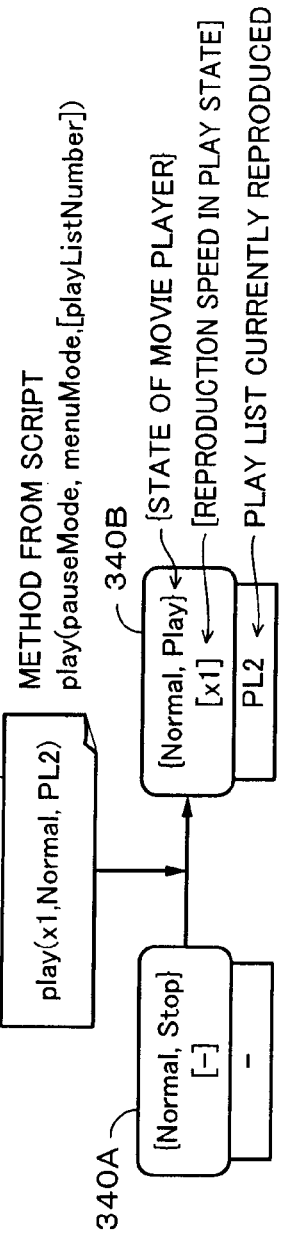

FIG. 33A shows an example of the case in which the method "play(x1,Normal,PL2)" is issued to the movie player 300 in the state "Normal,Stop". This indicates that, in accordance with the method play(x1,Normal,PL2), the state of the movie player 300 changes to a state in which the play list of the play list number "PL2" is reproduced in normal mode at normal speed. The movie player 300 changes from state "Normal,Stop" to state "Normal,Play".

Figure 33B:
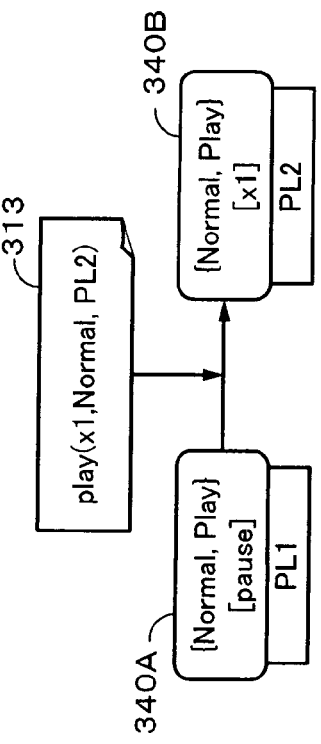

FIG. 33B shows an example of the case in which the method "play(x1,Normal,PL2)" is issued to the movie player 300 in state "Normal,Play" in which the reproduction of the play list of the play list number "PL1" is temporarily stopped. This indicates that in accordance with the method "play(x1,Normal,PL2), the state of the movie player 300 changes to the state in which the reproduction of the play list of the play list number "PL2" is started in normal mode at normal speed. In this case, the reproduction operation of the movie player 300 changes from pause to forward reproduction at normal speed in accordance with the method "play(x1,Normal,PL2). In this case, the reproduction operation of the movie player 300 changes from the pause to the forward reproduction at normal speed. The state, however, remains at "Normal,Play" before and after issue of the method "play(x1,Normal,PL2), and no state change occurs.

Figure 33C:
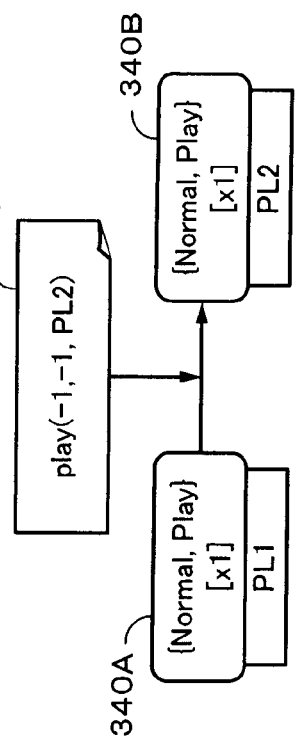

FIG. 33C shows an example of the case in which the method "play(−1,−1,PL2)" is issued to the movie player 300 in state "Normal,Play" during the forward reproduction of the play list of the play list number "PL1" at normal speed. This indicates that in accordance with the method "play(−1,−1,PL2), the movie player 300 is in such a state that the play list of the play list number "PL2" is reproduced in normal mode at normal speed. Also in this case, although the play list reproduced by the movie player 300 is changed, the state "Normal,Play" remains unchanged and no state change occurs.

FIG. 33D shows an example of the case in which the method "play(pause,−1,PL2)" is issued to the movie player 300 which in state "Normal,Play", is in the forward reproduction operation to reproduce the play list of the play list number "PL1" at normal speed. This indicates that in accordance with the method "play(pause,−1,PL2)", the movie player 300 is in normal mode in which the play list of the play list number "PL2" is selected and the operation is temporarily stopped at the head of the play list of the play list number "PL2". Also in this case, the reproduction operation of the movie player 300 changes from the forward reproduction at normal speed to the pause, while the state remains at "Normal,Play" and no state change occurs.

FIG. 33E shows an example of the case in which the method "play(−1,Menu)" is issued to the movie player 300 in state "Normal,Play" during the pause of the reproduction of the play list of the play list number "PL1". In the method "play( )", the argument "playListNumber" is omitted. This indicates that in accordance with the method "play(−1, Menu)", the movie player 300 selects the play list of the play list number "PL1" while at the same time in the menu mode being temporarily stopped at the head of the play list of the play list number "PL1". The movie player 300 changes to the state "Menu,Stop" from the state "Normal,Play".

As described above, the movie player 300 performs various operation by receiving the method "play( )" from the script program, while at the same time generating the state transition depending on the conditions. The content producer can implement various operations in the movie player 300 by describing the method "play( )" with a different argument in the script program.

The movie player 300 starts the reproduction of the play list of a selected play list number only by executing the method "play( )" from the script program. The play list reproduction start indicates the start of reproduction of the play list from stop state or the selection of a new play list by suspending the play list reproduction and starting the reproduction of the selected play list.

In the case where the script program issues the method "play( )" with an argument to the movie player 300, the value of the argument is set in the player status 323B. In the case where the argument is omitted, the value of the particular argument is set as a default value or by automatic selection in accordance with the rule determined for each parameter.

The reproduction of the play list in the order not intended by the content producer would pose a problem. Therefore, the start of the play list reproduction by designating the play list number with the control command 311 attributable to the user operation is prohibited. This is one of the features of the operation model of the movie player 300 according to an embodiment of the invention.

Further, in the case where an invalid play list or the nonexistent time is designated as a value of the argument of the method "play( )", the execution of the particular method "play( )" would fail. This indicates that the script program is erroneous, and the script program contains a violation of the standard. The error handling against this case is dependent on the mounting of the movie player 300.

Figure 34:
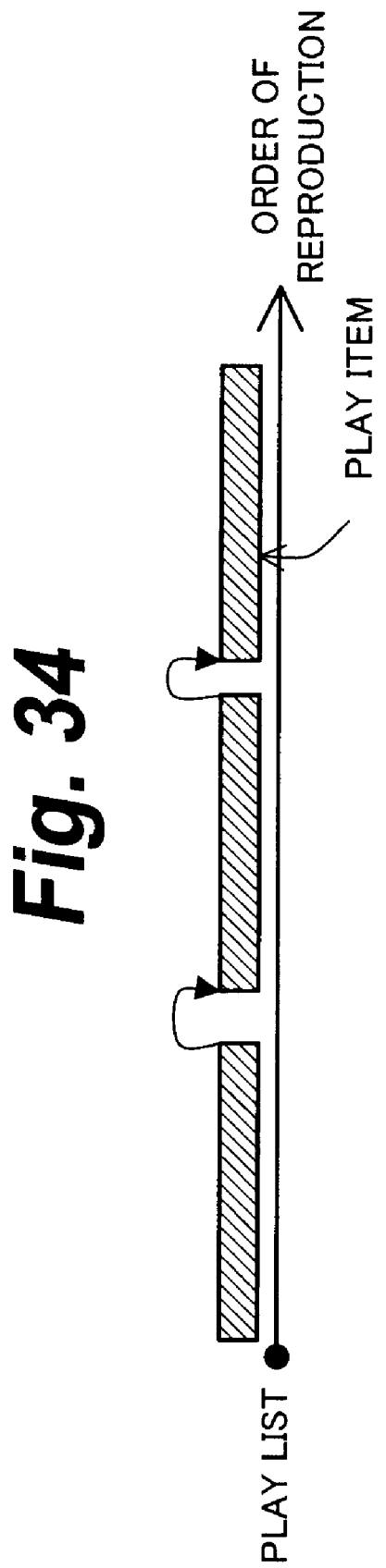
FIG. 34 is a schematic diagram for explaining a method of reproducing a play item.

Now, the reproduction between play items will be explained. The movie player 300, with the starting of the play list reproduction, continues the reproduction of the particular play list to the end. The reproduction from the head to the end of a given play list requires neither the user operation nor the control operation from the script program. In the movie player 300, as briefly shown in FIG. 34, the play items constituting the play list are sequentially reproduced in the order designated by the play list file "PLAYLIST.DAT" (FIG. 19). The play items constituting the play list are continuously reproduced without being controlled by the event handler.

The operation during the period from the end of the reproduction of a play item to the reproduction of the next play item is dependent on the mounting of the movie player 300, and not specified as a format. For example, the operation between play items as to whether the last picture of the play item continues to be displayed or immediately changed to the black screen is dependent on the mounting. By the appropriate authoring operation such as setting the IN point of the play item at a random access point (entry point, FIG. 28), however, the gap time between the play items can be shortened as far as possible.

8-3 Movie Player Operation During Play List Reproduction

Next, the operation of the movie player 300 during the reproduction of the play list will be explained. The variable speed reproduction instruction of the user such as the high-speed reproduction including the double speed reproduction or the triple speed reproduction, the low-speed reproduction including the half-speed reproduction or the reverse reproduction is input to the native implementation platform 301 as a user input 310, and in response to this user input 310, a control command 311 dependent on the mounting is transmitted to the movie player 300 from the native implementation platform 301.

The variable reproduction speed is dependent on the mounting of the movie player 300. In an example of realizing a variable-speed reproduction, the instruction "faster" or "slower" is delivered as an argument to the movie player 300 from the native implementation platform 301 capable of speed designation, which is converted by the movie player 300 into a realizable speed. Which method should be employed depends on the mounting of the movie player 300. According to the script program, the speed determined by the movie player 300 can be known by the method "getPlayerStatus( )".

With the method "play( )" to the movie player 300 from the script program, on the other hand, the speed cannot be designated by the argument. In the method "play( )", only two including "pause" (argument "pause") and "normal speed reproduction" (argument "x1") can be designated.

The movie player 300, upon arrival at the end of the play item during the forward variable speed reproduction of the play list, carries out the reproduction of the next play item. At the same time, the movie player 300 continues the variable speed reproduction of the next play item in the same direction and at the same speed as the previous play item.

FIG. 35 shows an example of the operation of the movie player 300 in the case where the start or end of the play list is reached during the play list reproduction. The movie player 300, upon arrival at the end of the play list during the reproduction in forward direction, enters the pause while displaying the last picture. To erase the last picture, the stop (issue of the method "stop( )") is required to be designated explicitly for the movie player 300 in the event handler "onPlayListEnd" or the like.

Incidentally, upon arrival at the end point of the play list during the high-speed reproduction higher in speed than normal mode, the last picture of the play list, even if not corresponding to the jump point, is displayed.

Upon arrival at the head of the play item during play list reproduction in reverse direction, on the other hand, the movie player 300 reproduces the previous play item, i.e. a play item which is reproduced temporally earlier in forward reproduction. Also in this reproduction of the previous play item, the reverse reproduction from the end toward the head is continued. The reproduction speed is also maintained. Also, upon arrival at the head of the play list during the reverse reproduction, the variable speed reproduction is canceled, and the movie player 300 enters the pause at the head of the play list.

Further, the state of the movie player 300 is changed to "pause" also by the control command 311 designating the pause. The direction and speed of play list reproduction upon cancellation of the pause by the control command 311 is dependent on the mounting of the UMD video player.

Next, the event generated during play list reproduction will be explained. The event generated during play list reproduction, as explained with reference to FIG. 13, includes the event "angleChange" corresponding to the user operation, the event "audioChange" and the event "subtitleChange", and the event "chapter" and the event "mark" corresponding to the mark embedded in the play list. Also, a detailed example of the operation at the time of event generation is already explained with reference to FIG. 15.

Now, the last processing of the play list will be explained. As already explained, the movie player 300 reproduces the play list of the number designated by the method "play( )". The play list reproduction, once started, is continued to the end of the play list without being controlled by the script program or the control command 311. Upon arrival at the end of the play list reproduction, the movie player 300 notifies the event "playListEnd" to the script program. Any method can be used before reaching the end of the play list. Specifically, regardless of whether the reproduction of the play list is normal, fast or due to the jump from other play list, the movie player 300 generates the event "playListEnd" at the time point when the end of the play list is reached.

In the case where the reproduction reaches the end of the play list and the event "playListEnd" is generated, the state of the movie player 300 enters the pause, and the time of the play list reproduction internally held by the movie player 300 coincides with the end time of the play list. Incidentally, the end time of the play list is defined as the time of ending the reproduction of the last picture of the play list and coincides with the OUT point of the last play item along reproduction time axis.

The event "playListEnd" can be used for reproducing the play list serially or displaying the menu at the branching point of the multistories.

The script program executes the event handler "onPlayListEnd", if held as a program to be executed, upon generation of the event "playListEnd". In the case where the method "play( )" for starting the reproduction of other play list is described in this event handler "onPlayListEnd", the movie player 300 starts the reproduction of the other play list. In this way, the play list reproduction is continued.

Figure 36:
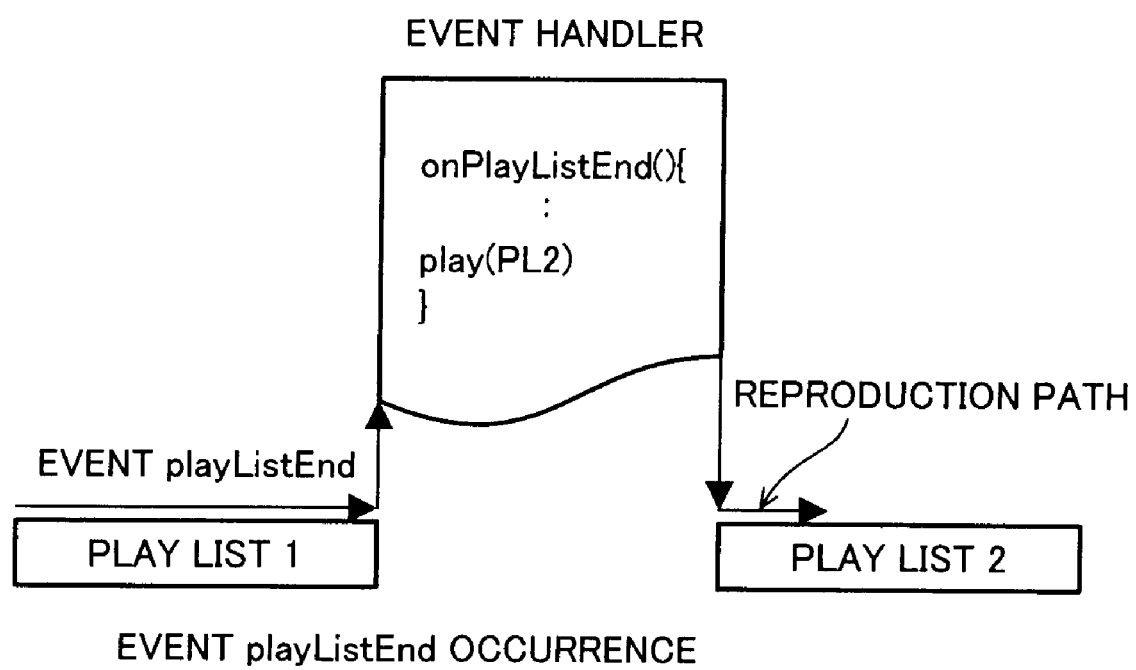
FIG. 36 is a schematic diagram for explaining the reproduction between play lists.

A specific explanation is given with reference to FIG. 36. At the end of reproduction of the play list of the play list number "PL1", the event "playListEnd" is generated. Upon generation of this event "playListEnd", the event handler "onPlayListEnd" held in the script program is executed. This event handler "onPlayListEnd" designates the reproduction of the play list of the play list number "PL2". The movie player 300, in response to this event handler "onPlayListEnd", reproduces the play list of the designated play list number "PL2".

The reproduction path transfers provisionally to the event handler "onPlayListEnd" from the end of the play list of the play list number "PL1", and further transfers to the head of the play list of the play list number "PL2".

In the case where the menu is to be displayed at the branching point of the multistories, for example, the instruction to reproduce the play list may be described to such an effect that the menu screen is displayed by the event handler "onPlayListEnd" corresponding to the event "playListEnd" with the end of the play list as a branching point.

Figure 37:
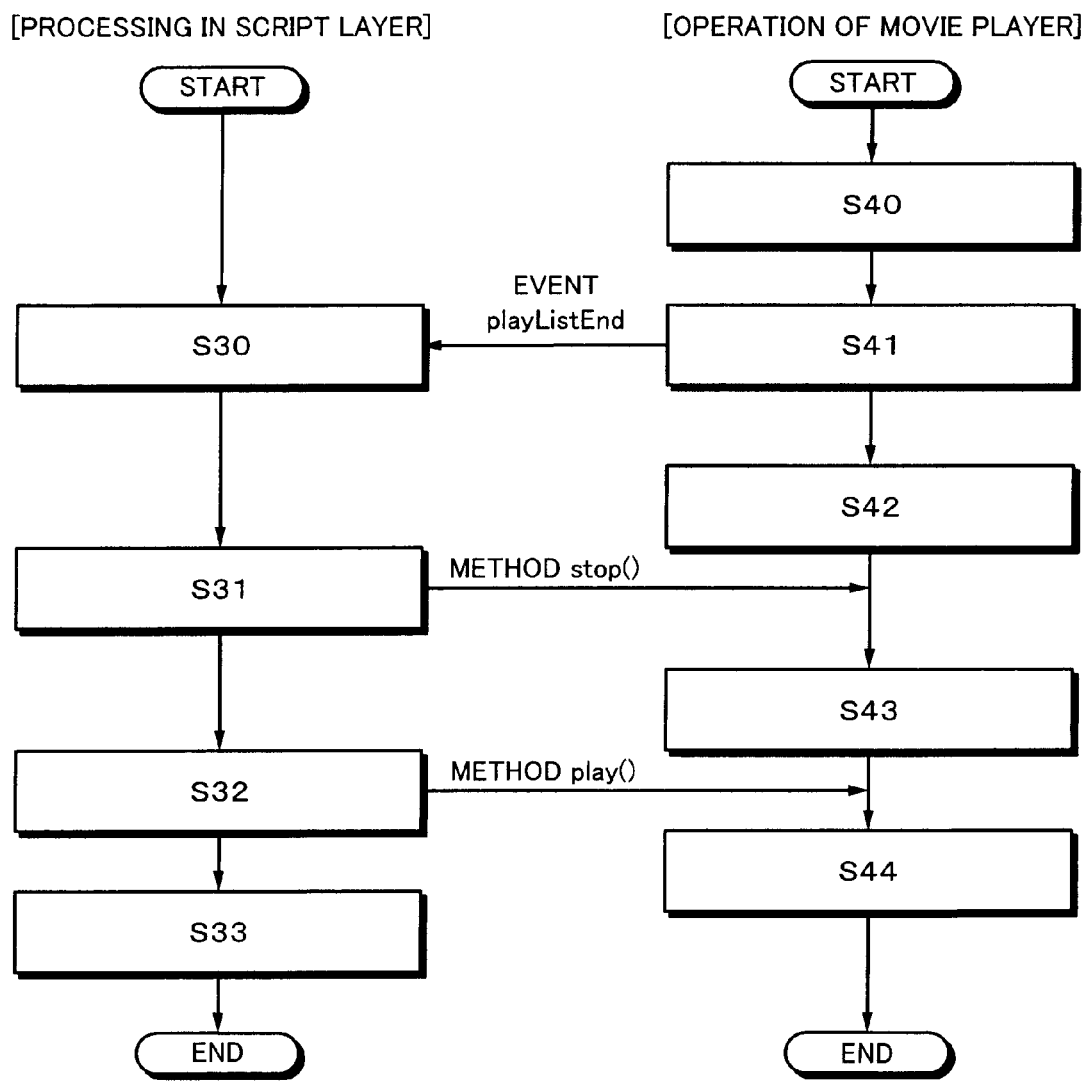
FIG. 37 is a flowchart showing, in more detail, a processing flow in a script player at the end of the play list and an exemplary operation of the movie player.

FIG. 37 shows, in more detail, the flow of the process of the script layer 302 and an example of the operation of the movie player 300 at the end of the play list. In FIG. 37, steps S30 to S33 indicate the process on the part of the script layer 302, and steps S40 to S44 the process on the part of the movie player 300.

After reproduction of a given play list to the end, an explicit instruction for reproduction by the script program is required to reproduce the next play list. The order in which the play lists are reproduced is determined by the script program, and therefore, the play list to be reproduced next cannot be voluntarily determined on the part of the movie player 300.

Once the reproduction reaches the end of the play list (step S40), the movie player 300 notifies the event "playListEnd" to the script layer 302 (step S41). The movie layer 300, while continuing to display the last picture of the play list reproduced to the end in step S40, transfers to the state "pause" (step S42).

In the script layer 302, upon receipt of the event "playListEnd", the event handler "onPlayListEnd" is executed (step S30). The next operation of the movie player 300 is determined by the description of the script in this event handler "onPlayListEnd".

Incidentally, the movie player 300, after step S40, ignores the method or the control command 311 which may be received to cancel the pause or the start the forward reproduction during the pause at the end of the play list. The method to start the forward reproduction is the method "play( )" and the method "playStep( )" designating the forward reproduction with an argument. Also, the control command 311 to start the forward reproduction includes the command "uo_play( )", the command "uo_playNextChapter( )", the command "uo_forwardScan( )", the command "uo_playStep( )", the command "uo_pauseOn( )" or the command "uo_pauseOff( )". These commands are ignored in the case where the operation is in pause at the end of the play list.

Even in the case the operation is in pause at the end of the play list, the method "stop( )" and the method "resume( )" are valid. Also, the mode switching is valid during the pause at the end of the play list.

Even after generation of the event "playListEnd", the movie player 300 in normal mode accepts the control command 311 other than for starting the forward reproduction. Also in that case, upon execution of the method 313 for the movie player 300 from the script program, the operation designated by the particular method 313 is performed.

In the example shown in FIG. 37, the method "stop( )" is designated by the event handler "onPlayListEnd" (step S31). The operation of the movie player 300 caused by the control command 311 is suspended upon execution of the method "stop( )", and transfers to stop state (step S43). In stop state, for example, the last picture of the play list thus far reproduced is erased and the black screen appears.

Further, in the script layer 302, the method 313 for reproducing the next play list is designated by the event handler "onPlayListEnd" (step S32). In the method "play( )", for example, the value "x1" is designated as the argument "pauseMode", the value "Menu" as the argument "menuMode", and the play list number next to be reproduced as the argument "playListNumber". Then, the movie player 300 is instructed to switch to the menu mode and to reproduce the play list of the number designated by the argument "playListNumber" at normal speed. In the script layer 302, the event handler "onPlayListEnd" is ended (step S33). On the part of the movie player 300, the mode is switched in accordance with the method "play( )" designated by step S32, while at the same time starting the reproduction at the speed designated by the designated play list (step S44).

Incidentally, to improve the user operability, the content producer, after ending the reproduction of the play list, should not leave without designating the next operation for the movie player 300. The next operation should be described in the event handler "onPlayListEnd", and the movie player 300 should be transferred to stop state, instructed to reproduce the play list by the method "play( )" or authored to return to the menu screen.

8-4 Function to Restore the Reproduction of Movie Player

Figure 38:
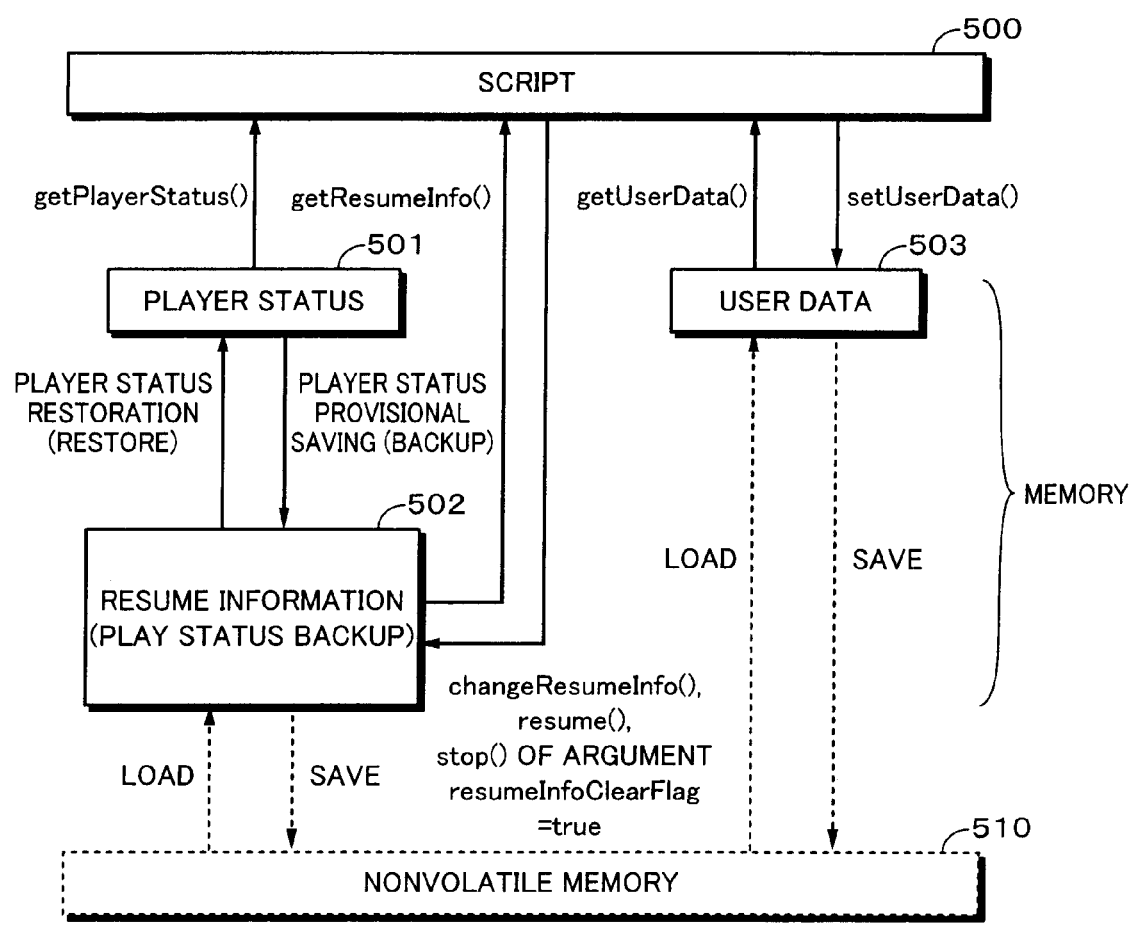
FIG. 38 is a schematic diagram for explaining three types of memory areas of a UMD video player.

Next, the state transition and the reproduction restoration function of the movie player 300 are explained. First, with reference to FIG. 38, the three types of memory areas held in the UMD video player are explained. In the model of the UMD video player, the essential three types of memory areas including the player status area 501, the resume information area 502 and the user data area 503 are defined. These three types of memory areas 501, 502 and 503 are formed, for example, on the memory 113. They may alternatively be formed on the RAM as a work memory of the CPU 112.

The player status area 501 is the memory area for holding the information indicating the reproduction state of the movie player 300. Specifically, the player status 323B shown in FIG. 3 is held in the player status area 501. The contents of the player status area 501 can be read by the method "getPlayerStatus( )" from the script program 500.

The resume information area 502 is the memory area for provisionally saving (backing up) a part of the information held in the player status area 501. Specifically, a part of the information in the player status area 501 is held in the resume information area 502 in the form of the resume information 324 shown in FIG. 3. The part of the information in the player status area 501 saved in the resume information area 502 is restored to the player status area 501 as required. The backup operation and the restore operation are performed by the native implementation platform 301. The information held in the resume information area 502 is used by the resume reproduction function to start the reproduction from the previous reproduction stop point.

The contents of the resume information area 502 can be read by the method "getResumeInfo( )" from the script program 500. In the resume information 324 saved in the resume information area 502, the parameters related to the stream can be changed in value by the method "changeResumeInfo( )" from the script program 500.

The information held in the resume information area 502 is written (saved) in the nonvolatile memory 510 as required by the native implementation platform 301. In similar fashion, the information written into the nonvolatile memory 510 from the resume information area 502 is read (loaded) from the nonvolatile memory 510 as required by the native implementation platform 301, and stored in the resume information area 502.

Incidentally, the backup operation into the resume information 502 from the player status area 501 and the restore operation from the resume information area 502 into the player status area 501 are the processes generated with a specified state transition of the movie player 300 by method execution, and automatically performed by the movie player 300.

The user data area 503 is the one for holding the information dependent on the contents, and can be arbitrarily used by the content producer. This area can be used in arbitrary way in accordance with the contents such as the route history of the play list reproduction by the move player 300 or the correct or incorrect solution of a quiz.

The data can be written in the user data area 503 by the method "setUserData( )" from the script program 500. The contents of the user data area 503 can be read by the method "getUserData( )" from the script program 500. The information held in the user data area 503 is written (saved) in the nonvolatile memory 510 as required by the native implementation platform 301. In similar fashion, the information written into the nonvolatile memory 510 from the user data area 503 is read (loaded) from the nonvolatile memory 510 as required by the native implementation platform 301 and stored in the user data area 503.

In order to realize the reproduce restoration function, a model of the UMD video player constructed according to an embodiment of this invention will be explained.

First, the resume operation will be explained briefly. The operation of restoring the reproduction state using the information backed up in the resume information area 502 is called "resume". The "resume" is executed by the method "resume( )".

More specifically, the player state 232B in the player status area 501 is backed up in the resume information area 502 into the resume information 324, and in accordance with the method "resume( )", the reproduction state is restored using the resume information 324 backed up in the resume information area 502. The player status 323B constitutes the state of the movie player 300, i.e. the play list number, the chapter number or the selected stream number currently reproduced by the movie player 300.

The operation of the movie player 300 with the method "resume( )" issued thereto is varied depending on whether the resume information 324 is existent in the resume information area 502 or not. In the case where the resume information 324 exists in the resume information area 502, the particular resume information 324 is restored as a player status 323B in the player status area 501. In the process, the resume information 324 in the resume information area 502 is discarded.

In the case where the reproduction stream is changed in the menu accessed during the content reproduction, the method "changeResumeInfo( )" is used. By performing the resume operation with the method "resume( )" after the resume information 324 held in the resume information area 502 is changed in a predetermined way by the method "changeResumeInfo( )", the reproduction can be started by changing the reproduction stream.

By executing the method "resume( )", the movie player 300 is caused to perform the resume operation. As an alternative, the resume operation can be realized by executing the method "play( )" with a designated argument after acquiring the resume information 324 by the method "getResumeInfo( )".

Figure 39:
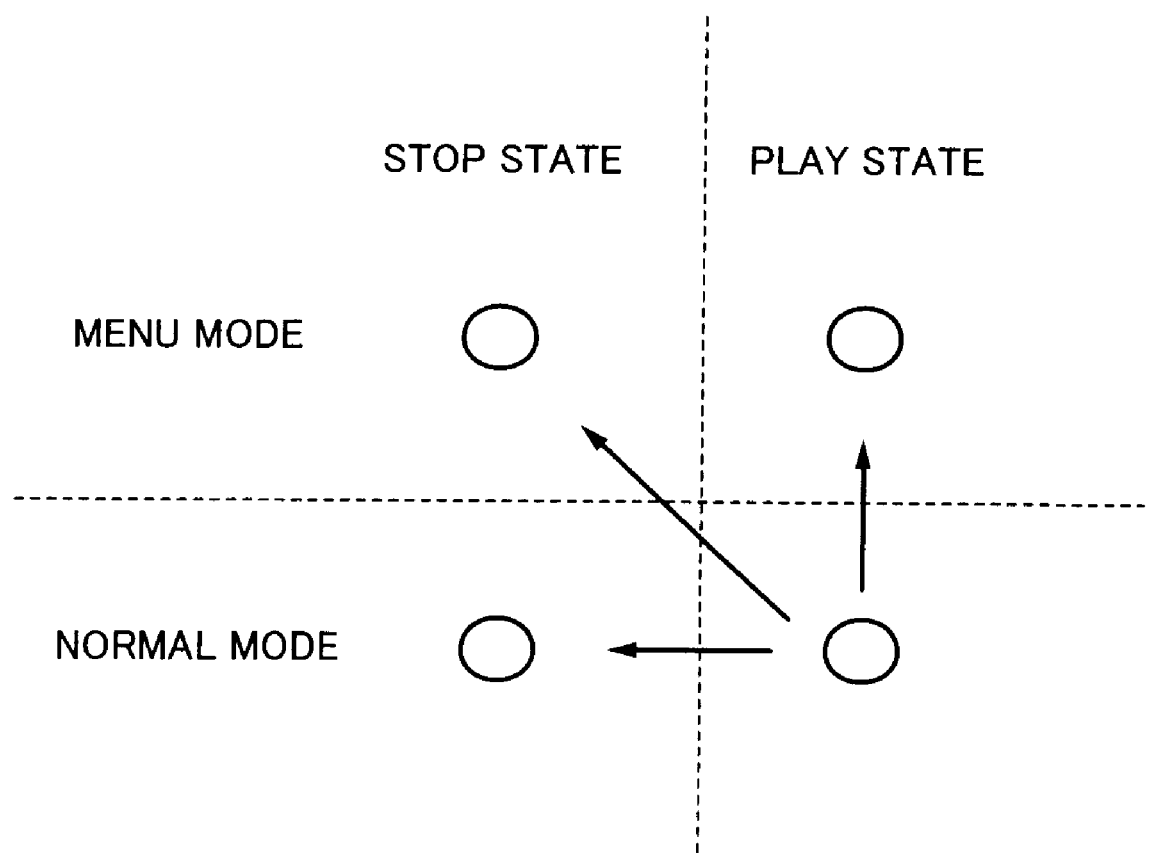
FIG. 39 is a schematic diagram for explaining the backup of a player status.

The backup of the player status 323B in the resume information area 502 will be explained with reference to FIGS. 39 and 40. FIG. 39 shows, among the four states defined by the movie player 300, the state transition in which the player status 323B held in the player status area 501 is backed up in the resume information area 502. FIG. 40 shows the conditions on which the player status 323B is backed up in the resume information area 502.

In the case where the movie player 300 playing in normal mode (state "Normal,play") for reproducing the play list changes to the stop state, the player status 323B held in the player status area 501 is backed up in the resume information area 502, and held in the form of the resume information 324. Incidentally, in stop state, a part of the player status 323B comes to assume an indefinite value.

Also, with the transition of the movie player 300 from the state "Normal,play" to the state "Menu,play", the player status 323B held in the player status area 501 is backed up in the resume information area 502.

Even in the case where the movie player 300 reproducing the play list in menu mode changes the state, however, the player status 323B held in the player status area 501 is not backed up in the resume information area 502.

Specifically, the player status 323B is backed up in the resume information area 502 in the form of the resume information 324 in the following cases:

(1) The current state of the movie player 300 is "Normal,Play", and directly changed to state "Menu,Play" by the execution of the method "play( )".

(2) The state of the movie player 300 is "Normal,Play", and changed to the state "Normal,Stop" or "Menu,Stop" by the execution of the method "stop( )". In this case, the argument "resumeInfoClearFlag" of the method "stop( )" is "false" in value.

The player status 323B is held (backed up) in the resume information area 502 with the intention of holding the return position in the original story. A series of operations including the jump to the dynamic image menu during the reproduction of the original story and returning again to the original story for reproduction are realized, for example, based on the assumption of the use of the resume information 324 as the data of the player status 323B backed up in the resume information area 502.

During the reproduction of the original story, i.e. in the case where the movie player 300 is in the state "Normal,Play", the resume information 324 in the resume information area 502 is discarded. With the transition of the movie player 300 from the state "Normal,Play" to other state, the player status 323B is backed up in the resume information area 502 into the resume information 324.

As described above, in order to realize the resume reproduction, the player status 323B is backed up in the resume information area 502 or the resume information 324 in the resume information area 502 is discarded appropriately in accordance with the state transition of the movie player 300. Also, upon designation of the method "resume( )" in the script layer 302, the resume information 324, if existent in the resume information area 502, is restored in the player status area 501 into the player status 323B.

The resume information 324 in the resume information area 502 can be read using the method "getResumeInfo( )" from the script layer 302. The parameters related to the stream in the resume information 324 in the resume information area 502 can be changed by the method "changeResumeInfo( )". Further by designation with the argument of the method "stop( )", the resume information 324 in the resume information area 502 can be discarded.

The restoration of the resume information 324 held in the resume information area 502 to the player status area 501 and the discard thereof are explained with reference to FIGS. 41 to 44. The resume information 324 held as a return position in the original story is discarded after the movie player 300 returns to the reproduction of the original story, i.e. to the state "Normal,Play". In the process, the resume information 324 may be discarded either after being restored as the player status 323B in the player status area 501 or without being so restored.

Specifically, in this model, once the movie player 300 returns to the state "Normal,Play", the resume information 324 in the resume information area 502 is discarded. At the same time, in the case where predetermined conditions are met by the movie player 300, the resume information 324 in the resume information area 502 is discarded after being restored to the player status area 501. In the case where the resume information 324 is restored to the player status area 501, the reproduction is started from the point designated by the resume information 324. This corresponds to the resume reproduction.

Figure 41:
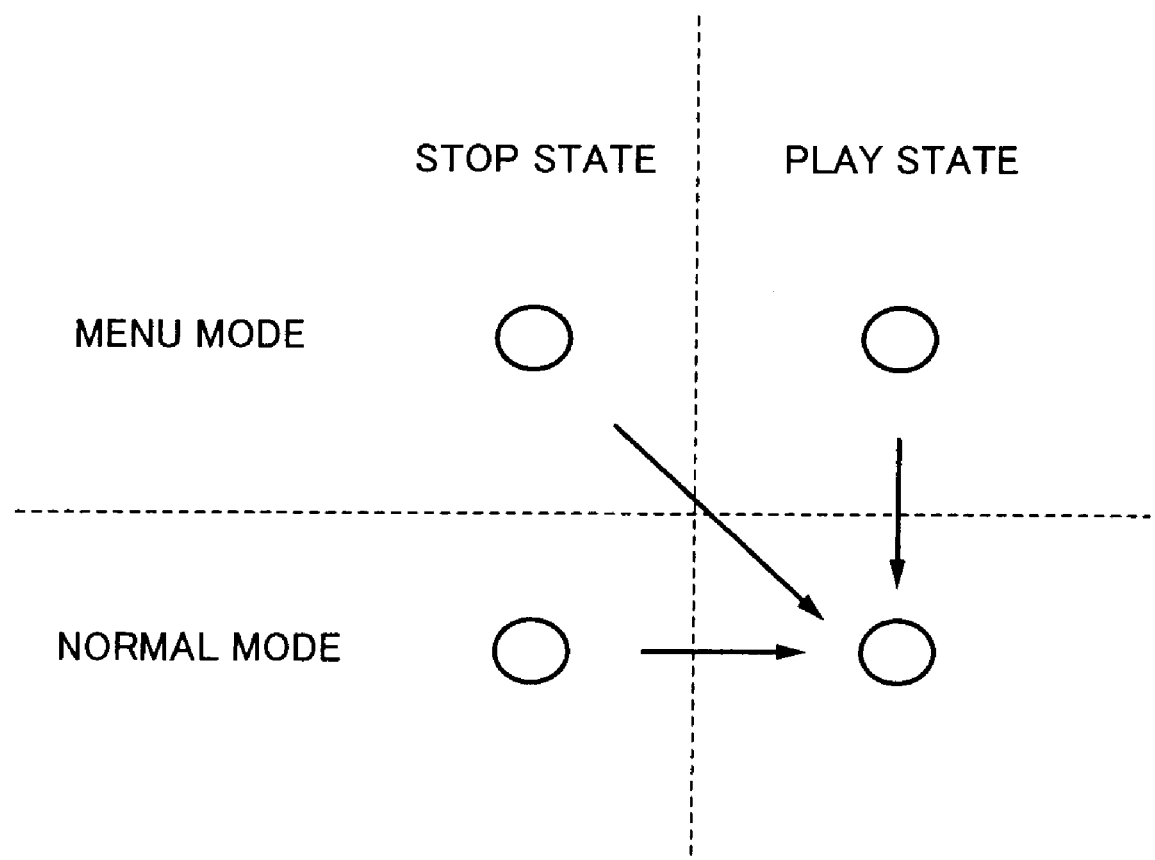
FIG. 41 is a schematic diagram for explaining the restoration and discard of resume information.

FIG. 41 shows the state transition among the four states defined by the movie player 300, in which the resume information 324 is restored in the player status area 501 and then discarded.

In the case where the three conditions described in (1) to (3) below are met, the resume information 324 is discarded after being restored.

(1) The current state of the movie player 300 is "Menu,Stop", "Normal,Stop" or "Menu,Play".

(2) The resume information 324 is existent within the resume information area 502.

(3) By executing the method "resume( )", the transition is made to the state "Normal,Play".

FIG. 42 shows these conditions collectively. In the case where the movie player 300 is in the state "Normal,Play", the resume information 324 is nonexistent, and therefore, not defined in FIG. 42.

Incidentally, upon execution of the method "resume( )" while the resume information 324 is existent in the resume information area 502, the state of the movie player 300 is changed to the state "Normal,Play". Also, in the absence of the resume information 324 in the resume information area 502, the method "resume( )" does not change the state of the movie player 300. At this time, the state "Mode,State" immediately before execution of the method "resume( )" prevails and the player status 323B is not changed either.

Once the three conditions described in (4) to (6) below are all met, on the other hand, the resume information 324 is discarded without being restored.

(4) The current state of the movie player 300 is "Menu,Stop", "Normal,Stop" or "Menu,Play".

(5) The resume information 324 is existent in the resume information area 502.

(6) The state is changed to "Normal,Play" by execution of the method "Play( )".

FIG. 43 shows these conditions collectively. In the case where the movie player 300 is in "Normal,Play", the resume information 324 is not existent in the resume information area 502 and therefore not defined in FIG. 43.

In the absence of the resume information 324, assume that the state of the movie player 300 is changed to "Normal,Play" by the execution of the method "play( )". As a result, the situation lacking the resume information 324 is held.

The resume information 324 in the resume information area 502 can be discarded also by setting the argument of the method "stop( )". Specifically, according to an embodiment of the invention, the argument "resumeInfoClearFlag" of the method "stop( )" is defined as an argument of the method "stop( )" to determine whether the resume information 324 in the resume information area 502 is to be discarded or not. As shown in FIG. 44, the resume information 324 is discarded in the case where the value "True" is designated for the argument "resumeInfoClearFlag" at the time of executing the method "stop( )".

In the case where the original story of the movie is reproduced to the end and the movie player 300 is stopped, for example, the last position of the original story of the movie is recorded as the resume information 324. Upon subsequent reproduction (continued reproduction) by the user, the process jumps to the end of the original story of the movie and enters the pause inconveniently for the purpose of operation.

An improvement of this problem requires a means for discarding the resume information 324 automatically recorded in model definition. The position of the end of the original story of a movie is not in the knowledge of other than the content producer. Therefore, a means is employed in which the discard of the resume information 324 can be designated by the argument "resumeInfoClearFlag" of the method "stop( )" for the movie player 300 from the script program 500.

Figure 45:
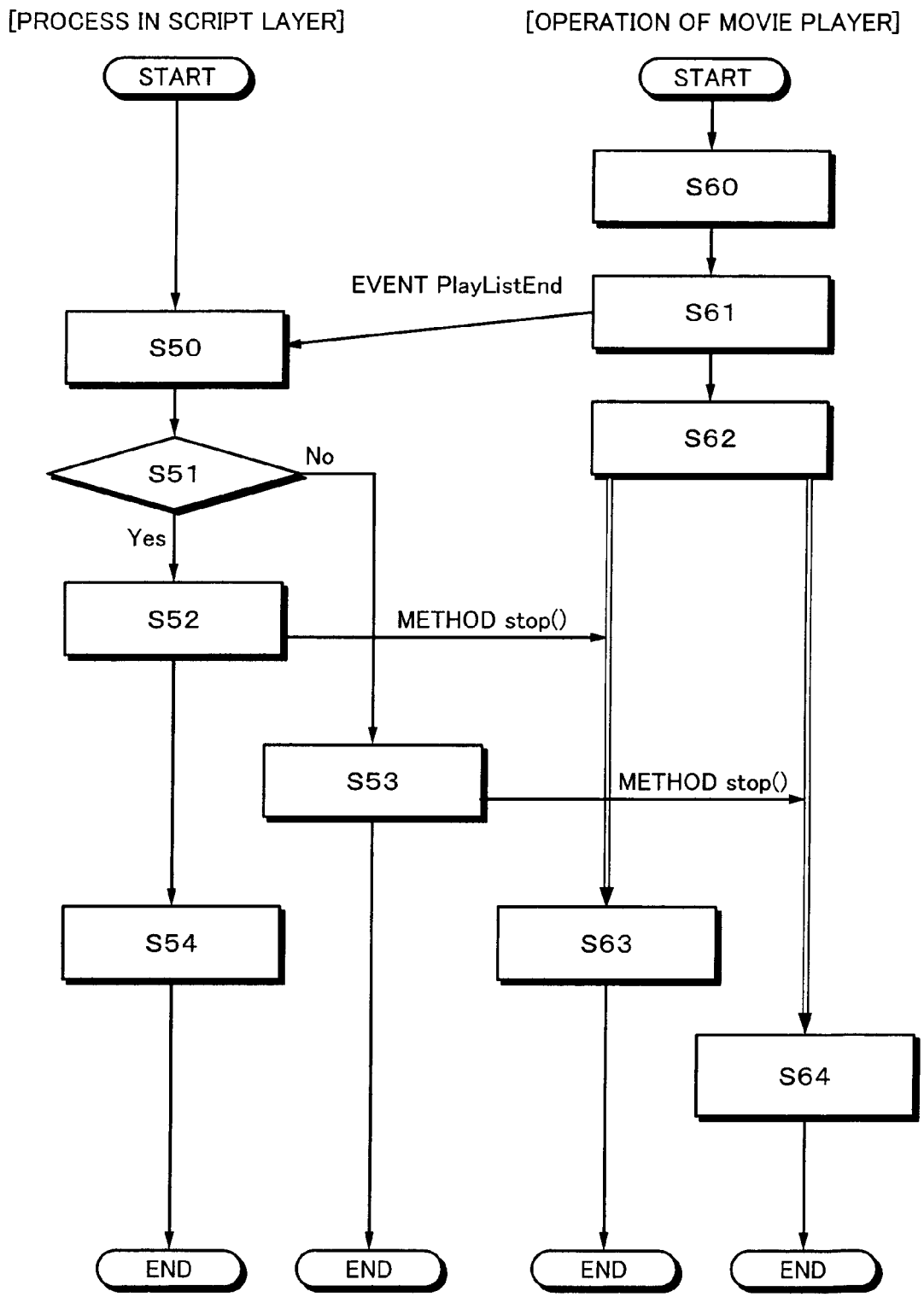
FIG. 45 is a schematic diagram showing an exemplary operation of the UMD video player using an argument "resumeInfoClearFlag" of a method "stop( )"

FIG. 45 shows an example of the operation of the UMD video player using the argument "resumeInfoClearFlag" of the method "stop( )". In FIG. 45, steps S50 to S54 indicate the process on the part of the script layer 302, and steps S60 to S64 the process on the part of the movie player 300.

With the arrival of the reproduction at the end of the play list (step S60), the movie player 300 notifies the event "playListEnd" to the script layer 302 (step S61). The movie player 300, while continuing to display the last picture of the play list reproduced to the end in step S60, changes the state to pause (step S62).

The script player 302, in response to the event "playListEnd", executes the event handler "onPlayListEnd" (step S50). The next step S51 determines whether the play list notified of the event "playListEnd" is the last one of the author scenario or not. Whether a given play list is the last one of the scenario or not can be determined, for example, based on the script program 500.

Upon determination that the play list is not the last one, the process proceeds to step S53, in which the argument "resumeInfoClearFlag" of the method "stop( )" is made "false" in value and the method "stop( )" not to discard the resume information 324 is issued to the movie player 300. The movie player 300, upon receipt of this method "stop( )", changes the state to stop state, while the player status 323B is backed up in the resume information area 502.

Upon determination in step S51 that the end of the scenario is reached in the script layer 302, on the other hand, the process proceeds to step S52, and the value of the argument "resumeInfoClearFlag" of the method "stop( )" is set "True". Then, the method "stop( )" to discard the resume information 324 is notified to the movie player 300. The movie player 300, upon receipt of the method "step( )", changes to the stop state, while the resume information 324 in the resume information area 502 is discarded.

In the script layer 302, the method "end( )" is executed after step S52 depending on the description of the script program 500.

8-5 Life Cycle of Each Data

Next, the life cycle of the player status 323B, the resume information 324 and the user data will be explained.

FIG. 46 shows an example of the life cycle of the player status 323B. At the time of generation of the movie player 300, the player status 323B is also generated. Once the movie player 300 is extinguished, so is the play state 323B. The player status 323B is initialized at the time of generation. At the time of generation, the property indicating the state of the movie player 300 represents "stop state", and the other properties are not definite. The value of the player status 323B changes with the change in reproduction state in the movie player 300. Also, the value of the player status 323B is changed with the restoration of the contents of the resume information area 502. Also, the player status 323B can be read by the method "getPlayerStatus( )" from the script layer 302.

A particular form in which the player status 323B is to be stored depends on the mounting of the movie player 300. As long as the information can be acquired by the method "getPlayerStatus( )" from the script, the information can be held in any form.

FIGS. 47A and 47B show an example of the life cycle of the resume information 324. At the time of generating the movie player 300, the memory area of the resume information is secured and initialized with the generation of the resume information 324. Once the memory area is initialized, the contents of the resume information 324 are discarded. The UMD video player having the nonvolatile memory mounted thereon loads the resume information 324 from the nonvolatile memory at the time of initializing the movie player 300. At the same time, the user data is loaded.

When the state of the movie player 300 transfers from "Normal,Play" to other state, the player status 323B is backed up in the resume information area 502.

The parameters "videoNumber", "audioNumber", "audioFlag", "subtitleNumber" and "subtitleFlag" related to the stream in the resume information 324 can be changed by the method "changeResumeInfo( )" from the script layer 302.

In the movie player 300, the contents of the resume information 324 are discarded when the play list reproduction is started in normal mode. The resume information 324 may or may not be restored into the player status 323B before discard. Also, upon execution of the method "stop( )" with the argument "resumeInfoClearFlag" set to "True" in value, the contents of the resume information 324 are discarded.

Upon execution of the method "resume( )" in the presence of the resume information 324, the resume information 324 is restored into the player status 323B.

The value of the resume information 324 can be read by the method "getResumeInfo( )" from the script layer 302. In reading the resume information 324 in discarded state, the value "0" is returned as a return value "playStatus", and therefore, the presence or absence of the resume information 324 can be determined.

At the end (upon extinction) of the movie player 300, the resume information 324 is also extinguished. The UMD video player with the nonvolatile memory mounted thereon saves the resume information 324 in the nonvolatile memory at the end (upon extinction) of the movie player 300. In the process, the user data is saved at the same time.

FIG. 48 shows an example of the life cycle of the user data. At the time of generation of the movie player 300, the memory area is secured, and the user data generated. The movie player 300 is initialized at the same time as generation thereof. Once initialized, the contents of the user data are cleared (the arrangement of the length "0" is restored by the method "getUserData( )"). The UMD video player with the nonvolatile memory mounted thereon loads the user data from the nonvolatile memory at the time of initialization of the movie player 300. In the process, the resume information is loaded at the same time.

Upon execution of the method "setUserData( )", the user data is written into the user data area 503. The arrangement having the maximum data length of 64 bits is held in the user data area 503 by the method "setUserData( )". The data in the user data area 503 can be read by the method "getUserData ( )" from the script layer 302. In the case where the user data is not set, the arrangement of length 0 is returned.

No method is available for clearing the contents of the user data area 503 from the script layer 302. The contents can be rewritten by overwriting the user data area 503.

At the end (upon extinction) of the movie player 300, the user data area 503 is also extinguished. The UMD video player having the nonvolatile memory mounted thereon saves the data held in the user data area 503 into the nonvolatile memory at the end (upon extinction) of the movie player 300. In the process, the resume information 324 is saved at the same time.

The foregoing description concerns an application of the invention to the disk reproducing apparatus 100 for processing the audio stream and the video stream at the same time. However, the invention is not limited to this configuration.

Only the audio stream, or only the video stream may alternatively be reproduced according to this invention.

Also, the foregoing description deals with the disk recording medium used as a recording medium for recording the content data, and the invention is not limited to this configuration. A semiconductor memory, for example, can be used as a recording medium for recording the content data.

Further, in spite of the foregoing description that the disk reproducing apparatus 100 according to the invention has a dedicated hardware configuration, the invention is not limited to such a configuration. Specifically, the configuration of the disk reproducing apparatus 100 other than the disk drive can be realized also by the software operated on the computer system. In such a case, the software for realizing the disk reproducing apparatus 100 can be supplied by being recorded in a recording medium such as CD-ROM (compact disk read-only memory) or DVD-ROM (digital versatile disc-ROM). The recording medium having recorded therein the software for implementing the disk reproducing apparatus 100 is loaded in the disk drive of the computer system, and the particular software recorded in the recording medium is installed in the computer system. A configuration equivalent to the disk reproducing apparatus 100 can be realized by connecting the disk drive unit corresponding to UMD to the computer system. The recording medium having recorded therein the UMD video contents may be provided together with the particular software recorded therein.

DESCRIPTION OF REFERENCE NUMERALS

101 DISK
112 CPU
113 MEMORY
115 INPUT INTERFACE
116 VIDEO DECODER
117 AUDIO DECODER
118 VIDEO OUTPUT INTERFACE
119 AUDIO OUTPUT INTERFACE
201 OPERATION SYSTEM
210 VIDEO CONTENT REPRODUCING UNIT
211 SCRIPT CONTROL MODULE
212 PLAYER CONTROL MODULE
214 DECODE CONTROL MODULE
215 BUFFER CONTROL MODULE
216 VIDEO DECODER CONTROL MODULE
217 AUDIO DECODER CONTROL MODULE
218 SUBTITLE DECODER CONTROL MODULE
219 GRAPHICS CONTROL MODULE
241 VIDEO OUTPUT MODULE
242 AUDIO OUTPUT MODULE
250 NONVOLATILE MEMORY CONTROL MODULE
300 MOVIE PLAYER
301 NATIVE IMPLEMENTATION PLATFORM
302 SCRIPT LAYER
310 USER INPUT
311 CONTROL COMMAND
312 EVENT
313 METHOD
320 DATA BASE
321 PLAYBACK MODULE
322 DECODER ENGINE
323 PROPERTY
323B PLAYER STATUS
324 RESUME INFORMATION
500 SCRIPT PROGRAM
501 PLAYER STATUS AREA
502 RESUME INFORMATION AREA
503 USER DATA AREA
510 NONVOLATILE MEMORY
S10 USER DEPRESSES "next" KEY DURING REPRODUCTION
S11 "uo_playNextChapter ( )" GENERATED
S12 POSITION OF NEXT CHAPTER MARK KNOWN FROM PLAY LIST DATA BASE
S13 NEXT CHAPTER MARK EXISTS?
S14 SUSPEND CURRENT REPRODUCTION
S15 JUMP TO POSITION INDICATED BY NEXT CHAPTER MARK AND START VIDEO REPRODUCTION
S16 MARK EVENT GENERATED
S17 START EXECUTION OF EVENT HANDLER CORRESPONDING TO MARK EVENT
S18 CHAPTER NUMBER KNOWN FROM INFORMATION NOTIFIED WHEN EVENT IS GENERATED
S19 DISPLAY MESSAGE INDICATING CHAPTER HEAD
S20 END EXECUTION OF EVENT HANDLER
S30 START EXECUTION OF EVENT HANDLER "onPlayListEnd".
S31 METHOD "stop( )" IS DESIGNATED BY EVENT HANDLER "onPlayListEnd".
S32 "play(pauseMode, menuMode, PlayListNumber)" DESIGNATED BY EVENT HANDLER "onPlayListEnd".
S33 END EXECUTION OF EVENT HANDLER "onPlayListEnd"
S40 PLAY LIST REPRODUCED TO THE END
S41 MOVIE PLAYER TRANSMIT "PlayListEnd" EVENT TO SCRIPT
S42 MOVIE PLAYER TRANSIT TO PAUSE WHILE DISPLAYING LAST PICTURE OF PLAY LIST.
S43 MOVIE PLAYER TRANSIT TO STOP STATE. STOP DISPLAY OF LAST PICTURE (BLACK SCREEN APPEARS).
S44 MOVIE PLAYER START REPRODUCTION OF PLAY LIST DESIGNATED.
S50 START EXECUTION OF EVENT HANDLER "onPlayListEnd".
S51 END OF AUTHOR SCENARIO?
S52 ISSUE "stop( )" FOR DISCARDING RESUME INFORMATION TO MOVIE PLAYER.
S53 ISSUE "stop( )" FOR NOT DISCARDING RESUME INFORMATION TO MOVIE PLAYER.
S54 (DEPENDING ON SCRIPT DESCRIPTION, EXECUTE METHOD "end( )" HERE.)
S60 PLAY LIST REPRODUCED TO THE END.
S61 NOTIFY EVENT "PlayListEnd" TO SCRIPT
S62 PAUSE WHILE DISPLAYING LAST PICTURE OF PLAY LIST.
S63 MOVIE PLAYER TRANSIT TO STOP STATE. RESUME INFORMATION IS CLEARED.
S64 MOVIE PLAYER TRANSIT TO STOP STATE. PLAYER STATUS IS BACKED UP AS RESUME INFORMATION.

The invention claimed is:

1. A reproducing method for reproducing content data recorded in a recording medium, comprising:
  reproducing content data by a player unit in accordance with a reproduction control program read from the recording medium having recorded therein the content data including at least one of a video stream and an audio stream and the reproduction control program for controlling the reproduction of the control data; and
  controlling the reproducing based on only four states of the player unit defined by combinations of two states classified according to whether the content data is reproduced or not and two modes classified according to whether the control command corresponding to a user operation is accepted or not, the player unit entering one of the four states after initialization, and the player unit preventing any transition out of the only four states such that no other states are allowed by the player unit, the two modes being a first mode in which the user operation is ignored and a second mode where the control command is issued based on the user operation.

2. A reproducing apparatus for reproducing content data recorded in a recording medium, comprising:

read means for reading data from a recording medium having recorded therein content data including at least one of a video stream and an audio stream and a reproduction control program for controlling the reproduction of the content data;

player means for reproducing the content data in accordance with the reproduction control program; and control command output means for giving a control command corresponding to a user operation to the player means, wherein the player means controls the reproduction of the content data based on only four states defined by combinations of two states classified according to whether the content data is reproduced or not and two modes classified according to whether the control command from the control command output means is accepted or not, the player means entering one of the four states after initialization, and the player means preventing any transition out of the only four states such that no other states are allowed by the player means, the two modes being a first mode in which the user operation is ignored by the control command output means and a second mode where the control command output means issues a control command based on the user operation.

3. The reproducing apparatus according to claim 2, wherein a state transition among the four states of the player means is caused by the reproduction control program.

4. The reproducing apparatus according to claim 2, wherein a state transition among the four states of the player means is not caused by the control command.

5. The reproducing apparatus according to claim 2, wherein state transition among the four states of the player means is not voluntarily caused by the player means.

6. The reproducing apparatus according to claim 2, wherein the player means is in a state not generating the content data and not accepting the control command from the control command output means immediately after initialization.

7. The reproducing apparatus according to claim 2, further comprising:

first storage means for storing reproduction state information indicating a state of the content data during the reproduction by the player means; and second storage means for backing up the reproduction state information stored in the first storage means, wherein the reproduction state information stored in the first storage means is backed up in the second storage means and the reproduction state information backed up in the second storage means is restored to the first storage means along with the state transition among the four states of the player means.

8. The reproducing apparatus according to claim 7, wherein the backup operation is performed at the time of the state transition of the player means from the state in which the control command is accepted and the content data is reproduced to another state.

9. The reproducing apparatus according to claim 7, wherein the restoration is performed at the time of state transition of the player means to the state in which the control command is accepted and the content data is reproduced.

10. The reproducing apparatus according to claim 7, wherein the reproduction state information backed up in the second storage means is discarded after the restoration in the case where the restoration is performed along with the state transition based on an instruction of the reproduction control program to restore the reproduction of the content data using the reproduction state information backed up in the second storage means.

11. The reproducing apparatus according to claim 7, wherein the reproduction state information backed up in the second storage means is discarded in the case where based on an instruction of the reproduction control program to reproduce the content data, the player means transits to the state in which the control command is accepted and the content data is reproduced.

12. The reproducing apparatus according to claim 7, wherein information as to whether the reproduction state information backed up in the second storage means is to be discarded or not is added to the instruction of the reproduction control program to the player means to stop the reproduction of the contents.

13. The reproducing apparatus according to claim 2, wherein the first mode is a menu mode and the second mode is a normal mode.

14. A non-transitory computer-readable recording medium having recorded therein a reproducing program for causing a computer system to execute a reproducing method for reproducing content data recorded in a recording medium, the method comprising:

reproducing content data by a player unit in accordance with a reproduction control program read from a recording medium having recorded therein the content data including at least one of a video stream and an audio stream and the reproduction control program for controlling the reproduction of the content data; and controlling the reproducing based on only four states of the player unit defined by combinations of two states classified according to whether the content data is reproduced or not and two modes classified according to whether the control command corresponding to a user operation is accepted or not, the player unit entering one of the four states after initialization, and the player unit preventing any transition out of the only four states such that no other states are allowed by the player unit, the two modes being a first mode in which the user operation is ignored and a second mode where the control command is issued based on the user operation.

15. The non-transitory computer-readable recording medium according to claim 14, wherein the reproduction control program causes the player unit to generate the state transition among the four states.

16. The non-transitory computer-readable recording medium according to claim 14, wherein the reproduction control program is executed in such a manner that information as to whether reproduction state information backed up in a second storage unit is to be discarded or not is added to the content reproduction stop instruction given to the player unit in which the state transition among the four states of the player unit is accompanied by the backup operation in which the reproduction state information indicating the state of the currently reproduced content data and stored in a first storage unit is backed up in the second storage unit and the restoring operation in which the reproduction state information backed up in the second storage unit is restored into the first storage unit.

17. A non-transitory computer readable medium encoded with a data structure comprising content data including at least one of a video stream and an audio stream and a reproduction control program for causing player means to control the reproduction of the content data, wherein the reproduction control program is executed in such a manner that the reproduction of the content is controlled by giving a reproduction control instruction to the player unit for controlling the reproduction of the content data based on only four states defined by combinations of two states classified according to whether the content data is reproduced or not and two modes classified according to whether the control command corresponding to a user operation is accepted or not, the player unit entering one of the four states after initialization, the player unit preventing any transition out of the only four states such that no other states are allowed by the player unit, the two modes being a first mode in which the user operation is ignored by the player unit and a second mode where the player unit issues the control command based on the user operation.

18. A reproducing apparatus for reproducing content data recorded in a recording medium, comprising:
 a read unit configured to read data from a recording medium having recorded therein content data including at least one of a video stream and an audio stream and a reproduction control program for controlling the reproduction of the content data;
 a player unit, including a processor, configured to play the content data in accordance with the reproduction control program; and
 a control command output unit configured to give a control command corresponding to a user operation to the player unit, wherein the player unit controls the reproduction of the content data based on only four states defined by combinations of two states classified according to whether the content data is reproduced or not and two modes classified according to whether the control command from the control command output unit is accepted or not, the player unit entering one of the four states after initialization, and the player unit preventing any transition out of the only four states such that no other states are allowed by the player unit, the two modes being a first mode in which the user operation is ignored by the control command output unit and a second mode where the control command output unit issues the control command based on the user operation.

* * * * *